(12) United States Patent
Bailey et al.

(10) Patent No.: US 10,968,289 B2
(45) Date of Patent: Apr. 6, 2021

(54) OLEFIN POLYMERIZATION CATALYST SYSTEMS AND METHODS OF USE THEREOF

(71) Applicant: Dow Global Technologies LLC, Midland, MI (US)

(72) Inventors: Brad C. Bailey, Midland, MI (US); Matthew D. Christianson, Midland, MI (US); Anna V. Davis, Midland, MI (US); Jasson T. Patton, Midland, MI (US); Tomas D. Paine, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 280 days.

(21) Appl. No.: 16/089,008

(22) PCT Filed: Mar. 30, 2017

(86) PCT No.: PCT/US2017/025022
§ 371 (c)(1),
(2) Date: Sep. 27, 2018

(87) PCT Pub. No.: WO2017/173080
PCT Pub. Date: Oct. 5, 2017

(65) Prior Publication Data
US 2020/0277411 A1 Sep. 3, 2020

Related U.S. Application Data

(60) Provisional application No. 62/316,015, filed on Mar. 31, 2016.

(51) Int. Cl.
C08F 4/64 (2006.01)
C08F 2/38 (2006.01)
C08F 210/16 (2006.01)

(52) U.S. Cl.
CPC ............ C08F 4/64044 (2013.01); C08F 2/38 (2013.01); C08F 210/16 (2013.01)

(58) Field of Classification Search
CPC ....... C08F 4/64044; C08F 210/16; C08F 2/38
See application file for complete search history.

(56) References Cited

U.S. PATENT DOCUMENTS

| | | |
|---|---|---|
| 3,709,853 A | 1/1973 | Karapinka |
| 4,003,712 A | 1/1977 | Miller |
| 4,011,382 A | 3/1977 | Levine et al. |
| 4,302,566 A | 11/1981 | Karol et al. |
| 4,543,399 A | 9/1985 | Jenkins, III et al. |
| 4,613,484 A | 9/1986 | Ayres et al. |
| 4,882,400 A | 11/1989 | Dumain et al. |
| 5,064,802 A | 11/1991 | Stevens et al. |
| 5,153,157 A | 10/1992 | Hlatky et al. |

(Continued)

FOREIGN PATENT DOCUMENTS

| | | |
|---|---|---|
| EP | 802202 A1 | 10/1997 |
| JP | 2001026434 A | 1/2001 |

(Continued)

OTHER PUBLICATIONS

Kretschmer et al., Journal of Organometallic Chemistry, vol. 692, (21) Oct. 2007, pp. 4569-4579 (Year: 2007).*
Crust et al., "Arylaminopyridinato Complexes of Zirconium", Dalton Trans., 2004, 2257-2266.
Crust et al., "Chiral Metal Architectures in Aminopyridinato Complexes of Zirconium", Dalton Trans., 2004, 4050-4058.
Fahey et al., "Application of Metallocene Catalysts to Large-scale Slurry Loop Reactors", Metallocene-based Polyolefins, 2000, Chapter 14, 321-332.
Fuhrmann et al., "Octahedral group 4 Metal Complexes that Contain Amine, Amido, and Aminopyridinato Ligands: Synthesis, Structure, and Application in a-Olefin Oligo- and Polymerization", Inorg. Chem., 1996, 35, 6742-6745.
Kretschmer et al., "Highly Active/Selective and Adjustable Zirconium Polymerization Catalysts Stabilized by Aminopyridinato Ligands", Journal of Organometallic Chemistry, 2007, 692, 4569-4579.
Labonne et al., "Highly Active in Situ Catalysts for Anti-Markovnikov Hydration of Terminal Alkynes", Organic Letters, 2006, 8:25, 5853-5856.

(Continued)

*Primary Examiner* — Robert D Harlan
(74) *Attorney, Agent, or Firm* — Dinsmore & Shohl LLP

(57) ABSTRACT

Olefin polymerization catalyst systems are provided that include a procatalyst component having a metal-ligand complex of Formula (I): [formula] (I) where each X is a neutral, monoanionic, or dianionic, monodentate or polydentate ligand such that the complex of Formula (I) is neutral; each $R^1$ and $R^{10}$ is a $(C_6-C_{40})$aryl, substituted $(C_6-C_{40})$aryl, $(C_3-C_{40})$heteroaryl, or substituted $(C_3-C_{40})$ heteroaryl; each $R^2$, $R^3$, $R^4$, $R^7$, $R^8$, and $R^9$ is a hydrogen; $(C_1-C_{40})$hydrocarbyl; substituted $(C_1-C_{40})$hydrocarbyl; $(C_1-C_{40})$heterohydrocarbyl; substituted $(C_1-C_{40})$heterohydrocarbyl; halogen; or nitro $(NO_2)$ group; and each $R^5$ and $R^6$ is a $(C_1-C)$alkyl; substituted $(C_1-C_{40})$alkyl; or $[(Si)_1—(C+Si)_{40}]$ substituted organosilyl. Additionally, olefin-based polymers and processes for polymerizing one or more olefin-based polymers in the presence of the olefin polymerization catalyst systems are also provided.

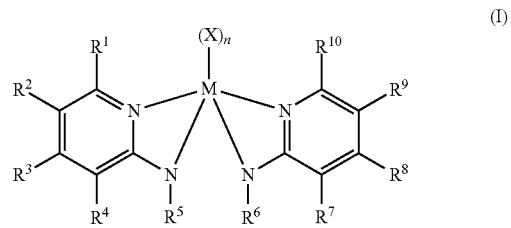

(I)

15 Claims, No Drawings

(56) References Cited

U.S. PATENT DOCUMENTS

| | | |
|---|---|---|
| 5,296,433 A | 3/1994 | Siedle et al. |
| 5,321,106 A | 6/1994 | Lapointe |
| 5,350,723 A | 9/1994 | Neithamer et al. |
| 5,352,749 A | 10/1994 | Dechellis et al. |
| 5,425,872 A | 6/1995 | Devore et al. |
| 5,541,270 A | 7/1996 | Chinh et al. |
| 5,625,087 A | 4/1997 | Neithamer et al. |
| 5,721,185 A | 2/1998 | Lapointe et al. |
| 5,783,512 A | 7/1998 | Jacobsen et al. |
| 5,883,204 A | 3/1999 | Spencer et al. |
| 5,919,983 A | 7/1999 | Rosen et al. |
| 6,103,657 A | 8/2000 | Murray |
| 6,696,379 B1 | 2/2004 | Carnahan et al. |
| 7,163,907 B1 | 1/2007 | Canich et al. |
| 2013/0131294 A1* | 5/2013 | Hagadorn ............ C08F 210/16 526/170 |

FOREIGN PATENT DOCUMENTS

| | | |
|---|---|---|
| WO | 9745434 A1 | 12/1997 |
| WO | 2012155022 A1 | 11/2012 |
| WO | 2014139861 A1 | 9/2014 |

OTHER PUBLICATIONS

Lee et al., "Blue Light-Emitting and Electron-Transporting Materials based on Dialkyl-Functionalized Anthracene Imidazophenanthrolines", Tetrahedron, 2011, 67, 1696-1702.

Morton et al., "Control of Metal/Ligand Stiochiometry and Structure in Aminopyridinato Complexes of Zirconium: N-alkyl is Better than Trimethylsilyl", Chem. Commum., 2000, 2099-2100.

Narayana et al., "Access to Ultra-High-Molecular Weight Poly(ethylene) and Activity Boost in the Presence of Cyclopentene with Group 4 Bis-Amido Complexes", ChemPlusChem, 2014, 79, 151-162.

Noor et al., "Synthesis and Structure of Zirconium and Hafnium Polymerisation Catalysts Stabilised by Very Bulky Aminopyridinato Ligands", Eur. J. Inorg. Chem., 2008, 5088-5098.

Smolensky et al., "Formation of Elastomeric Polypropylene Promoted by a Dynamic Octahedral Titanium Complex", Organometallics, 2005, 24, 3255-3265.

Talja et al., "Bis(alkylphenylaminopyridinato) Titanium Dichlorides as Ethylene Polymerization Catalysts", Journal of Molecular Catalysis A: Chemical, 2008, 280, 102-105.

International Search Report and Written Opinion pertaining to PCT/US2017/025022 dated Jun. 2, 2017.

\* cited by examiner

OLEFIN POLYMERIZATION CATALYST SYSTEMS AND METHODS OF USE THEREOF

CROSS-REFERENCE TO RELATED APPLICATIONS

This application claims priority to U.S. Provisional Application 62/316,015, filed Mar. 31, 2016, which is incorporated herein by reference in its entirety.

TECHNICAL FIELD

Embodiments of the present disclosure generally relate to olefin polymerization catalysts and catalyst systems. More specifically, embodiments of the present disclosure relate to olefin polymerization catalyst systems including a procatalyst component, olefin-based polymers that contain the polymerization reaction of the catalyst system, and processes for polymerizing olefin-based polymers using the catalyst systems.

BACKGROUND

Olefin-based polymers, such as polyethylene, are produced via various catalyst systems and polymerization processes. Selection of such catalyst systems used in the polymerization process of the olefin-based polymers is an important factor contributing to the characteristics and properties of such olefin based polymers. The polyolefin polymerization process can be varied in a number of ways to produce a wide variety of resultant polyolefin resins having different physical properties suitable for use in different applications. Conventionally, polyolefins can be produced in solution phase polymerization process, gas phase polymerization process, and/or slurry phase polymerization process in one or more reactors, for example, connected in series or parallel, in the presence of one or more catalyst systems.

Despite the currently available olefin polymerization catalyst systems, there is a need for an olefin polymerization catalyst system having improved properties facilitating the production of high molecular weight ($M_w$) polyolefins with narrow polydispersities and especially low octene incorporation, particularly at high temperatures.

SUMMARY

The present embodiments address these needs by providing olefin polymerization catalyst systems, methods of using the catalyst systems, and polymers produced therefrom that facilitate high molecular weight polyolefin production with narrow polydispersities and low octene concentrations.

Embodiments of the present disclosure relate to an olefin polymerization catalyst system comprising a procatalyst component comprising a metal-ligand complex of Formula (I):

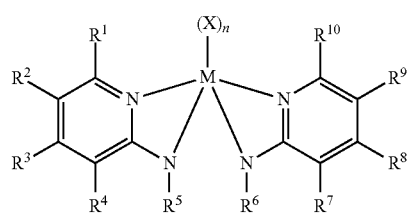

where M is titanium, zirconium, or hafnium, each X is independently a monodentate or polydentate ligand that is neutral, monoanionic, or dianionic, n is an integer, and X and n are chosen in such a way that the metal-ligand complex of Formula (I) is overall neutral. In Formula (I), each $R^1$ and $R^{10}$ independently is selected from the group consisting of ($C_6$-$C_{40}$)aryl, substituted ($C_6$-$C_{40}$)aryl, ($C_3$-$C_{40}$)heteroaryl, and substituted ($C_3$-$C_{40}$)heteroaryl; each $R^2$, $R^3$, $R^4$, $R^7$, $R^8$, and $R^9$ independently is selected from a group consisting of hydrogen; ($C_1$-$C_{40}$)hydrocarbyl; substituted ($C_1$-$C_{40}$)hydrocarbyl; ($C_1$-$C_{40}$)heterohydrocarbyl; substituted ($C_1$-$C_{40}$)heterohydrocarbyl; halogen; or nitro ($NO_2$); each $R^5$ and $R^6$ independently is selected from the group consisting of a ($C_1$-$C_{40}$)alkyl; substituted ($C_1$-$C_{40}$)alkyl; $[(Si)_1-(C+Si)_{40}]$ substituted organosilyl; each N independently is nitrogen; optionally, two or more of the $R^{1-5}$ groups can combine together to form a ring structure, with such ring structure having from 5 to 16 atoms in the ring excluding any hydrogen atoms; and optionally, two or more of the $R^{6-10}$ groups can combine together to form a ring structure, with such ring structure having from 5 to 16 atoms in the ring excluding any hydrogen atoms.

Embodiments of the disclosure additionally relate to olefin-based polymers containing the polymerization reaction product of one or more olefin monomers in the presence of the olefin polymerization catalyst systems of the present disclosure.

Further embodiments of the present disclosure relate to processes for polymerizing one or more olefin-based polymers by polymerizing one or more olefin monomers in the presence of the one or more olefin polymerization catalyst systems of the present disclosure.

These and additional features provided by the embodiments of the present disclosure will be more fully understood in view of the following detailed description.

DETAILED DESCRIPTION

Embodiments of the present disclosure relate to an olefin polymerization catalyst system with a procatalyst component having a metal-ligand complex in accordance with Formula (I):

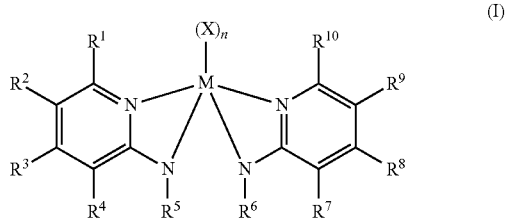

In Formula (I), M is titanium, zirconium, or hafnium; each X is independently a monodentate or polydentate ligand that is neutral, monoanionic, or dianionic, n is an integer, and X and n are chosen in such a way that the metal-ligand complex of Formula (I) is overall neutral. The R groups, $R^1$ to $R^{10}$, are all independently selected from ($C_6$-$C_{40}$)aryl, substituted ($C_6$-$C_{40}$)aryl, ($C_3$-$C_{40}$)heteroaryl, or substituted ($C_3$-$C_{40}$)heteroaryl groups. $R^2$, $R^3$, $R^4$, $R^7$, $R^8$, and $R^9$ may be hydrogen, ($C_1$-$C_{40}$)hydrocarbyl, substituted ($C_1$-$C_{40}$)hydrocarbyl, ($C_1$-$C_{40}$)heterohydrocarbyl, substituted ($C_1$-$C_{40}$)heterohydrocarbyl, halogen, or nitro ($NO_2$) groups. $R^5$ and $R^6$ may be ($C_1$-$C_{40}$)alkyl, substituted ($C_1$-$C_{40}$)alkyl, or $[(Si)_1-(C+Si)_{40}]$ substituted organosilyl groups. In Formula (I), each N independently is nitrogen, and, optionally, two or more of the $R^{1-5}$ groups can combine together to form a ring structure having from 5 to 16 atoms in the ring, excluding any hydrogen atoms. Likewise, optionally, two or more of the $R^{6-10}$ groups can combine together to form a ring structure having from 5 to 16 atoms in the ring, excluding any hydrogen atoms.

It should be understood that the metal ligand complex of Formula (I) above, and all specific embodiments, include every possible stereoisomer, including coordination isomers. As stated, $R^1$ to $R^{10}$ may all be independently selected. In some embodiments, the metal ligand complex of Formula (I) may be homoleptic. When the metal-ligand complex of Formula (I) is homoleptic, $R^1$ is identical to $R^{10}$, $R^2$ is identical to $R^9$, $R^3$ is identical to $R^8$, $R^4$ is identical to $R^7$, and $R^5$ is identical to $R^6$. In other embodiments, the metal-ligand complex may be heteroleptic. When the metal-ligand complex of Formula (I) is heteroleptic, at least one of the pairs of groups $R^1$ and $R^{10}$, or $R^2$ and $R^9$, or $R^3$ and $R^8$, or $R^4$ and $R^7$, or $R^5$ and $R^6$, is composed of two different chemical structures. Additionally, each of the ligands $R^1$ to $R^{10}$ in the metal complex of Formula (I) may be substituted or unsubstituted.

For ease in understanding, the following chemical abbreviations will be used throughout this disclosure: Me: methyl; Ph: phenyl; Bn: benzyl; i-Pr: iso-propyl; t-Bu: tert-butyl; n-Oct: 1-octyl; Cy: cyclohexyl; Mesityl: 2,4,6-trimethylphenyl; THF: tetrahydrofuran; DME: dimethoxyethane; $CH_2Cl_2$: dichloromethane; $CBr_4$: carbon tetrabromide; TCB: trichlorobenzene; EtOAc: ethyl acetate; $C_6D_6$: deuterated benzene; Benzene-$d_6$: deuterated benzene; $C_7D_8$: deuterated toluene; $CDCl_3$: deuterated chloroform; dba: dibenzylideneacetone; $PCy_3$: tricyclohexylphosphine; CyPF-t-Bu (Josiphos): having the structure:

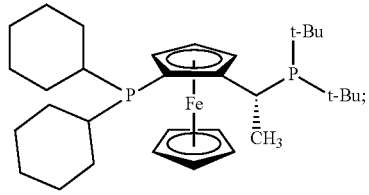

BINAP: 2,2'-bis(diphenylphosphino)-1,1'-binaphthyl; Acac: acetylacetonate; $Mg(OH)_2$: magnesium hydroxide; NaO'Bu: sodium tert-butoxide; $K_3PO_4$: potassium phosphate tribasic; brine: saturated aqueous sodium chloride; n-BuLi: n-butyllithium; MeMgBr: methylmagnesium bromide; $HfCl_4$: hafnium(IV) chloride; $HfBn_4$: hafnium(IV) tetrabenzyl; $ZrCl_4$: zirconium(IV) chloride; $ZrBn_4$: zirconium(IV) tetrabenzyl; $Pd(OAc)_2$: palladium (II) acetate; $Pd_2dba_3$: Tris(dibenzylideneacetone)dipalladium(0); Ni(Acac)$_2$: nickel (II) acetylacetonate; $NiBr_2$(DME): nickel(II) bromide ethylene glycol dimethyl ether complex; DEZ: diethylzinc; MMAO, MMAO-3A: modified methylaluminoxane; and BHT: butylated hydroxytoluene.

In some embodiments, one or more of $R^1$ to $R^{10}$ may be substituted with at least one substituent $R^S$ chosen from a halogen atom, fluoro, unsubstituted $(C_1-C_{18})$alkyl, $(C_6-C_{18})$aryl, $F_3C$, $FCH_2O$, $F_2HCO$, $F_3CO$, $(R^Z)_3Si$, $(R^Z)_3Ge$, $(R^Z)O$, $(R^Z)S$, $(R^Z)S(O)$, $(R^Z)S(O)_2$, $(R^Z)_2P$, $(R^Z)_2N$, $(R^Z)_2C=N$, NC, $NO_2$, $(R^Z)C(O)O$, $(R^Z)OC(O)$, $(R^Z)C(O)N(R^Z)$, or $(R^Z)_2NC(O)$, wherein independently each $R^Z$ is hydrogen, unsubstituted $(C_1-C_{18})$hydrocarbyl or an unsubstituted $(C_1-C_{18})$heterohydrocarbyl. In some particular embodiments, each $R^Z$ independently may be an unsubstituted $(C_1-C_{18})$alkyl.

In some embodiments, one or more than one of $R^1$ to $R^{10}$ polyfluoro substituted or perfluoro substituted with substituents $R^S$ that are fluoro. In some embodiments, two $R^S$ substituents may be taken together to form an unsubstituted $(C_1-C_{18})$alkylene, wherein each substituent is an unsubstituted $(C_1-C_{18})$alkyl. In particular embodiments, $R^5$ and $R^6$ are each independently $(C_1-C_{40})$ primary or secondary alkyl groups with respect to their connection to the amine nitrogen of the parent ligand structure. The terms primary and secondary alkyl groups are given their usual and customary meaning herein such that "primary" indicates that the carbon atom directly linked to the ligand nitrogen bears at least two hydrogen atoms and "secondary" indicates that the carbon atom directly linked to the ligand nitrogen bears only one hydrogen atom.

Optionally, two or more $R^{1-5}$ groups or two or more $R^{6-10}$ each independently can combine together to form ring structures, with such ring structures having from 5 to 16 atoms in the ring, excluding any hydrogen atoms. In some embodiments, $R^5$ and $R^6$ are each independently $(C_1-C_{40})$ primary or secondary alkyl groups and in some particular embodiments, $R^5$ and $R^6$ are each independently propyl, isopropyl, neopentyl, hexyl, isobutyl or benzyl. In some embodiments, $R^1$ and $R^{10}$ of the olefin polymerization procatalyst of Formula (I) are substituted phenyl groups, whereby the polymerization procatalyst of Formula (I) has Formula (II):

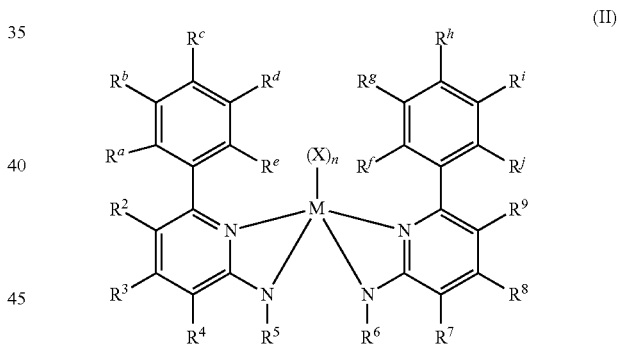

In Formula (II), $R^a$-$R^j$ are each independently chosen from substituents $R^S$ or hydrogen atoms. Each substituent $R^S$ independently may be a halogen atom, fluoro, unsubstituted $(C_1-C_{18})$alkyl, $(C_6-C_{18})$aryl, $F_3C$, $FCH_2O$, $F_2HCO$, $F_3CO$, $(R^Z)_3Si$, $(R^Z)_3Ge$, $(R^Z)O$, $(R^Z)S$, $(R^Z)S(O)$, $(R^Z)S(O)_2$, $(R^Z)_2P$, $(R^Z)_2N$, $(R^Z)_2C=N$, NC, $NO_2$, $(R^Z)C(O)O$, $(R^Z)OC(O)$, $(R^Z)C(O)N(R^Z)$, or $(R^Z)_2NC(O)$, wherein each $R^Z$ is independently hydrogen, unsubstituted $(C_1-C_{18})$hydrocarbyl or an unsubstituted $(C_1-C_{18})$heterohydrocarbyl. In some particular embodiments, each $R^Z$ independently may be an unsubstituted $(C_1-C_{18})$alkyl. In some embodiments, two of the substituents $R^S$ may be taken together to form an unsubstituted $(C_1-C_{18})$alkylene, wherein each $R^S$ independently is an unsubstituted $(C_1-C_{18})$alkyl. In some particular embodiments, $R^a$, $R^e$, $R^f$ and $R^j$ of Formula (II) may be each independently selected from the group consisting of halogen atoms, $(C_1-C_8)$ alkyl, and $(C_1-C_8)$ alkoxyl. In some embodiments, $R^a$, $R^e$, $R^f$ and $R^j$ of Formula (II) are each independently methyl, ethyl, or isopropyl.

When used to describe certain carbon atom-containing chemical groups, parenthetical expressions of the form "($C_x$-$C_y$)" (for example, "($C_1$-$C_{40}$)alkyl") mean that the unsubstituted version of the chemical group has from "x" carbon atoms to "y" carbon atoms, inclusive of "x" and "y", where "x" and "y" are integers. The $R^S$ substituted version of the chemical group may contain more than "y" carbon atoms depending on chemical structure of the substitutents $R^S$. Thus, for example, an unsubstituted ($C_1$-$C_{40}$)alkyl contains from 1 to 40 carbon atoms (x=1 and y=40). When the chemical group is substituted by one or more carbon atom-containing $R^S$ substituents, the substituted ($C_x$-$C_y$) chemical group may have more than "y" total carbon atoms. The maximum total number of carbon atoms of the ($C_x$-$C_y$) chemical group substituted by the one or more carbon atom-containing $R^S$ substituents equals "y" plus the combined total number of carbon atoms present in the carbon atom-containing substituent(s) $R^S$. Any atom of a chemical group that is not specified herein is understood to be a hydrogen atom.

In some embodiments, each of the chemical groups of the metal-ligand complex of Formula (I) (e.g. $R^{1-10}$) may be unsubstituted, that is, can be defined without use of a substituent $R^S$, provided the above-mentioned conditions are satisfied. In other embodiments, at least one of the chemical groups of the metal-ligand complex of Formula (I) independently contain one or more of the substituents $R^S$. When a compound contains two or more substituents $R^S$, each $R^S$ independently is bonded to a same or different substituted chemical group. When two or more $R^S$ are bonded to a same chemical group, they independently are bonded to a same or different carbon atom or heteroatom, as the case may be, in the same chemical group up to and including persubstitution of the chemical group. As used herein, the term "persubstitution" means each hydrogen atom (H) bonded to a carbon atom or heteroatom of a corresponding unsubstituted compound or functional group, as the case may be, is replaced by a substituent (e.g., $R^S$). The term "polysubstitution" means each of at least two, but not all, hydrogen atoms (H) bonded to carbon atoms or heteroatoms of a corresponding unsubstituted compound or functional group, as the case may be, is replaced by a substituent (e.g., $R^S$). The term "monosubstitution" means that only one hydrogen atom (H) bonded to a carbon atom or heteroatom of a corresponding unsubstituted compound or functional group, as the case may be, is replaced by a substituent (e.g., $R^S$).

It should be understood that, as used herein, the terms hydrocarbyl, heterohydrocarbyl, hydrocarbylene, heterohydrocarbylene, alkyl, alkylene, heteroalkyl, heteroalkylene, aryl, arylene, heteroaryl, heteroarylene, cycloalkyl, cycloalkylene, heterocycloalkyl, and heterocycloalkylene are intended to include every possible stereoisomer.

As used herein, the term "($C_1$-$C_{40}$)hydrocarbyl" means a hydrocarbon radical of from 1 to 40 carbon atoms and the term "($C_1$-$C_{40}$)hydrocarbylene" means a hydrocarbon diradical of from 1 to 40 carbon atoms, wherein each hydrocarbon radical and diradical independently is aromatic (6 carbon atoms or more) or non-aromatic, saturated or unsaturated, straight chain or branched chain, cyclic (including mono- and polycyclic, fused and non-fused polycyclic, including bicyclic; 3 carbon atoms or more) or acyclic, or a combination of two or more thereof; and each hydrocarbon radical and diradical independently is the same as or different from another hydrocarbon radical and diradical, respectively, and independently is unsubstituted or substituted by one or more $R^S$.

In some particular embodiments, a ($C_1$-$C_{40}$)hydrocarbyl independently is an unsubstituted or substituted ($C_1$-$C_{40}$) alkyl, ($C_3$-$C_{40}$)cycloalkyl, ($C_3$-$C_{20}$)cycloalkyl-($C_1$-$C_{20}$)alkylene, ($C_6$-$C_{40}$)aryl, or ($C_6$-$C_{20}$)aryl-($C_1$-$C_{20}$)alkylene. All individual values and subranges from 1 to 40 carbons in the ($C_1$-$C_{40}$)hydrocarbyl are included and disclosed herein. For example, the ($C_1$-$C_{40}$)hydrocarbyl includes ($C_1$-$C_{40}$)hydrocarbyl groups, ($C_1$-$C_{30}$)hydrocarbyl) groups, ($C_1$-$C_{20}$)hydrocarbyl) groups, ($C_1$-$C_{15}$)hydrocarbyl) groups, ($C_1$-$C_{12}$) hydrocarbyl) groups, ($C_1$-$C_{10}$)hydrocarbyl) groups, ($C_{10}$-$C_{30}$)hydrocarbyl) groups, ($C_{15}$-$C_{40}$)hydrocarbyl) groups, ($C_5$-$C_{25}$)hydrocarbyl) groups, or ($C_{15}$-$C_{25}$)hydrocarbyl) groups. The number of carbon atoms in the ($C_1$-$C_{40}$)hydrocarbyl may range from a lower limit of 1 carbon atom to an upper limit of 40 carbon atoms, and may have fewer than or equal to 30 carbon atoms, fewer than or equal to 20 carbon atoms, fewer than or equal to 15 carbon atoms, fewer than or equal to 12 carbon atoms, or fewer than or equal to 10 carbon atoms.

As used herein, the term "($C_1$-$C_{40}$)alkyl" refers to a saturated straight or branched hydrocarbon radical of from 1 to 40 carbon atoms, which is unsubstituted or substituted by one or more $R^S$. Examples of unsubstituted ($C_1$-$C_{40}$)alkyl are unsubstituted ($C_1$-$C_{20}$)alkyl; unsubstituted ($C_1$-$C_{10}$)alkyl; unsubstituted ($C_1$-$C_5$)alkyl; methyl; ethyl; 1-propyl; 2-propyl; 2,2-dimethylpropyl, 1-butyl; 2-butyl; 2-methylpropyl; 1,1-dimethylethyl; 1-pentyl; 1-hexyl; 2-ethylhexyl, 1-heptyl; 1-nonyl; and 1-decyl; 2,2,4-trimethylpentyl. Examples of substituted ($C_1$-$C_{40}$)alkyl are substituted ($C_1$-$C_{20}$)alkyl; substituted ($C_1$-$C_{10}$)alkyl; trifluoromethyl; trimethylsilylmethyl; methoxymethyl; dimethylaminomethyl; trimethylgermylmethyl; phenylmethyl (benzyl); 2-phenyl-2, 2-methylethyl; 2-(dimethylphenylsilyl)ethyl; and dimethyl (t-butyl) silylmethyl.

As used herein, the term "($C_6$-$C_{40}$)aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms, and the monocyclic, bicyclic, or tricyclic radical has 1, 2, or 3 rings, respectively; wherein one ring is aromatic and the optional second and third rings independently are fused or non-fused and the second and third rings are each independently optionally aromatic. Examples of unsubstituted ($C_6$-$C_{40}$)aryl are unsubstituted ($C_6$-$C_{20}$)aryl; unsubstituted ($C_6$-$C_{18}$)aryl; phenyl; biphenyl; ortho-terphenyl; meta-terphenyl; fluorenyl; tetrahydrofluorenyl; indacenyl; hexahydroindacenyl; indenyl; dihydroindenyl; naphthyl; tetrahydronaphthyl; phenanthrenyl and triptycenyl. Examples of substituted ($C_6$-$C_{40}$)aryl are substituted ($C_6$-$C_{20}$)aryl; substituted ($C_6$-$C_{18}$) aryl; 2,6-bis[($C_1$-$C_{20}$)alkyl]-phenyl; 2-($C_1$-$C_5$)alkyl-phenyl; 2,6-bis($C_1$-$C_5$)alkyl-phenyl; 2,4,6-tris($C_1$-$C_5$)alkyl-phenyl; polyfluorophenyl; pentafluorophenyl; 2,6-dimethylphenyl; 2,6-diisopropylphenyl; 2,4,6-triisopropylphenyl; 2,4,6-trimethylphenyl; 2-methyl-6-trimethylsilylphenyl; 2-methyl-4, 6-diisopropylphenyl; 4-methoxyphenyl; and 4-methoxy-2, 6-dimethylphenyl.

The term "($C_3$-$C_{40}$)cycloalkyl" refers to a saturated cyclic hydrocarbon radical of from 3 to 40 carbon atoms that is unsubstituted or substituted by one or more $R^S$. Other cycloalkyl groups (e.g., ($C_3$-$C_{12}$)alkyl)) are defined in an analogous manner. Examples of unsubstituted ($C_3$-$C_{40}$)cycloalkyl are unsubstituted ($C_3$-$C_{20}$)cycloalkyl; unsubstituted ($C_3$-$C_{10}$)cycloalkyl; cyclopropyl; cyclobutyl; cyclopentyl; cyclohexyl; cycloheptyl; cyclooctyl; cyclononyl; cyclodecyl; cyclopentyl; cyclohexyl; octahydroindenyl; bicyclo [4.4.0]decyl; bicyclo[2.2.1]heptyl; and tricyclo[3.3.1.1]

decyl. Examples of substituted $(C_3-C_{40})$cycloalkyl are substituted $(C_3-C_{20})$cycloalkyl; substituted $(C_3-C_{10})$cycloalkyl; 2-methylcyclohexyl; and perfluorocyclohexyl.

Examples of $(C_1-C_{40})$hydrocarbylene are unsubstituted or substituted $(C_3-C_{40})$hydrocarbylene; $(C_6-C_{40})$arylene, $(C_3-C_{40})$cycloalkylene, and $(C_3-C_{40})$alkylene (e.g., $(C_3-C_{20})$alkylene). In some embodiments, the diradicals are on the terminal atoms of the hydrocarbylene as in a 1,3-alpha, omega diradical (e.g., —$CH_2CH_2CH_2$—) or a 1,5-alpha, omega diradical with internal substitution (e.g., —$CH_2CH_2CH(CH_3)CH_2CH_2$—). In other embodiments, the diradicals are on the non-terminal atoms of the hydrocarbylene as in a $C_7$ 2,6-diradical (e.g.,

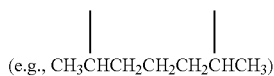

(e.g., $CH_3CHCH_2CH_2CH_2CHCH_3$)

or a $C_7$ 2,6-diradical with internal substitution (e.g.,

(e.g., $CH_3CHCH_2CH(CH_3)CH_2CHCH_3$).

The terms "$(C_1-C_{40})$heterohydrocarbyl" and "$(C_1-C_{40})$heterohydrocarbylene" mean a heterohydrocarbon radical or diradical, respectively, of from 1 to 40 carbon atoms, and each heterohydrocarbon independently has one or more heteroatoms or heteroatomic groups O; S; N; S(O); S(O)$_2$; S(O)$_2$N; Si(R$^Z$)$_2$; Ge(R$^Z$)$_2$; P(R$^Z$); P(O)(R$^Z$); N(R$^Z$), or —N═, wherein independently each R$^Z$ is hydrogen, unsubstituted $(C_1-C_{18})$hydrocarbyl or an unsubstituted $(C_1-C_{18})$heterohydrocarbyl. In some particular embodiments, each R$^Z$ independently may be an unsubstituted $(C_1-C_{18})$alkyl. Each $(C_1-C_{40})$heterohydrocarbyl and $(C_1-C_{40})$heterohydrocarbylene independently is unsubstituted or substituted (by one or more R$^S$), aromatic or non-aromatic, saturated or unsaturated, straight chain or branched chain, cyclic (including mono- and polycyclic, fused and non-fused polycyclic) or acyclic, or a combination of two or more thereof; and each is respectively the same as or different from another.

The term "$(C_1-C_{40})$alkylene" means a saturated or unsaturated straight chain or branched chain diradical of from 1 to 40 carbon atoms that is unsubstituted or substituted by one or more R$^S$. Examples of unsubstituted $(C_1-C_{40})$alkylene are unsubstituted $(C_3-C_{20})$alkylene, including unsubstituted 1,3-$(C_3-C_{10})$alkylene; 1,4-$(C_4-C_{10})$alkylene; —$(CH_2)_3$—; —$(CH_2)_4$—; —$(CH_2)_5$—; —$(CH_2)_6$—; —$(CH_2)_7$—; —$(CH_2)_8$—; and —$(CH_2)_4CH(CH_3)$—. Examples of substituted $(C_1-C_{40})$alkylene are substituted $(C_3-C_{20})$alkylene; —$CF_2CF_2CF_2$—; and —$(CH_2)_{14}C(CH_3)_2(CH_2)_5$— (i.e., a 6,6-dimethyl substituted normal-1,20-eicosylene). Since as mentioned previously two R$^S$ may be taken together to form a $(C_1-C_{40})$alkylene, examples of substituted $(C_1-C_{40})$alkylene also include 1,2-bis(methylene)cyclopentane; 1,2-bis(methylene)cyclohexane; 2,3-bis(methylene)-7,7-dimethylbicyclo[2.2.1]heptane; and 2,3-bis(methylene)bicyclo[2.2.2]octane.

The term "$(C_3-C_{40})$cycloalkylene" means a cyclic diradical (i.e., the radicals are on ring atoms) of from 3 to 40 carbon atoms that is unsubstituted or substituted by one or more R$^S$. Examples of unsubstituted $(C_3-C_{40})$cycloalkylene are 1,3-cyclobutylene, 1,3-cyclopentylene, and 1,4-cyclohexylene. Examples of substituted $(C_3-C_{40})$cycloalkylene are 2-trimethylsilyl-1,4-cyclohexylene and 1,2-dimethyl-1,3-cyclohexylene.

Examples of $(C_1-C_{40})$heterohydrocarbyl include unsubstituted or substituted $(C_1-C_{40})$heteroalkyl, $(C_1-C_{40})$hydrocarbyl-O—, $(C_1-C_{40})$hydrocarbyl-S—, $(C_1-C_{40})$hydrocarbyl-S(O)—, $(C_1-C_{40})$hydrocarbyl-S(O)$_2$—, $(C_1-C_{40})$hydrocarbyl-Si(R$^Z$)$_2$-, $(C_1-C_{40})$hydrocarbyl-Ge(R$^Z$)$_2$-, $(C_1-C_{40})$hydrocarbyl-N(R$^Z$)—, $(C_1-C_{40})$hydrocarbyl-P(R$^Z$)—, $(C_2-C_{40})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$heteroalkylene, $(C_1-C_{40})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene. Again, independently each R$^Z$ may be a hydrogen, unsubstituted $(C_1-C_{18})$hydrocarbyl or an unsubstituted $(C_1-C_{18})$heterohydrocarbyl. In some particular embodiments, each R$^Z$ independently may be an unsubstituted $(C_1-C_{18})$alkyl group.

The term "$(C_1-C_{40})$heteroaryl" means an unsubstituted or substituted (by one or more R$^S$) monocyclic, bicyclic, or tricyclic heteroaromatic hydrocarbon radical of from 1 to 40 total carbon atoms and from 1 to 6 heteroatoms, and the monocyclic, bicyclic, or tricyclic radical has 1, 2 or 3 rings, respectively, wherein one ring is heteroaromatic and the optional second and third rings independently are fused or non-fused; and the second or third rings are each independently optionally heteroaromatic. Other heteroaryl groups (e.g., $(C_3-C_{12})$heteroaryl)) are defined in an analogous manner.

The monocyclic heteroaromatic hydrocarbon radical may be a 5-membered or 6-membered ring. The 5-membered ring has five ring atoms, where from 1 to 4 of the ring atoms are carbon atoms and the remainder of the ring atoms are heteroatoms, each heteroatom being chosen from O, S, N, or P, or from O, S, or N. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has six ring atoms, where from 3 to 5 of the ring atoms are carbon atoms and the remainder of the ring atoms are heteroatoms, the heteroatoms being chosen from N or P, or being all N. Examples of 6-membered ring heteroaromatic hydrocarbon radical include pyridine-2-yl; pyrimidin-2-yl; and pyrazin-2-yl, and triazinyl. The bicyclic heteroaromatic hydrocarbon radical preferably is a fused 5,6- or 6,6-ring system. Examples of the fused 5,6-ring system bicyclic heteroaromatic hydrocarbon radical include indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical preferably is a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

As used herein, the term "$[(Si)_1-(C+Si)_{40}]$ substituted organosilyl" refers to a substituted silyl radical with 1 to 40 silicon atoms and 0 to 39 carbon atoms, such that the total number of carbon plus silicon atoms is from 1 to 40. Examples of $[(Si)_1-(C+Si)_{40}]$ substituted organosilyl include trimethylsilyl, triisopropylsilyl, dimethylphenylsilyl, diphenylmethylsilyl, triphenylsilyl, and triethylsilyl.

In some embodiments the $(C_3-C_{40})$heteroaryl is 2,7-disubstituted carbazolyl or 3,6-disubstituted carbazolyl. In some particular embodiments, each $R^S$ independently is phenyl, methyl, ethyl, isopropyl, or tertiary-butyl, still more preferably 2,7-di(tertiary-butyl)-carbazolyl, 3,6-di(tertiary-butyl)-carbazolyl, 2,7-di(tertiary-octyl)-carbazolyl, 3,6-di(tertiary-octyl)-carbazolyl, 2,7-diphenylcarbazolyl, 3,6-diphenylcarbazolyl, 2,7-bis(2,4,6-trimethylphenyl)-carbazolyl or 3,6-bis(2,4,6-trimethylphenyl)-carbazolyl.

As used herein, "heteroalkyl" and "heteroalkylene" groups refer to saturated straight or branched chain radicals or diradicals, respectively, containing $(C_1-C_{40})$carbon atoms, and one or more of the heteroatoms or heteroatomic groups O; S; N; S(O); $S(O)_2$; $S(O)_2N$; $Si(R^Z)_2$; $Ge(R^Z)_2$; $P(R^Z)$; $P(O)(R^Z)$; and $N(R^Z)$, as defined above, wherein each of the heteroalkyl and heteroalkylene groups independently are unsubstituted or substituted by one or more $R^S$. Examples of substituted and unsubstituted heteroalkyl groups are methoxyl; ethoxyl; trimethylsilyl; dimethylphenylsilyl; tert-butyldimethylsilyl; and dimethylamino. A heteroalkyl group may optionally be cyclic, i.e. a heterocycloalkyl group. Examples of unsubstituted $(C_3-C_{40})$ heterocycloalkyl are unsubstituted $(C_3-C_{20})$ heterocycloalkyl, unsubstituted $(C_3-C_{10})$heterocycloalkyl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" refers to a radical fluorine atom (F), a radical chlorine atom (Cl), a radical bromine atom (Br), or a radical iodine atom (I). Preferably each halogen atom independently is the Br, F, or Cl radical, and more preferably the F or Cl radical. The term "halide" refers to a fluoride ($F^-$), chloride ($Cl^-$), bromide ($Br^-$), or iodide ($I^-$) anion.

In some embodiments, it may be preferred that there are no O—O, S—S, or O—S bonds, other than O—S bonds in an S(O) or $S(O)_2$ diradical functional group, in the metal-ligand complex of Formula (I). Likewise, in some embodiments, it may be preferred there are no O—O, P—P, S—S, or O—S bonds, other than O—S bonds in an S(O) or $S(O)_2$ diradical functional groups in the metal-ligand complex of Formula (I).

As used herein, the term "saturated" means lacking carbon-carbon double bonds, carbon-carbon triple bonds, and (in heteroatom-containing groups) carbon-nitrogen, carbon-phosphorous, and carbon-silicon double bonds and carbon-nitrogen triple bonds. Where a saturated chemical group is substituted by one or more substituent groups $R^S$, one or more double and/or triple bonds optionally may or may not be present in substituent groups $R^S$. The term "unsaturated" means containing one or more carbon-carbon double bonds, carbon-carbon triple bonds, and (in heteroatom-containing groups) carbon-nitrogen, carbon-phosphorous, and carbon-silicon double bonds, and carbon nitrogen triple bonds, not including any such double or triple bonds that may be present in substituent groups $R^S$, if any, or in (hetero) aromatic rings, if any.

In some embodiments, M may be titanium, zirconium, or hafnium. In one embodiment, M is titanium. In another embodiment, M is zirconium. In another embodiment, M is hafnium. In some embodiments, M may be in a formal oxidation state of +2, +3, or +4. Each X in Formula (I) independently is a monodentate or polydentate ligand that may be neutral, monoanionic, or dianionic. X and n may be chosen in such a way that the metal-ligand complex of Formula (I) is overall neutral. In some embodiments each X independently may be the monodentate ligand. In one embodiment when there are two or more X monodentate ligands, each X may be the same. In some embodiments, the monodentate ligand is a monoanionic ligand. The monoanionic ligand may have a net formal oxidation state of −1. Each monoanionic ligand may independently be a hydride, $(C_1-C_{40})$hydrocarbyl carbanion, $(C_1-C_{40})$heterohydrocarbyl carbanion, halide, nitrate, carbonate, phosphate, borate, borohydride, sulfate, $HC(O)O^-$, alkoxide or aryloxide ($RO^-$), $(C_1-C_{40})$hydrocarbylC(O)O$^-$, HC(O)N(H)$^-$, $(C_1-C_{40})$hydrocarbylC(O)N(H)—, $(C_1-C_{40})$hydrocarbylC(O)N$((C_1-C_{20})$hydrocarbyl)-, $R^KR^LB^-$, $R^KR^LN^-$, $R^KO^-$, $R^KS^-$, $R^KR^LP^-$, or $R^MR^KR^LSi^-$ group, where each $R^K$, $R^L$, and $R^M$ independently is a hydrogen, $(C_1-C_{40})$hydrocarbyl, or $(C_1-C_{40})$heterohydrocarbyl group, or $R^K$ and $R^L$ are taken together to form a $(C_2-C_{40})$hydrocarbylene or $(C_1-C_{40})$ heterohydrocarbylene.

In some embodiments, at least one monodentate ligand of X independently may be the neutral ligand. In one embodiment, the neutral ligand may be a neutral Lewis base group that is $R^XNR^KR^L$, $R^KOR^L$, $R^KSR^L$, or $R^XPR^KR^L$, wherein each $R^X$ independently is a hydrogen, $(C_1-C_{40})$hydrocarbyl, $[(C_1-C_{10})$hydrocarbyl$]_3$Si, $[(C_1-C_{10})$hydrocarbyl$]_3$Si$(C_1-C_{10})$hydrocarbyl, or $(C_1-C_{40})$heterohydrocarbyl group and each $R^K$ and $R^L$ independently is as previously defined.

In some embodiments, each X may be a monodentate ligand that independently is a halogen atom, unsubstituted $(C_1-C_{20})$hydrocarbyl, unsubstituted $(C_1-C_{20})$hydrocarbylC(O)O—, or $R^KR^LN^-$ group, wherein each of $R^K$ and $R^L$ independently is an unsubstituted $(C_1-C_{20})$hydrocarbyl. In some embodiments each monodentate ligand X is a chlorine atom, $(C_1-C_{10})$hydrocarbyl (e.g., $(C_1-C_6)$alkyl or benzyl), unsubstituted $(C_1-C_{10})$hydrocarbylC(O)O—, or $R^KR^LN^-$ wherein each of $R^K$ and $R^L$ independently is an unsubstituted $(C_1-C_{10})$hydrocarbyl.

In some embodiments the metal-ligand complex of Formula (I) includes at least two Xs, and the two Xs may be taken together to form a bidentate ligand. In some embodiments the bidentate ligand is a neutral bidentate ligand. In one embodiment, the neutral bidentate ligand is a diene of Formula $(R^D)_2C=C(R^D)-C(R^D)=C(R^D)_2$, wherein each $R^D$ independently is H, unsubstituted $(C_1-C_6)$alkyl, phenyl, or naphthyl. In some embodiments the bidentate ligand is a monoanionic-mono(Lewis base) ligand. The monoanionic-mono(Lewis base) ligand may be a 1,3-dionate of Formula (D): $R^E-C(O—)=CH-C(=O)-R^E$ (D), wherein each $R^D$ independently is H, unsubstituted $(C_1-C_6)$alkyl, phenyl, or naphthyl. In some embodiments the bidentate ligand is a dianionic ligand. The dianionic ligand may have a net formal oxidation state of −2. In one embodiment, each dianionic ligand independently is carbonate, oxalate (i.e., —$O_2CC(O)O$—), $(C_2-C_{40})$hydrocarbylene dicarbanion, $(C_1-C_{40})$heterohydrocarbylene dicarbanion, phosphate, or sulfate.

As previously mentioned, number and charge (neutral, monoanionic, dianionic) of X may be selected depending on the formal oxidation state of M, such that the metal-ligand complex of Formula (I) is, overall, neutral. In some embodiments each X may be the same. In some embodiments, each X may be a methyl; isobutyl; neopentyl; neophyl; trimethylsilylmethyl; phenyl; benzyl; or chloro group. In some embodiments, n may be 1, 2, 3, 4, 5 or more. In some particular embodiments, n may be 2 and X may be Me or Bn. In some embodiments, each X independently is Me, Bn, or Cl. In some embodiments, n is 2 and each X is the same. In some embodiments at least two X may be different. In some embodiments, each X is a different one of methyl; isobutyl; neopentyl; neophyl; trimethylsilylmethyl; phenyl; benzyl; and chloro.

The metal-ligand complex of Formula (I), in some embodiments, may be a mononuclear metal complex. In some embodiments, the olefin polymerization catalyst systems of the present disclosure may demonstrate reversible chain transfer, indicative of chain shuttling behavior, when in the presence of appropriate chain shuttling agents. Such combination of attributes may be of particular interest in the preparation of olefin block copolymers. Without being bound by any particular theory, the ability to tune alpha-olefin incorporation, and thus, short-chain branching distribution, may be critical to accessing materials with performance differentiation.

Examples of metal-ligand complexes of Formula (I) include metal-ligand complexes having Formula (II):

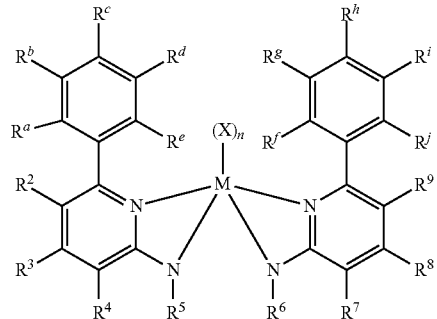

(II)

In Formula (II), each of $R^{2-9}$, M, X, and n are as defined in Formula (I). In Formula (II), $R^a$-$R^j$ are each independently selected from the group consisting of $R^S$ substituent groups (as previously defined) and hydrogen. In some particular embodiments, $R^a$, $R^e$, $R^f$ and $R^j$ of Formula (II) are each independently selected from the group consisting of halogen atoms, $(C_1$-$C_8)$ alkyl, and $(C_1$-$C_8)$ alkoxyl.

In some embodiments, the metal-ligand complex of Formula (I) may include a one or more complex having any of the following structures, where M and X are as previously defined:

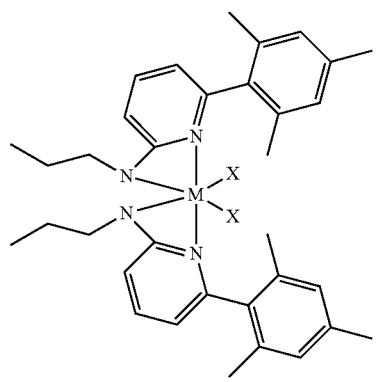

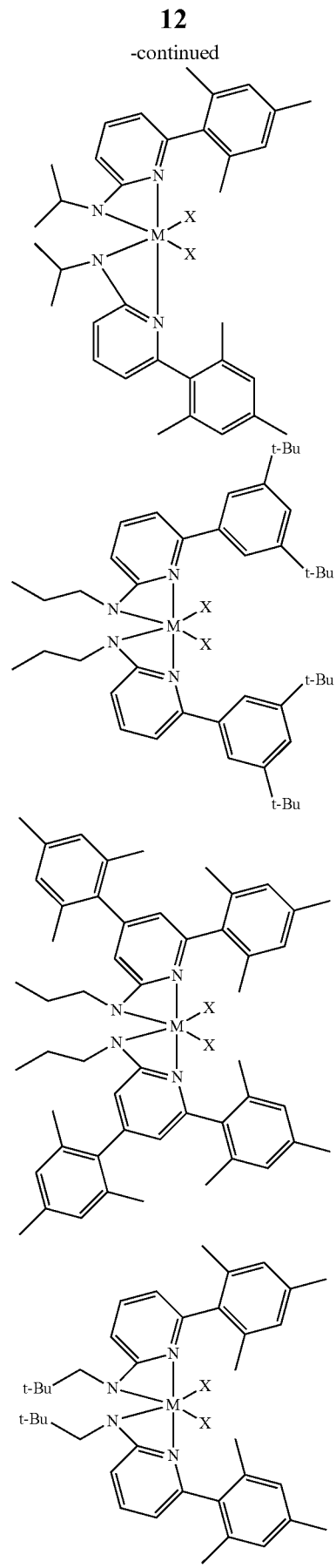

-continued
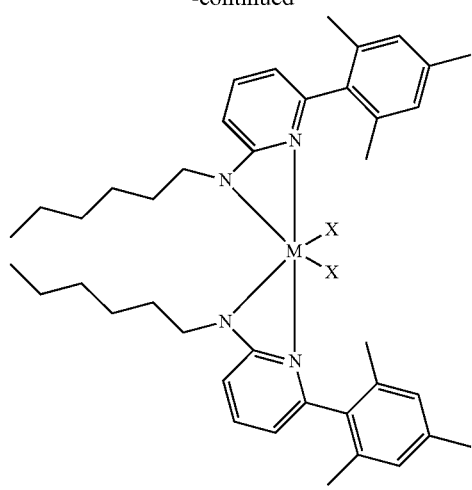
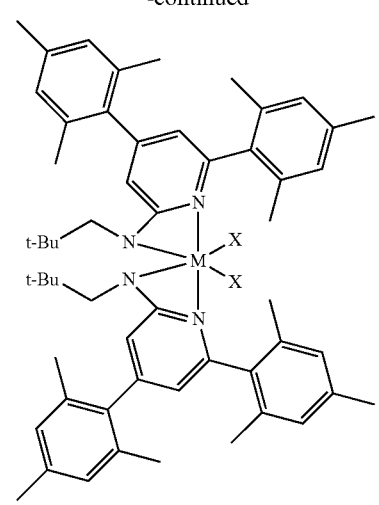
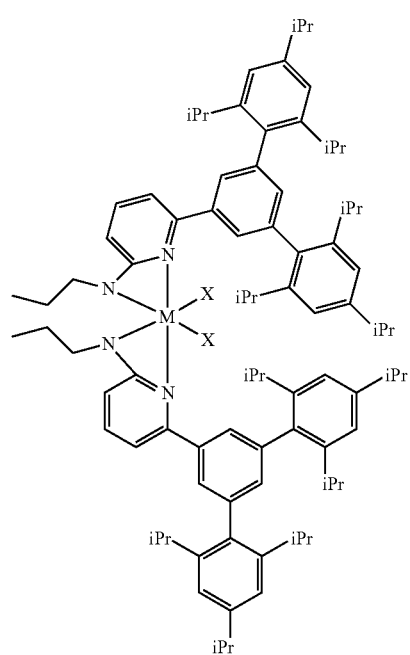
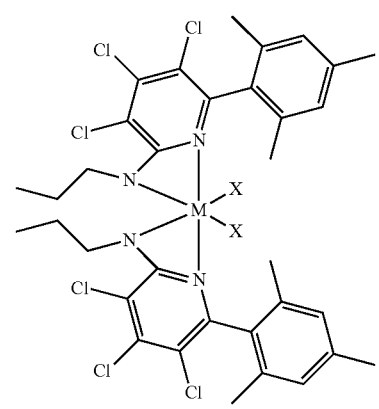
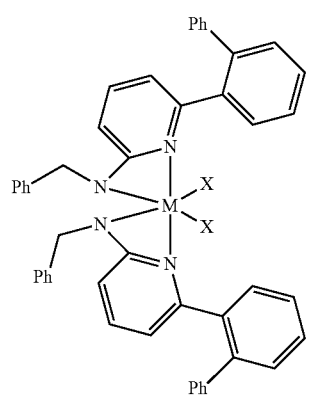
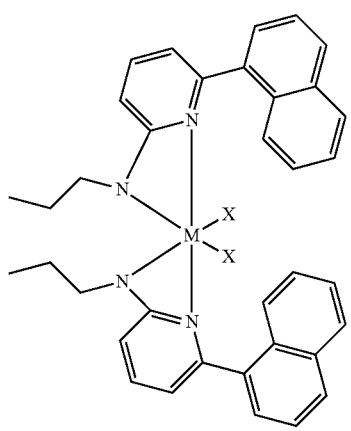

-continued
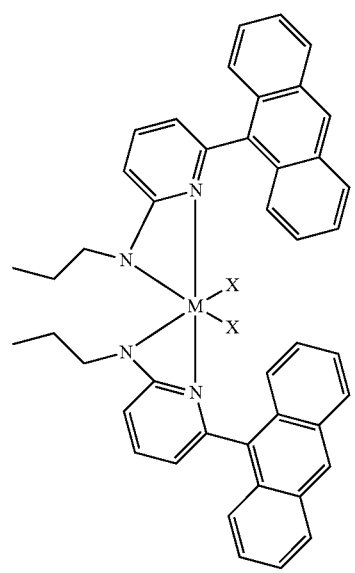
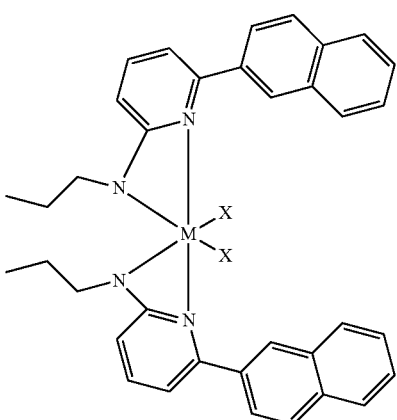
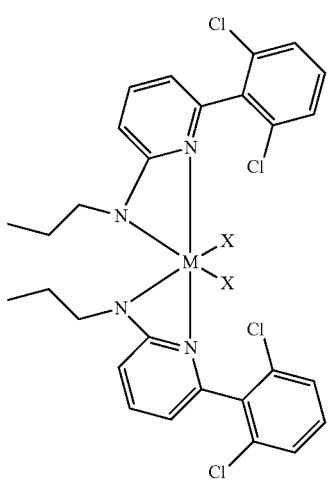
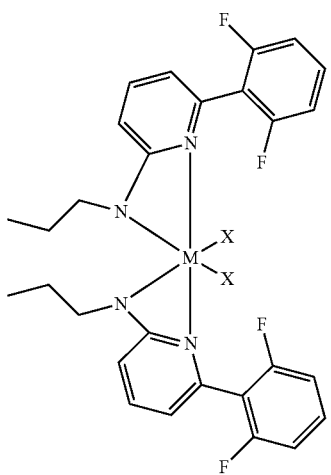

-continued
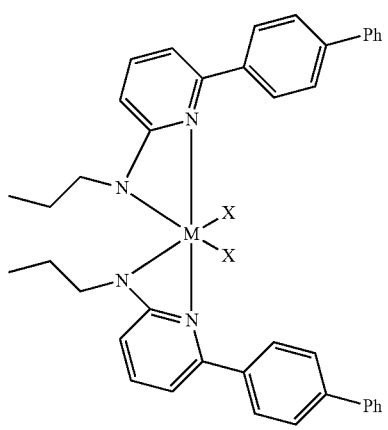
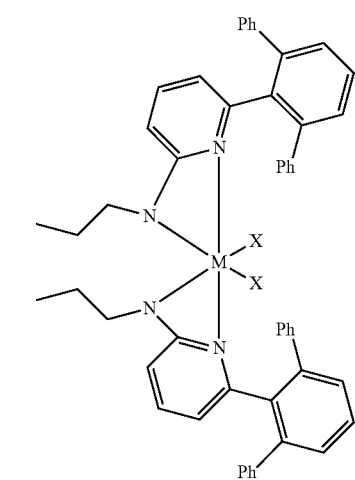
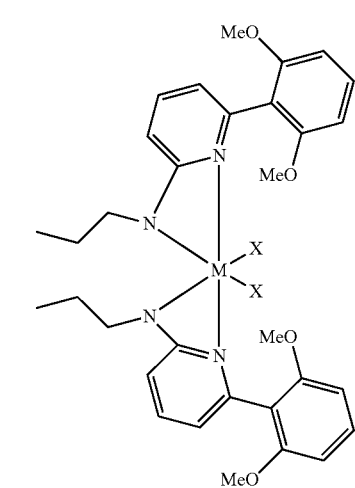
-continued
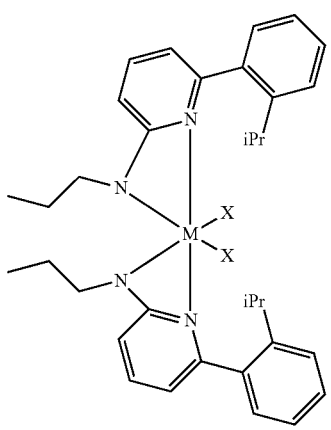
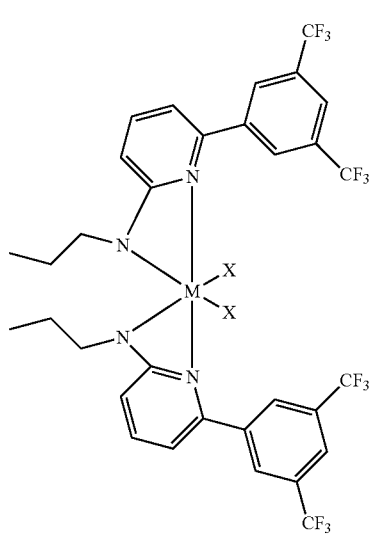
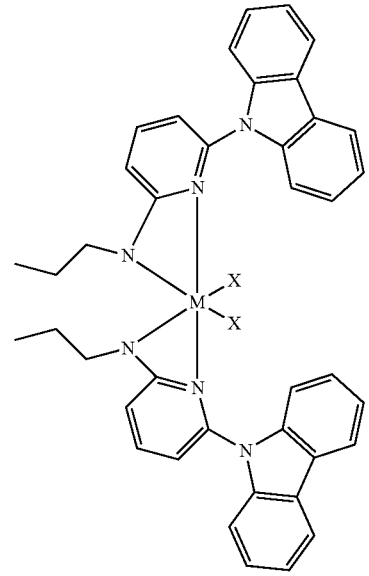

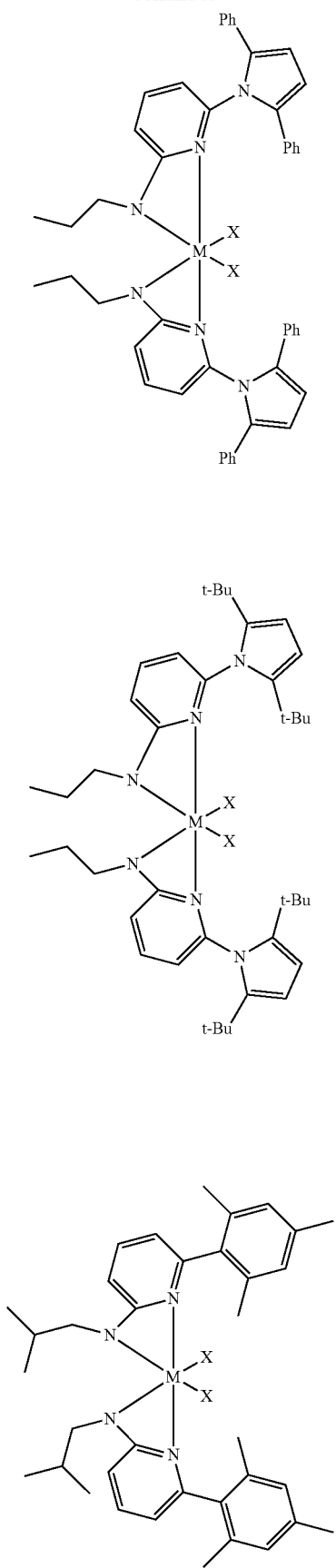
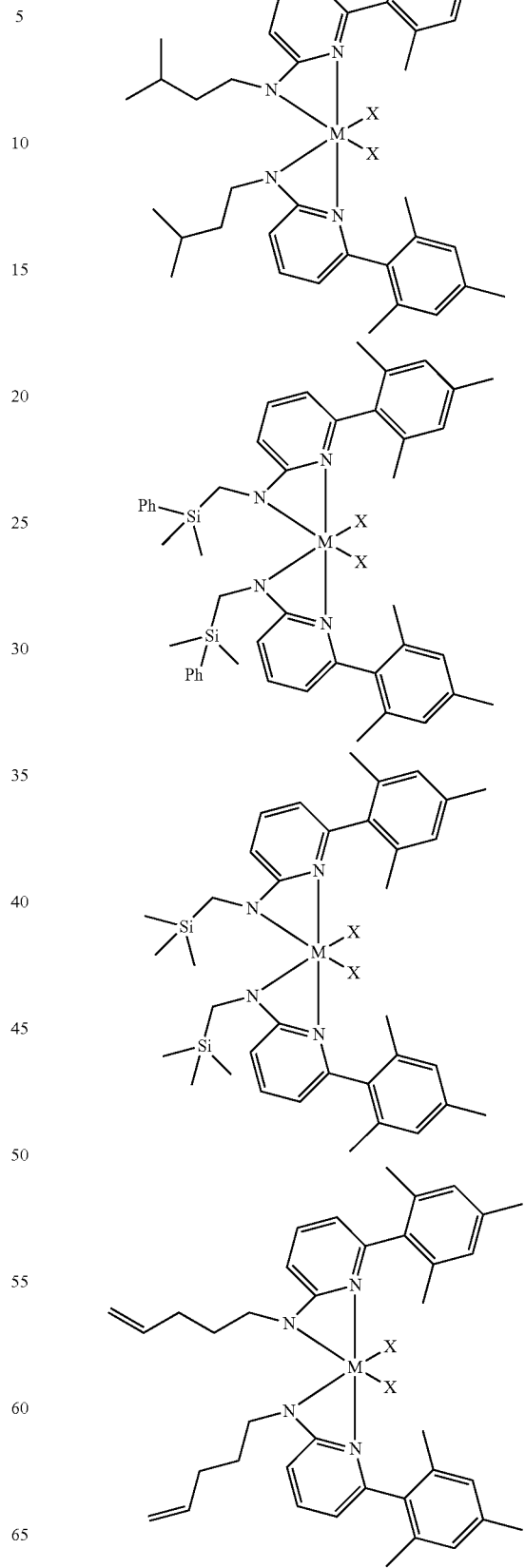

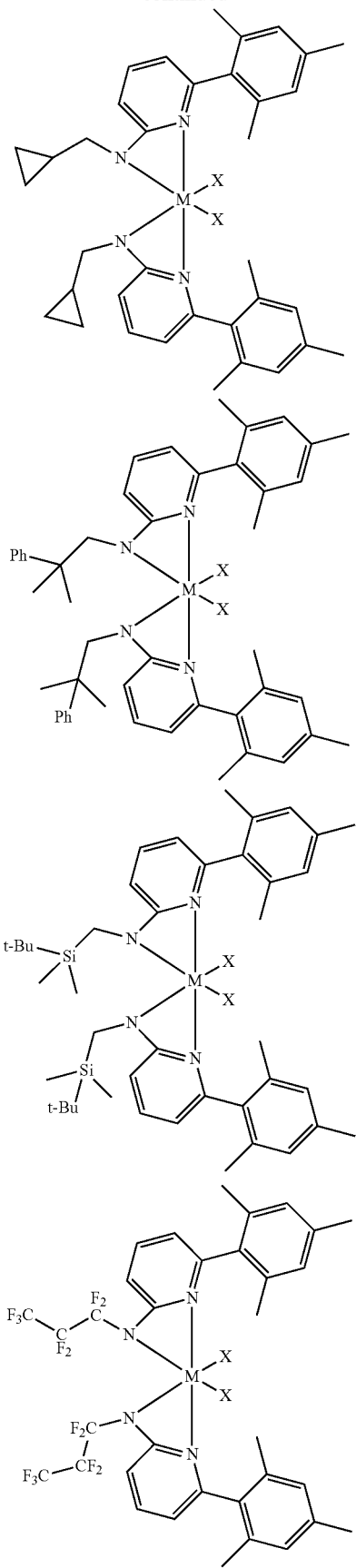
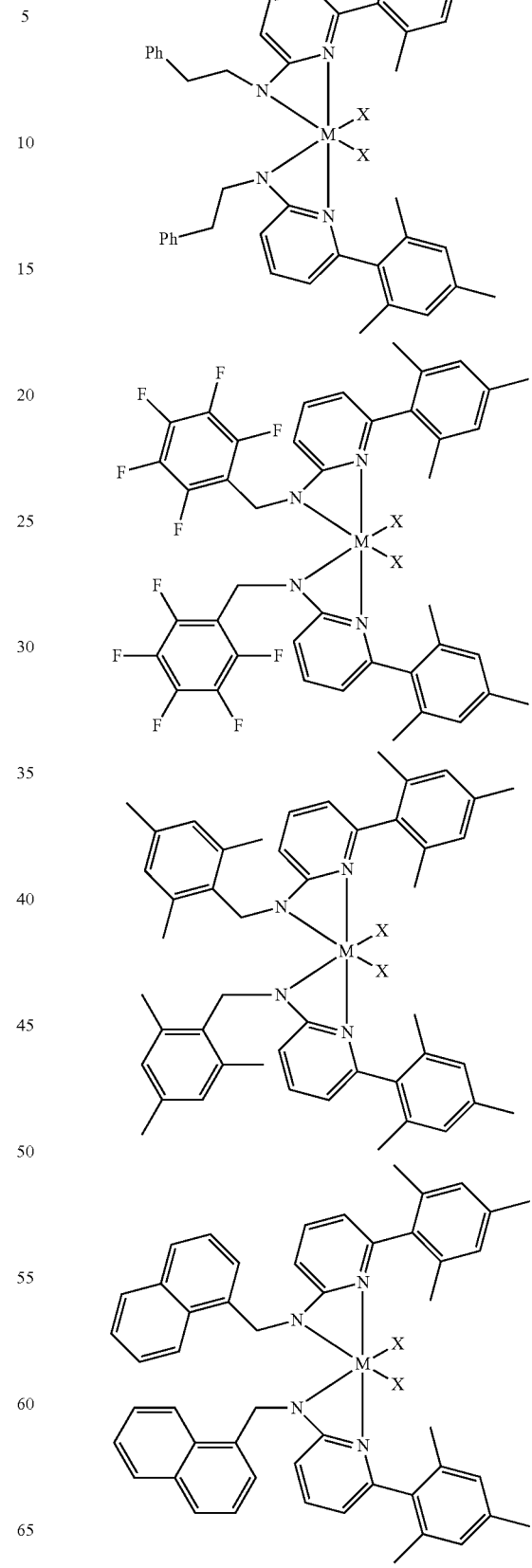

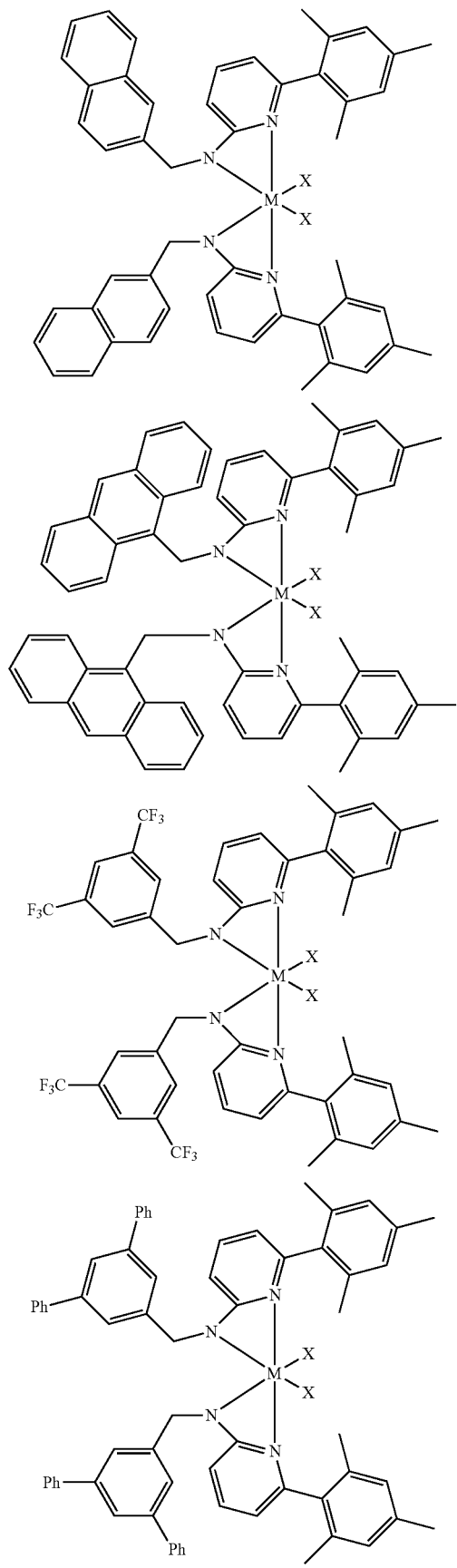
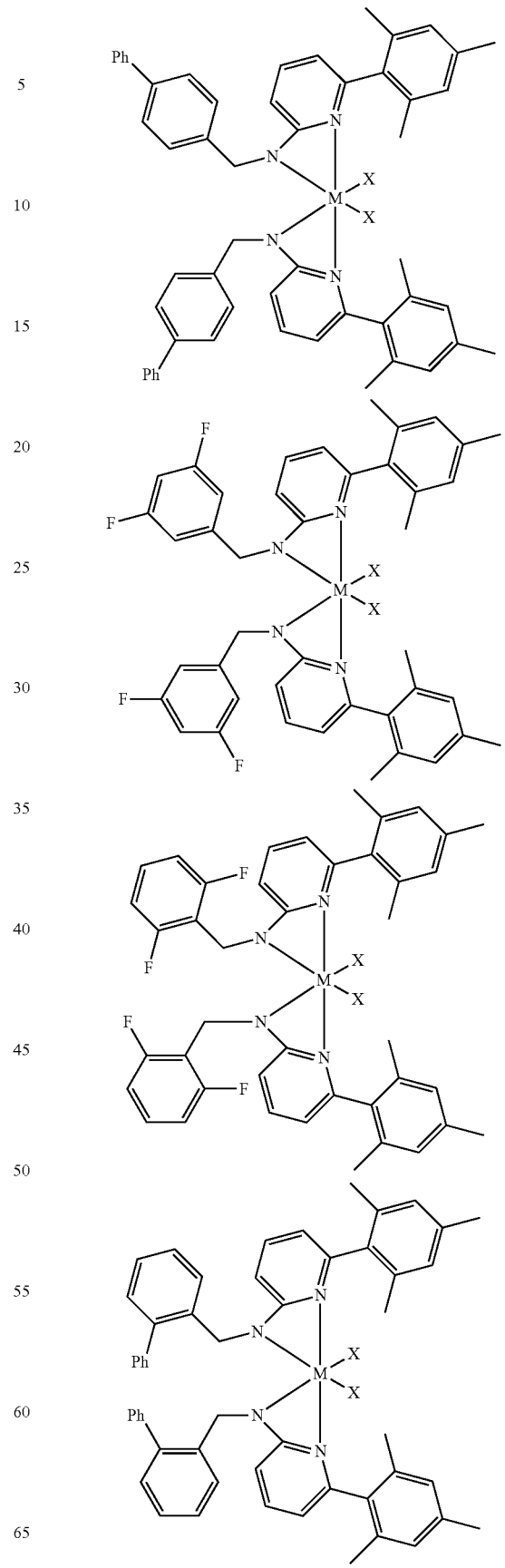

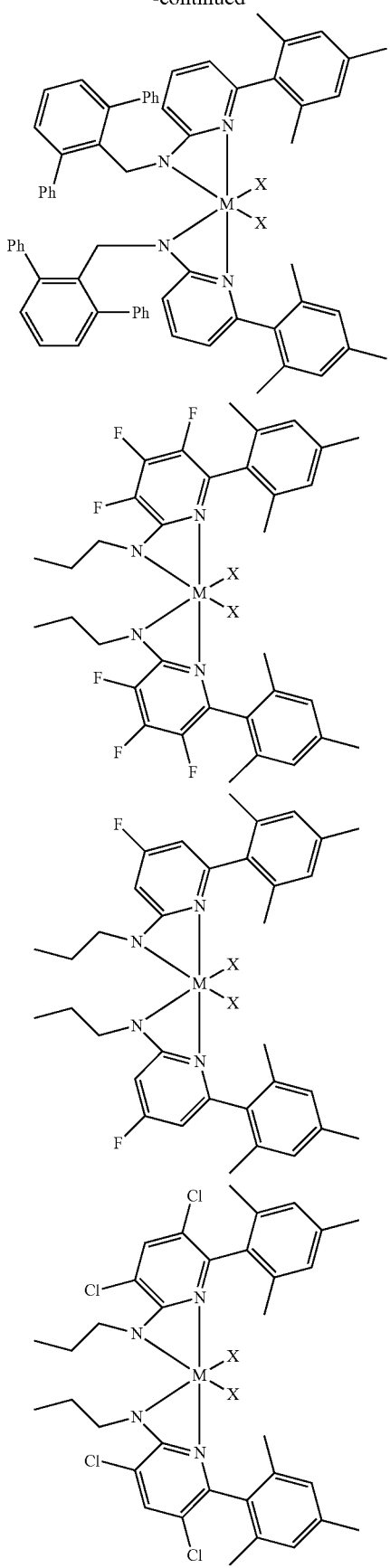
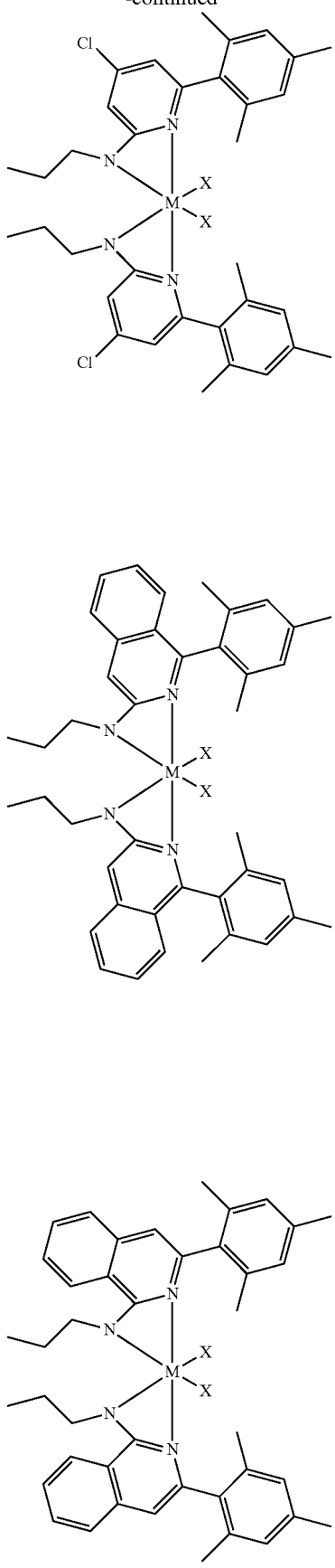

27
-continued
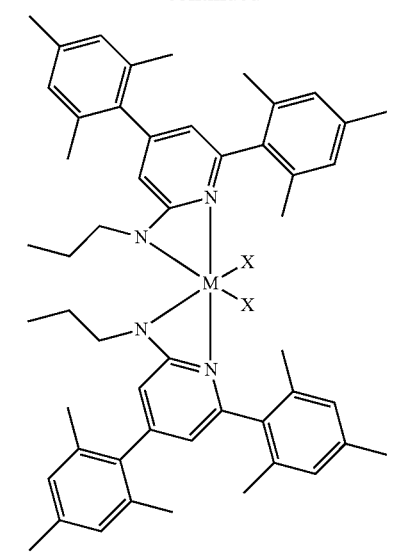
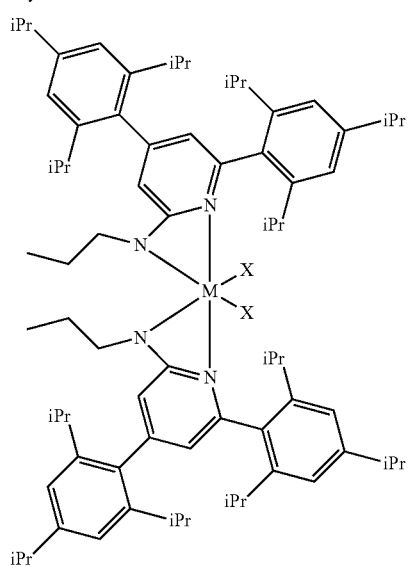
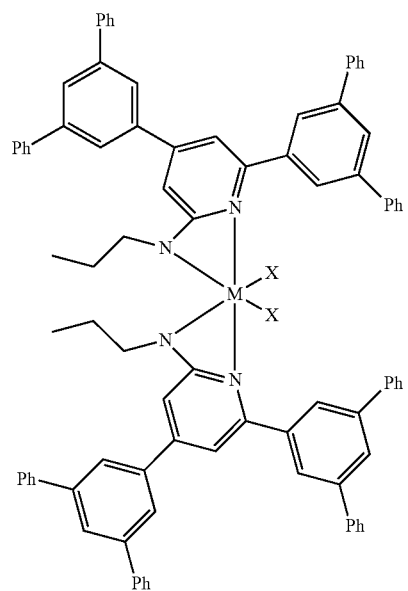
28
-continued
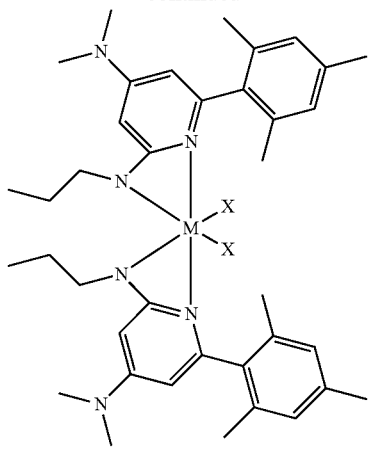
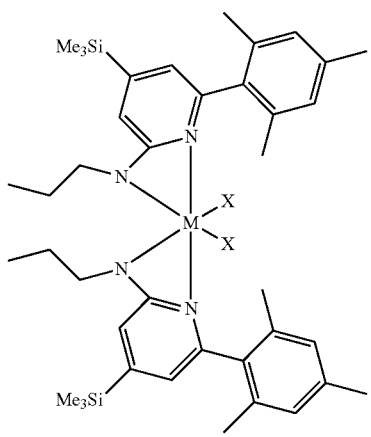
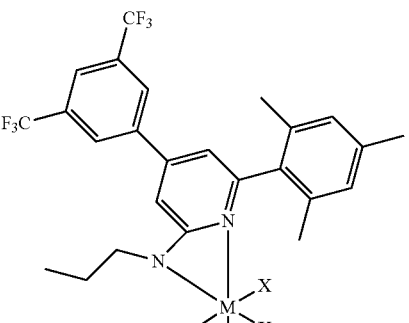
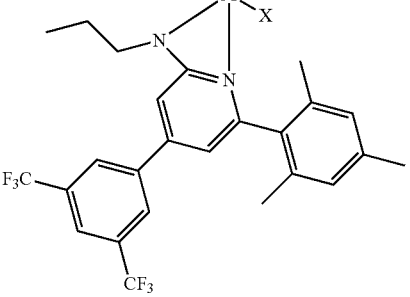

-continued
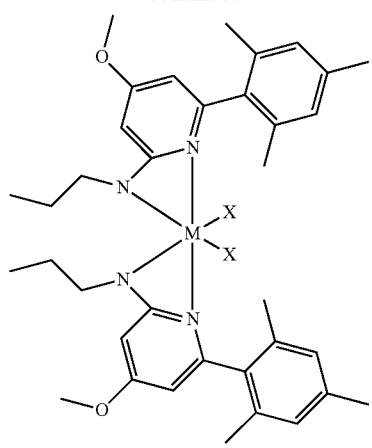
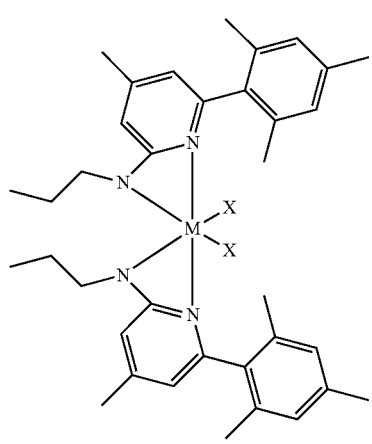
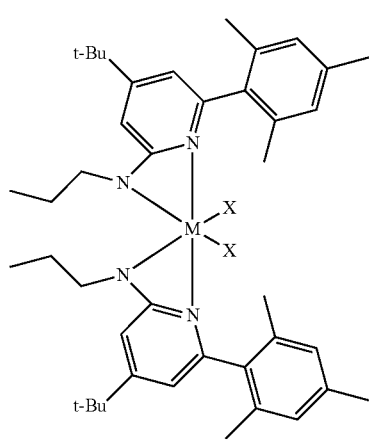
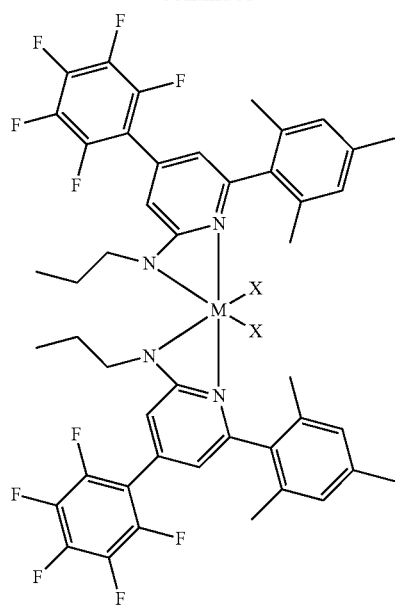
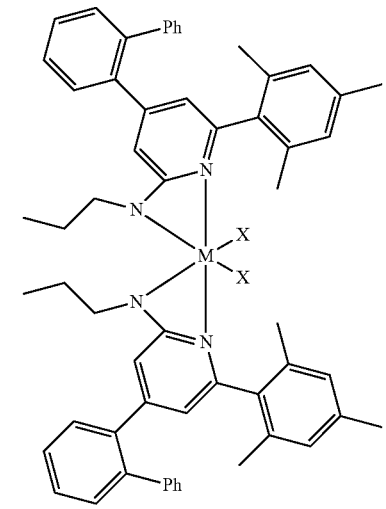
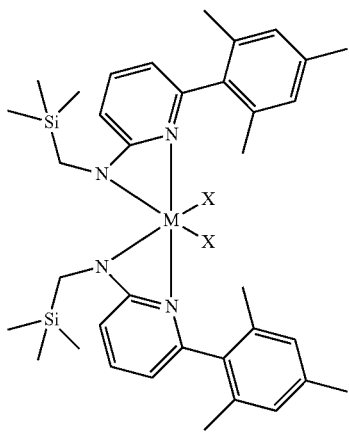

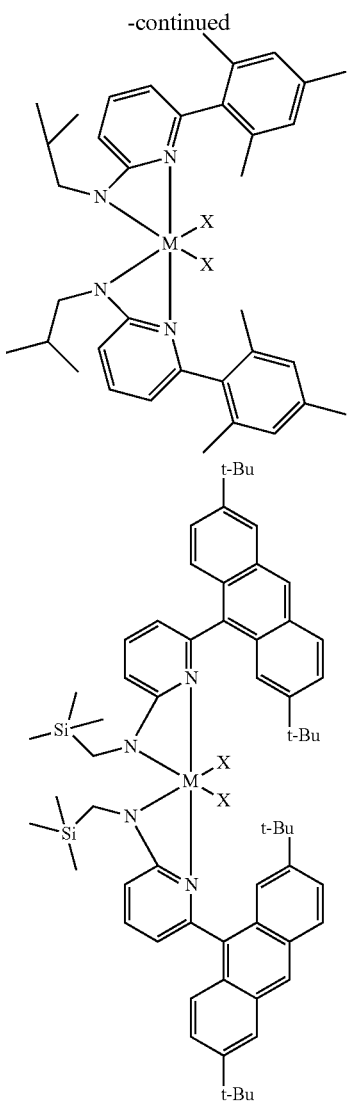

Without being bound by any particular theory, the olefin polymerization systems of the present embodiments, in which a metal-ligand complex of Formula (I) function as a procatalyst that may be activated to form a catalyst to an olefin polymerization reaction, may demonstrate improved catalytic performance over systems including conventional polymerization catalysts. The olefin polymerization systems of the present disclosure may provide polymers having a lower polydispersity index (PDI) than those produced by conventional catalyst systems and may be able to perform with higher productivity, even at higher temperatures.

Co-Catalyst Component

The procatalyst metal-ligand complex of Formula (I) may be rendered catalytically active by contacting it to, or combining it with, an activating co-catalyst, or by using an activating technique such as those that are known in the art. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). As used herein, the term "alkyl aluminum" means a monoalkyl aluminum dihydride or monoalkylaluminum dihalide, a dialkyl aluminum hydride or dialkyl aluminum halide, or a trialkylaluminum. Aluminoxanes and their preparations are known at, for example, U.S. Pat. No. 6,103,657. Examples of preferred polymeric or oligomeric alumoxanes are methylalumoxane, triisobutylaluminum-modified methylalumoxane, and isobutylalumoxane. A suitable activating technique includes bulk electrolysis. Combinations of one or more of the foregoing activating co-catalysts and techniques are also contemplated.

Many Lewis acid activating co-catalysts may be suitable in the present embodiments. In some embodiments, the Lewis acid activating co-catalyst may include are Group 13 metal compounds containing from 1 to 3 hydrocarbyl substituents as described herein. In some embodiments, the Group 13 metal compounds include tri(hydrocarbyl)-substituted-aluminum or tri(hydrocarbyl)-boron compounds. In some embodiments, the Group 13 metal compounds include tri(($C_1$-$C_{10}$)alkyl)aluminum or tri(($C_6$-$C_{18}$)aryl)boron compounds and halogenated (including perhalogenated) derivatives thereof. In some embodiments, the Group 13 metal compounds include tris(fluoro-substituted phenyl)boranes, in other embodiments, tris(pentafluorophenyl)borane. In some embodiments, the activating co-catalyst may be a tris(($C_1$-$C_{20}$)hydrocarbyl)methane borate (e.g., trityl tetrakis(pentafluorophenyl)borate) or a tri(($C_1$-$C_{20}$)hydrocarbyl) ammonium tetra(($C_1$-$C_{20}$)hydrocarbyl)borate (e.g., bis(octadecyl)methylammonium tetrakis(pentafluorophenyl)borate). As used herein, the term "ammonium" refers to a nitrogen cation that is a (($C_1$-$C_{20}$)hydrocarbyl)$_4$N$^+$, a (($C_1$-$C_{20}$)hydrocarbyl)$_3$N(H)$^+$, a (($C_1$-$C_{20}$)hydrocarbyl)$_2$N(H)$_2^+$, ($C_1$-$C_{20}$)hydrocarbylN(H)$_3^+$, or NH$_4^+$, wherein each ($C_1$-$C_{20}$) hydrocarbyl may be the same or different.

Many combinations of neutral Lewis acid activating co-catalysts are contemplated. In some embodiments, the neutral Lewis acid activating co-catalyst may include mixtures comprising a combination of a tri(($C_1$-$C_4$)alkyl)aluminum and a halogenated tri(($C_6$-$C_{18}$)aryl)boron compound, especially a tris(pentafluorophenyl)borane. Other possible embodiments include combinations of such neutral Lewis acid mixtures with a polymeric or oligomeric alumoxane, and combinations of a single neutral Lewis acid, especially tris(pentafluorophenyl)borane with a polymeric or oligomeric alumoxane. In some embodiments the ratios of numbers of moles of (metal-ligand complex):(tris(pentafluorophenylborane): (alumoxane) [e.g., (Group 4 metal-ligand complex): (tris(pentafluoro-phenylborane):(alumoxane)] are from 1:1:1 to 1:10:30, in other embodiments they may be from 1:1:1.5 to 1:5:10.

Many activating co-catalysts and activating techniques have been previously taught with respect to different metal-ligand complexes in the following USPNs: U.S. Pat. Nos. 5,064,802; 5,153,157; 5,296,433; 5,321,106; 5,350,723; 5,425,872; 5,625,087; 5,721,185; 5,783,512; 5,883,204; 5,919,983; 6,696,379; and 7,163,907. Examples of suitable hydrocarbyloxides are disclosed in U.S. Pat. No. 5,296,433. Examples of suitable Brønsted acid salts for addition polymerization catalysts are disclosed in U.S. Pat. Nos. 5,064,802; 5,919,983; 5,783,512. Examples of suitable salts of a cationic oxidizing agent and a non-coordinating, compatible anion as activating co-catalysts for addition polymerization catalysts are disclosed in U.S. Pat. No. 5,321,106. Examples of suitable carbenium salts as activating co-catalysts for addition polymerization catalysts are disclosed in U.S. Pat. No. 5,350,723. Examples of suitable silylium salts as activating co-catalysts for addition polymerization catalysts are disclosed in U.S. Pat. No. 5,625,087. Examples of suitable complexes of alcohols, mercaptans, silanols, and oximes with tris(pentafluorophenyl)borane are disclosed in U.S. Pat.

No. 5,296,433. Some of these catalysts are also described in a portion of U.S. Pat. No. 6,515,155 B1 beginning at column 50, at line 39, and going through column 56, at line 55, only the portion of which is incorporated by reference herein.

In some embodiments, the procatalyst metal-ligand complex of Formula (I) may be activated to form an active catalyst composition by combination with one or more co-catalyst such as a cation forming co-catalyst, a strong Lewis acid, or a combination thereof. Suitable co-catalysts for use include polymeric or oligomeric aluminoxanes, especially methyl aluminoxane, as well as inert, compatible, non-coordinating, ion forming compounds. Exemplary suitable co-catalysts include, but are not limited to modified methyl aluminoxane (MMAO); bis(hydrogenated tallow alkyl)methylammonium tetrakis(pentafluorophenyl)borate; triethyl aluminum (TEA); and any combinations thereof.

In some embodiments, one or more of the foregoing activating co-catalysts may be used in combination with each other. In some particular embodiments, a mixture of a tri(($C_1$-$C_4$)hydrocarbyl)aluminum, tri(($C_1$-$C_4$)hydrocarbyl)borane, or an ammonium borate with an oligomeric or polymeric alumoxane compound may be used.

In some embodiments, the ratio of total number of moles of one or more metal-ligand complexes of Formula (I) to total number of moles of one or more of the activating co-catalysts may be from 1:10,000 to 100:1. In some embodiments, the ratio is at least 1:5000, in some other embodiments, at least 1:1000; and 10:1 or less, and in other embodiments, 1:1 or less. When an alumoxane alone is used as the activating co-catalyst, the number of moles of the alumoxane that are employed may be at least 100 times the number of moles of the metal-ligand complex of Formula (I). When tris(pentafluorophenyl)borane alone is used as the activating co-catalyst, in some embodiments, the number of moles of the tris(pentafluorophenyl)borane that are employed to the total number of moles of one or more metal-ligand complexes of Formula (I) may be from 1:5 to 1:10, in some other embodiments, from 1:1 to 1:6, in other embodiments, from 1:1 to 1:5. The remaining activating co-catalysts are generally employed in approximately mole quantities equal to the total mole quantities of one or more metal-ligand complexes of Formula (I).

Polyolefin Compositions

Embodiments of the present disclosure additionally relate to polyolefin compositions comprising a polymerization reaction product of one or more olefin monomers in the presence of the olefin polymerization catalyst system including at least one metal-ligand complex of Formula (I) as a procatalyst. For example, the polyolefin compositions comprise a reaction product of one or more olefinic monomers with the olefin polymerization catalyst system under polymerization conditions and in the presence of one or more co-catalysts and/or scavengers. The polyolefin composition may be, for example, an ethylene-based polymer, such as homopolymers and/or interpolymers (including copolymers) of ethylene and optionally one or more co-monomers such as α-olefins. Such ethylene-based polymers may have a density in the range of 0.860 to 0.973 g/cm³. All individual values and subranges from 0.860 to 0.973 g/cm³ are included herein and disclosed herein; for example, the density can be from a lower limit of 0.860, 0.880, 0.885, 0.900, 0.905, 0.910, 0.915, or 0.920 g/cm³ to an upper limit of 0.973, 0.963, 0.960, 0.955, 0.950, 0.925, 0.920, 0.915, 0.910, or 0.905 g/cm³. As used herein, the term "ethylene-based polymer" refers to a polymer having greater than 50 mol % units derived from ethylene monomer.

In some embodiments, the ethylene-based polymers may have a long chain branching frequency in the range of from 0.0 to 3 long chain branches (LCB) per 1000 carbon atoms. In one embodiment, the ethylene-based polymers can have a molecular weight distribution ($M_w/M_n$) (measured according to the conventional gel permeation chromatography "GPC" method) in the range of from greater than or equal to 2.0. All individual values and subranges from greater than or equal to 2 are included herein and disclosed herein; for example, the ethylene/α-olefin copolymer may have a molecular weight distribution ($M_w/M_n$) in the range of from 2 to 20; or in the alternative, the ethylene/α-olefin interpolymer may have a molecular weight distribution ($M_w/M_n$) in the range of from 2 to 5.

In some embodiments, the ethylene-based polymers may have a molecular weight distribution, $M_w/M_n$, of less than 2, particularly in embodiments in which chain transfer agents are used in the polymerization. All individual values and subranges less than 2 are included and disclosed herein. For example, the $M_w/M_n$ of the ethylene-based polymers may be less than 2, less than 1.9, less than 1.8, or less than 1.5. In a particular embodiment, the ethylene-based polymer has a molecular weight distribution from 0.5 to 2.

In some embodiments, the ethylene-based polymers may have a molecular weight ($M_w$) in the range of from equal to or greater than 20,000 g/mole, for example, in the range of from 20,000 to 1,800,000 g/mole, or in the alternative, from 20,000 to 350,000 g/mole, or in the alternative, from 100,000 to 750,000 g/mole.

In some embodiments, the ethylene-based polymers may have a melt index ($I_2$) in the range of 0.02 to 200 g/10 minutes. All individual values and subranges from 0.02 to 200 g/10 minutes are included and disclosed herein; for example, the melt index ($I_2$) can be from a lower limit of 0.1, 0.2, 0.5, 0.6, 0.8, 1, 1.5, 2.0, 2.5, 3.0, 3.5, 4.0, 4.5, 5.0, 10, 15, 20, 30, 40, 50, 60, 80, 90, 100, or 150 g/10 minutes, to an upper limit of 0.9, 1, 1.5, 2.0, 2.5, 3.0, 3.5, 4.0, 4.5, 5.0, 10, 15, 20, 30, 40, 50, 60, 80, 90, 100, 150, or 200 g/10 minutes.

In some embodiments, the ethylene-based polymers may have a melt flow ratio ($I_{10}/I_2$) in the range of from 5 to 30. All individual values and subranges from 5 to 30 are included herein and disclosed herein; for example, the melt flow ratio ($I_{10}/I_2$) can be from a lower limit of 5, 5.5, 6, 6.5, 8, 10, 12, 15, 20, or 25 to an upper limit of 5.5, 6, 6.5, 8, 10, 12, 15, 20, 25, or 30.

The ethylene-based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The ethylene-based polymers of the present disclosure may contain any amounts of additives. The ethylene-based polymers may comprise from about 0 to about 10 percent by the combined weight of such additives, based on the weight of the ethylene-based polymers and the one or more additives. The ethylene-based polymers may further include fillers, which may include, but are not limited to, organic or inorganic fillers. Such fillers may include calcium carbonate, talc, or $Mg(OH)_2$, which may be present in levels from about 0 to about 20 percent, based on the weight of the inventive ethylene-based polymers and the one or more additives and/or fillers. In some embodiments, the ethylene-based polymers may further be blended with one or more polymers to form a blend.

The ethylene-based polymers may include less than 50 mole percent of units derived from one or more α-olefin co-monomers. All individual values and subranges from less than 50 mole percent are included and disclosed herein; for example, the ethylene-based polymers may comprise from less than 30 mole percent of units derived from one or more α-olefin co-monomers; less than 20 mole percent of units derived from one or more α-olefin co-monomers; or from 1 to 20 mole percent of units derived from one or more α-olefin co-monomers; or from 1 to 10 mole percent of units derived from one or more α-olefin co-monomers.

In some embodiments, the α-olefin co-monomers may have no more than 20 carbon atoms. For example, the α-olefin co-monomers may have from 3 to 10 carbon atoms, such as from 3 to 8 carbon atoms. Specific examples of α-olefin co-monomers include, but are not limited to, propylene, 1-butene, 1-pentene, 1-hexene, 1-heptene, 1-octene, 1-nonene, 1-decene, and 4-methyl-1-pentene. The one or more α-olefin co-monomers may, for example, be selected from the group consisting of propylene, 1-butene, 1-hexene, and 1-octene; or in the alternative, from the group consisting of 1-hexene and 1-octene.

The ethylene-based polymers may comprise greater than 50 mole percent of units derived from ethylene. All individual values and subranges from greater than 50 mole percent are included herein and disclosed herein; for example, the ethylene-based polymers may comprise at least 52 mole percent of units derived from ethylene; or in the alternative, at least 65 percent mole percent of units derived from ethylene; or in the alternative, at least 85 mole percent of units derived from ethylene; or in the alternative, from 50 to 100 mole percent of units derived from ethylene; or in the alternative, from 80 to 100 mole percent of units derived from ethylene.

In some embodiments, the ethylene-based polymer may comprise an olefin block copolymer prepared according to the aforementioned chain-shuttling polymerization process. The olefin block copolymer or poly(ethylene alpha-olefin) block copolymer may comprise an ethylene-derived hard segment (i.e., polyethylene hard segment) and a soft segment comprising residuals from the alpha-olefin and ethylene. The residuals of the alpha-olefin and ethylene may be approximately randomly distributed in the soft segment. In some embodiments, the polyethylene hard segment may be characterizable as having less than 5 mole percent (mol %) of a residual of the alpha-olefin covalently incorporated therein. In some embodiments, the poly(ethylene alpha-olefin) block copolymer may be characterizable as having a melting temperature of greater than 100 degrees Celsius (° C.), such as greater than 120° C., as determined by Differential Scanning Calorimetry using the procedure subsequently described.

The poly(ethylene alpha-olefin) block copolymers may comprise ethylene residuals and one or more copolymerizable α-olefin co-monomer residuals (i.e., ethylene and one or more copolymerizable α-olefin co-monomers in polymerized form). The poly(ethylene alpha-olefin) block copolymers may be characterized by multiple blocks or segments of two or more polymerized monomer units differing in chemical or physical properties. That is, the ethylene/α-olefin interpolymers may be block interpolymers, such as multi-block interpolymers or copolymers. The terms "interpolymer" and copolymer" are used interchangeably herein.

In some embodiments, the multi-block copolymer can be represented by the following formula: (AB)n, where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a linear fashion, not in a branched or a star fashion. As used herein, the term "hard segments" refers to blocks of polymerized units in which ethylene residuals are present in an amount greater than 95 weight percent, and preferably greater than 98 weight percent in the poly(ethylene alpha-olefin) block copolymers. In other words, the co-monomer (i.e., alpha-olefin) residuals content in the hard segments is less than 5 wt %, such as less than 2 wt %. In some embodiments, the hard segments comprise all or substantially all ethylene residuals. The phrases "polyethylene hard segment" and "ethylene-derived hard segment" are synonymous and mean the hard segment portion of a poly(ethylene alpha-olefin) block copolymer. In contrast, as used herein, the term "soft segments" refers to blocks of polymerized units in which the co-monomer (alpha-olefin) residuals content is greater than 5 wt %, such as greater than 8 wt %, greater than 10 wt %, or greater than 15 wt % in the poly(ethylene alpha-olefin) block copolymers. In some embodiments, the co-monomer residuals content in the soft segments can be greater than 20 wt %, greater than 25 wt %, greater than 30 wt %, greater than 35 wt %, greater than 40 wt %, greater than 45 wt %, greater than 50 wt %, or greater than 60 wt %.

Polymerization Process

Further embodiments of the disclosure relate to olefin polymerization processes that include polymerizing one or more olefin monomers in the presence of the olefin polymerization catalyst system including a metal-ligand complex of Formula (I). The olefin polymerization catalyst system may be in accordance with any of the embodiments previously described.

Many polymerization processes may be employed to produce the polyolefin composition according to the present invention. Such polymerization processes include, but are not limited to, solution polymerization process, particle forming polymerization process, and combinations thereof using one or more conventional reactors, such as loop reactors, isothermal reactors, fluidized bed reactors, stirred tank reactors, batch reactors in parallel, series, and/or any combinations thereof. In some embodiments, the polyolefin composition according to the present disclosure may, for example, be produced via solution-phase polymerization process using one or more loop reactors, isothermal reactors, and combinations thereof.

In general, the solution phase polymerization process may occur in one or more well-stirred reactors such as one or more loop reactors or one or more spherical isothermal reactors at a temperature in the range of from 120° C. to 300° C.; for example, from 160° C. to 215° C., and at pressures in the range of from 300 to 1500 psi; for example, from 400 to 750 psi. The residence time in solution phase polymerization process may range from 2 to 30 minutes; for example, from 5 to 15 minutes. Ethylene, one or more solvents, one or more high temperature olefin polymerization catalyst systems, one or more co-catalysts and/or scavengers, and optionally one or more co-monomers may be fed continuously to the one or more reactors. Possible solvents include, but are not limited to, isoparaffins. Such solvents may be commercially available under the name ISOPAR™ E from ExxonMobil Chemical Co., (Houston, Tex.). The resultant mixture of the ethylene-based polymer and solvent may then removed from the reactor and the ethylene-based polymer may be isolated. The solvent may be recovered via a solvent recovery unit, such as a heat exchanger and vapor liquid separator drum, and is then may be recycled back into the polymerization system.

In some embodiments, the ethylene-based polymer may be produced via solution polymerization in a single reactor system, such as a single loop reactor system, where ethylene and optionally one or more α-olefins may be polymerized in the presence of one or more high temperature olefin polymerization catalyst systems, optionally, one or more other catalysts, and optionally, one or more co-catalysts. In some embodiments, the ethylene-based polymer may be produced via solution polymerization in a dual reactor system, for example, a dual loop reactor system, where ethylene and optionally, one or more α-olefins may be polymerized in the presence of one or more an olefin polymerization catalyst systems, optionally, one or more other catalysts, and optionally, one or more co-catalysts. In some embodiments, the ethylene-based polymer may be produced via solution polymerization in a dual reactor system, for example, a dual loop reactor system, where ethylene and optionally one or more α-olefins are polymerized in the presence of one or more high temperature olefin polymerization catalyst systems, as described herein, in both reactors.

In some embodiments, the ethylene-based polymer may be made using a gas phase polymerization process, such as utilizing a fluidized bed reactor. This type reactor and means for operating the reactor are described in, for example, U.S. Pat. Nos. 3,709,853; 4,003,712; 4,011,382; 4,302,566; 4,543,399; 4,882,400; 5,352,749; 5,541,270; EP-A-0 802 202 and Belgian Patent No. 839,380. These patents disclose gas-phase polymerization processes in which the polymerization medium is either mechanically agitated or fluidized by the continuous flow of the gaseous monomer and diluent.

In some embodiments, the polymerization process may be a continuous gas-phase process, such as a fluid bed process. The fluid bed reactor may include a reaction zone and a so-called velocity reduction zone. The reaction zone may contain a bed of growing polymer particles, formed polymer particles, and a minor amount of catalyst particles fluidized by the continuous flow of the gaseous monomer and diluent to remove heat of polymerization through the reaction zone. Optionally, some of the re-circulated gases may be cooled and compressed to form liquids that may increase the heat removal capacity of the circulating gas stream when readmitted to the reaction zone. A suitable rate of gas flow may be readily determined by simple experiment. The makeup of gaseous monomer to the circulating gas stream may be at a rate equal to the rate at which particulate polymer product and monomer associated therewith is withdrawn from the reactor, and the composition of the gas passing through the reactor may be adjusted to maintain an essentially steady state gaseous composition within the reaction zone. The gas leaving the reaction zone may be passed to the velocity reduction zone where entrained particles are removed. Finer entrained particles and dust may optionally be removed in a cyclone and/or fine filter. The gas may be passed through a heat exchanger wherein the heat of polymerization may be removed, compressed in a compressor, and then returned to the reaction zone.

The reactor temperature of the fluid bed process may range from 30° C. to 40° C. or 50° C. to 90° C. or 100° C. or 110° C. or 120° C. In general, the reactor temperature may be operated at the highest temperature that is feasible, taking into account the sintering temperature of the polymer product within the reactor. In such a fluid bed process, the polymerization temperature, or reaction temperature should be below the melting or "sintering" temperature of the polymer to be formed. Thus, the upper temperature limit in one embodiment is the melting temperature of the polyolefin produced in the reactor.

In some embodiments, a slurry polymerization process can also be used. A slurry polymerization process generally uses pressures in the range of from 1 to 50 atmospheres and even greater and temperatures in the range of from 0° C. to 120° C., and more particularly from 30° C. to 100° C. In a slurry polymerization, a suspension of solid, particulate polymer is formed in a liquid polymerization diluent medium to which ethylene and co-monomers and, often, hydrogen along with catalyst may be added. The suspension, including diluent, is intermittently or continuously removed from the reactor where the volatile components are separated from the polymer and recycled, optionally, after a distillation, to the reactor. The liquid diluent employed in the polymerization medium may be an alkane having from 3 to 7 carbon atoms, and in some embodiments, may be a branched alkane. In some embodiments, the medium employed should be liquid under the conditions of polymerization and relatively inert. When a propane medium is used, the process may be operated above the reaction diluent critical temperature and pressure. In one embodiment, a hexane, isopentane or isobutane medium may be employed.

Some embodiments of the disclosure may utilize particle form polymerization, a process where the temperature is kept below the temperature at which the polymer goes into solution. Other slurry processes include those employing a loop reactor and those utilizing a plurality of stirred reactors in series, parallel, or combinations thereof. Non-limiting examples of slurry processes include continuous loop or stirred tank processes. Other examples of slurry processes are described in U.S. Pat. No. 4,613,484 and Metallocene-Based Polyolefins Vol. 2 pp. 322-332 (2000).

In some embodiments, the procatalyst comprising the metal-ligand complex of Formula (I) may be combined with one or more additional catalysts in a polymerization process. Suitable additional catalysts include any compound or combination of compounds that is adapted for preparing polymers of the desired composition or type. Both heterogeneous and homogeneous catalysts may be employed. Examples of heterogeneous catalysts include the well-known Ziegler-Natta compositions, particularly Group 4 metal halides supported on Group 2 metal halides or mixed halides and alkoxides and the well-known chromium or vanadium based catalysts. For ease of use and for production of narrow molecular weight polymer segments in solution, in some embodiments, the catalysts for use herein may be homogeneous catalysts comprising a relatively pure organometallic compound or metal complex, particularly compounds or complexes based oil metals selected from Groups 3-10 or the Lanthanide series of the Periodic Table of the Elements. It is preferred that any catalyst employed herein not significantly detrimentally affect the performance of the other catalyst under the conditions of the present polymerization. Desirably, no catalyst is reduced in activity by greater than 25%, more preferably greater than 10% under the conditions of the present polymerization.

In some embodiments, the procatalyst comprising the metal-ligand complex of Formula (I) may be combined with one or more additional catalysts and a chain shuttling agent in a chain-shuttling polymerization process to prepare the aforementioned olefin block copolymer. Suitable catalysts for use include any compound or combination of compounds that is adapted for preparing polymers of the desired composition or type and are capable of chain shuttling. Non-limiting examples of chain shuttling agents include dialkylzinc reagents and trialkylaluminum reagents. Non-limiting examples of such catalysts include the following structures:

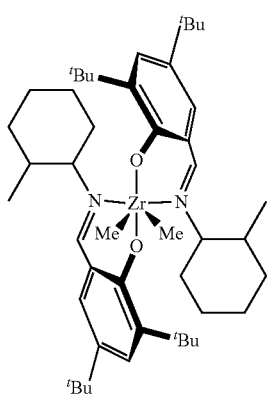

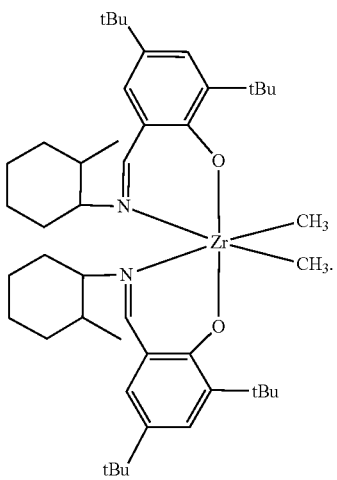

The procatalyst comprising the metal-ligand complex of Formula (I) may be activated to form an active catalyst composition by combination with one or more co-catalysts, as previously described.

EXAMPLES

Reference is made to the following examples to illustrate one or more features or embodiments of the present disclosure. The examples are in no way intended to limit the scope of the present disclosure or of the appended claims.

The examples demonstrate that the olefin polymerization catalyst systems according to embodiments of the present disclosure possess improved properties that facilitate the production of high molecular weight ($M_w$) polyolefins having narrow polydispersities and especially low octene incorporation.

Pro-Catalyst Components

Comparative Pro-catalyst, C1, has the following structure:

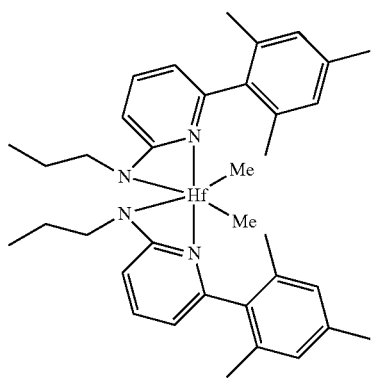

Inventive Catalysts, 1-19, have the structures shown below:

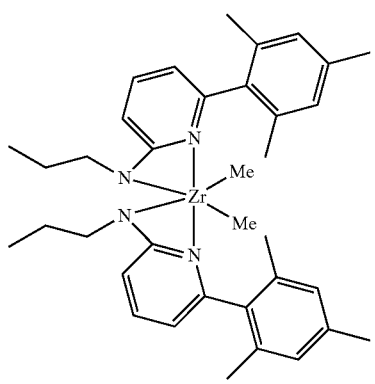

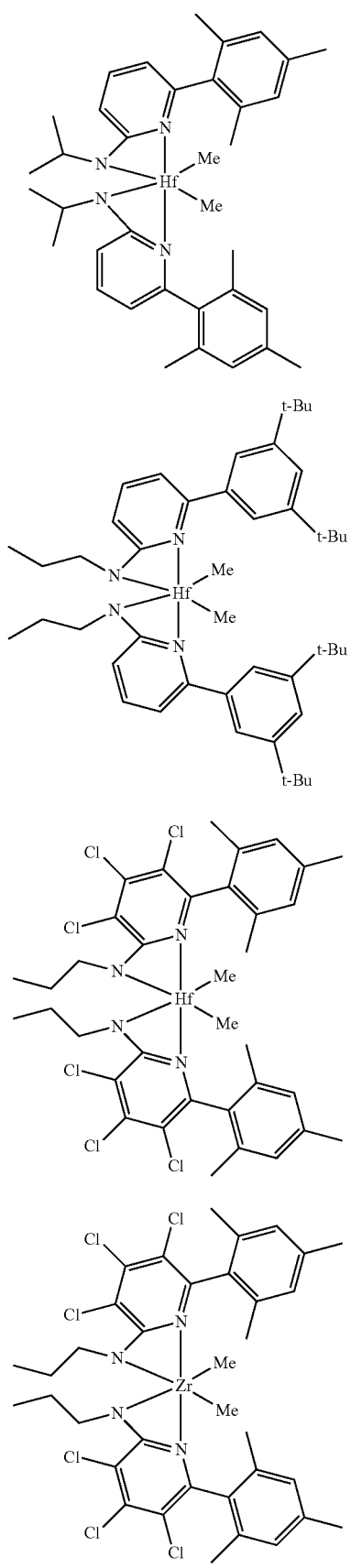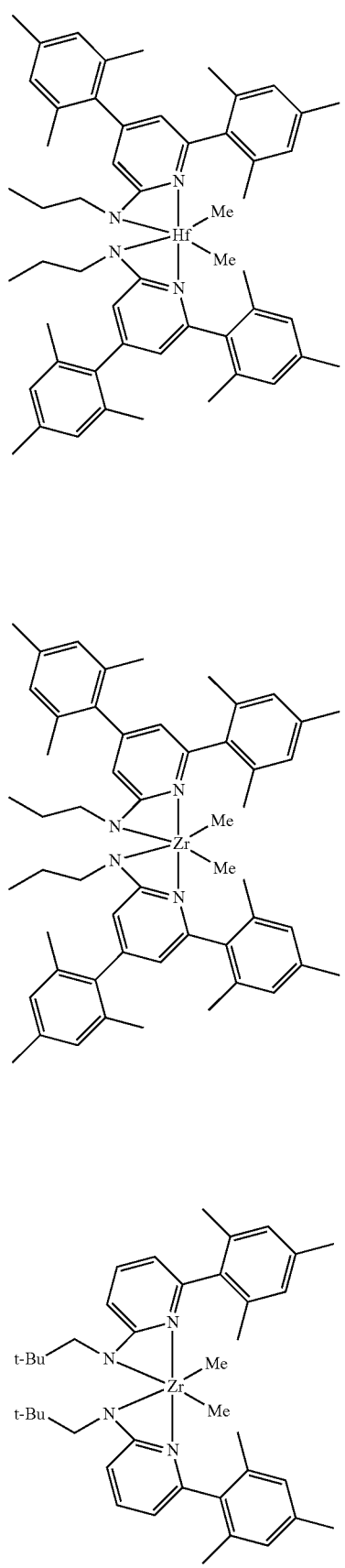

-continued
10
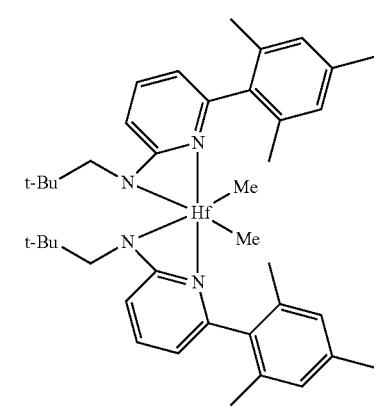
11
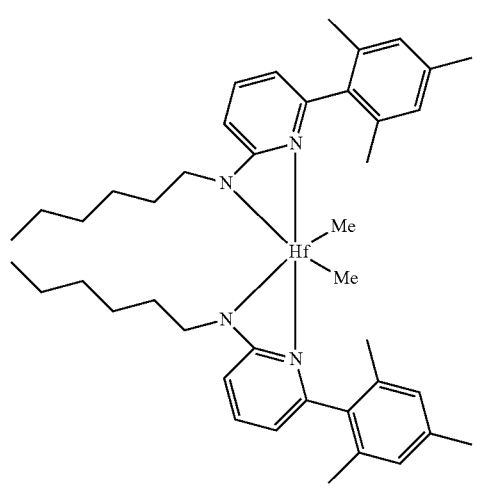
12
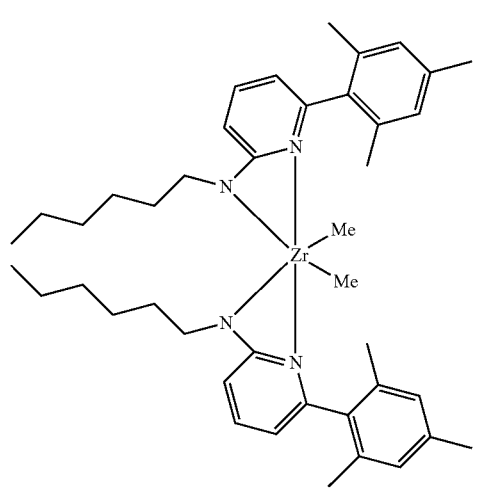
-continued
13
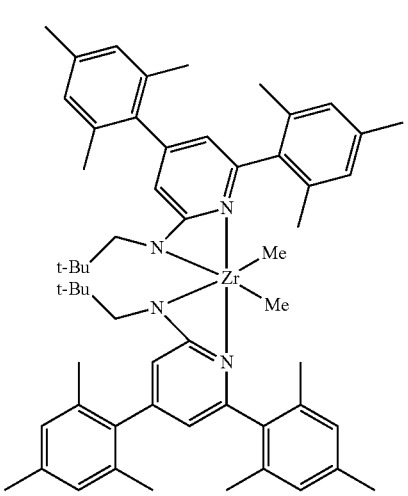
14
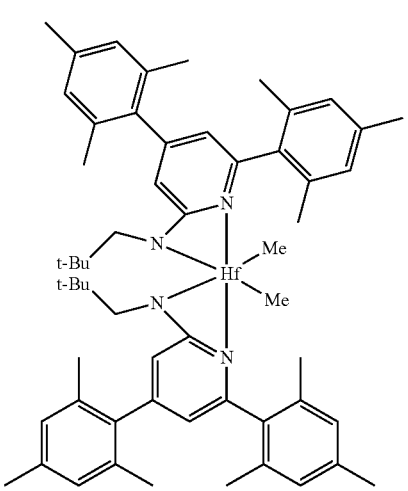
15
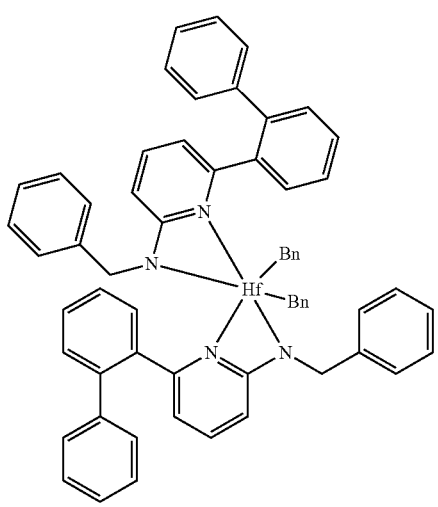

16

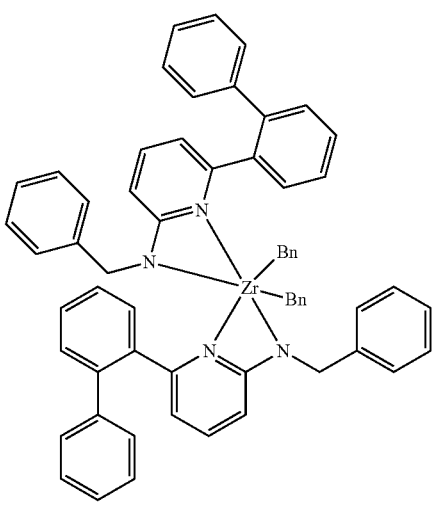

19

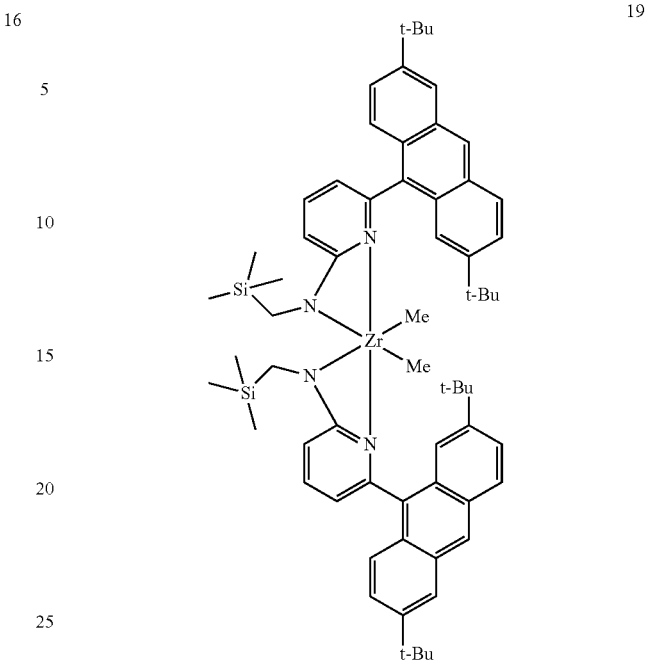

17

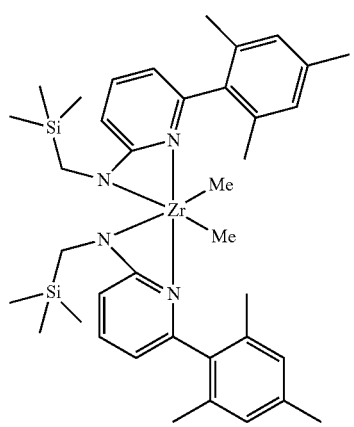

18

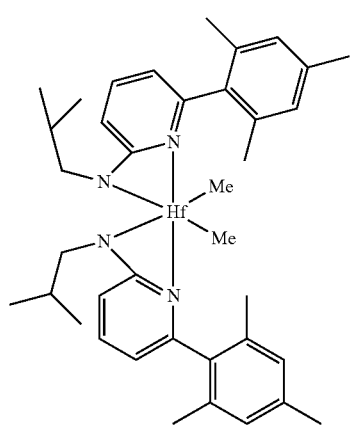

General Procedure for Metallation of 2-Aminopyridine Ligands.

Inside a glovebox a vial is charged with HfCl$_4$ or ZrCl$_4$ (0.23 mmol) and toluene (5 mL). The solution is cooled to −30° C. then MeMgBr (0.35 mL, 3 M, 1.04 mmol) is added. The solution is allowed to stir for 2 min, then a cold toluene (5 mL) suspension of the ligand (0.23 mmol) is added. The solution quickly changes to a yellow color and is allowed to stir at room temperature for 2 h. All volatiles are removed and the residue is triturated with hexanes. The residue is taken up in hexanes and filtered through a disposable frit. The yellow solution is evacuated to dryness, then dissolved in ether. The yellow solution is concentrated and cooled to −30° C. to give yellow crystals of the product.

Synthesis of Inventive Procatalyst 1:

Inventive Procatalyst 1 was prepared following the General Procedure for metallation of 2-aminopyridine ligands using ZrCl$_4$.

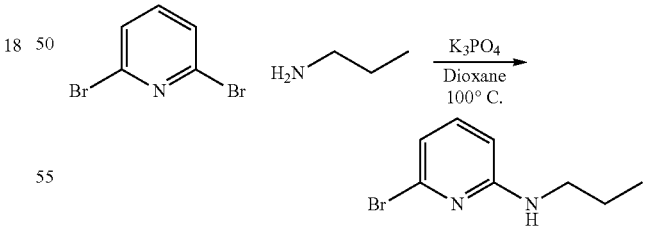

Synthesis Reaction of Procatalyst 1 (1 of 3)

A 40 milliliter (mL) vial was charged with the dibromopyridine (3.00 grams (g), 12.66 millimole (mmol)), K$_3$PO$_4$ (10.75 g, 50.66 mmol), and propylamine (3.00 g, 50.66 mmol). The vial was purged with nitrogen, and anhydrous dioxane (15 mL) was added and the reaction was heated to 100° C. for 3 days (d). All volatiles were removed and the residue was extracted with CH$_2$Cl$_2$ and washed with water. The organic layer was collected and all volatiles were removed. The crude product was purified by column chromatography (90:10 hexanes:EtOAc) to give the pure product. The yield was 1.59 g, or 58%.

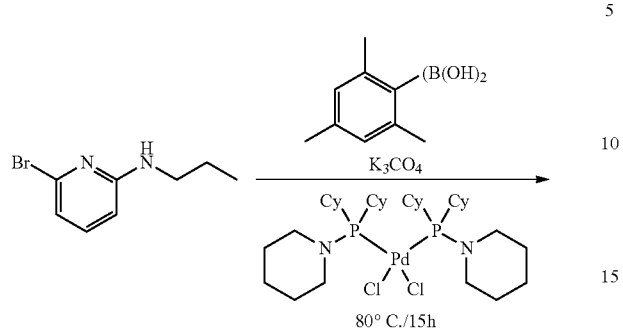

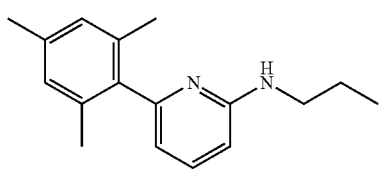

Synthesis Reaction of Procatalyst 1 (2 of 3)

A 40 mL vial was charged with the 2-Br-6-N"Pr-pyridine (0.580 g, 2.70 mmol), Mesityl boronic acid (0.386 g, 3.24 mmol), K$_3$PO$_4$ (0.859 g, 4.04 mmol), and toluene (8 mL). The vial was purged with nitrogen then the Pd catalyst (0.100 g, 0.13 mmol) was loaded and the reaction was heated to 80° C. for 15 hours (h). Water was added and the organic layer was extracted. All volatiles were removed and the crude product was purified by column chromatography (90:10 hexanes:ethyl acetate). The yield was 0.175 g, or 26%. The sample was evaluated using proton nuclear magnetic resonance ($^1$H NMR) spectroscopy, the results of which are as follows: $^1$H NMR (400 MHz, CDCl$_3$) δ 7.55-7.45 (m, 1H), 6.95-6.87 (m, 2H), 6.50 (dd, J=7.3, 0.7 Hz, 1H), 6.31 (d, J=8.3 Hz, 1H), 4.78 (s, 1H), 3.24-3.11 (m, 2H), 2.32 (s, 3H), 2.10 (s, 6H), 1.64 (h, J=7.3 Hz, 2H), 1.00 (t, J=7.4 Hz, 3H). $^{13}$C NMR (101 MHz, CDCl$_3$) δ 158.94, 158.45, 138.32, 137.68, 136.86, 135.60, 128.17, 113.42, 103.05, 44.32, 22.76, 21.07, 20.09, 11.57.

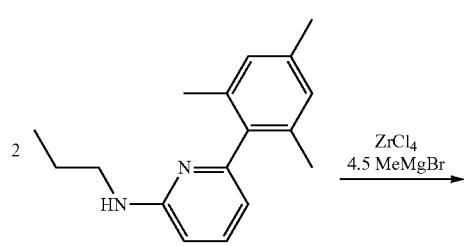

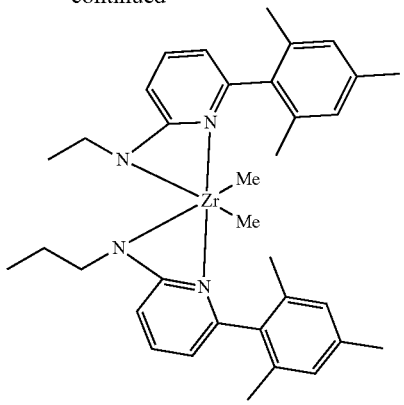

Synthesis Reaction of Inventive Procatalyst 1 (3 of 3)

The yield was 81%. The sample was evaluated using $^1$H NMR spectroscopy, the results of which are as follows: $^1$H NMR (400 MHz, C$_6$D$_6$) δ 6.95 (dd, J=8.6, 7.2 Hz, 2H), 6.70 (s, 4H), 5.84 (dd, J=7.2, 0.8 Hz, 2H), 5.76 (dd, J=8.6, 0.8 Hz, 2H), 2.77-2.66 (m, 4H), 2.12 (s, 6H), 1.91 (s, 12H), 1.53-1.36 (m, 4H), 0.87 (t, J=7.3 Hz, 6H), 0.67 (s, 6H). $^{13}$C NMR (101 MHz, C$_6$D$_6$) δ 171.81, 156.18, 140.96, 136.79, 136.37, 135.43, 127.82, 109.73, 101.24, 49.33, 47.83, 23.35, 20.69, 19.81, 11.81.

Synthesis of Inventive Procatalyst 2:

Inventive Procatalyst 2 was prepared following the General Procedure for metallation of 2-aminopyridine ligands using HfCl$_4$.

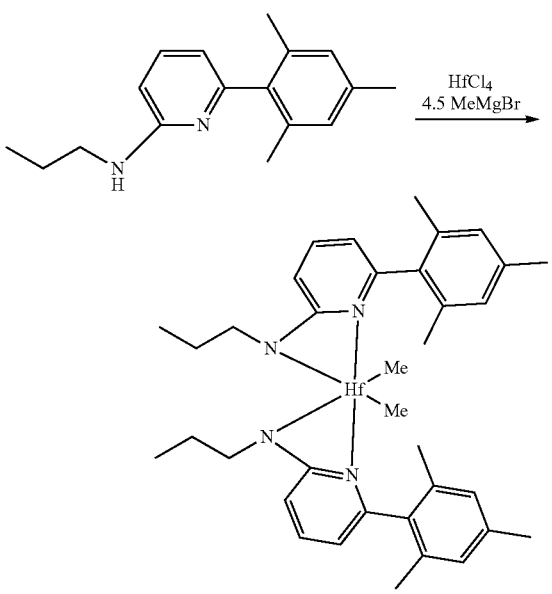

Synthesis Reaction of Inventive Procatalyst 2

The yield was 69%. The sample was evaluated using $^1$H NMR spectroscopy, the results of which are as follows: $^1$H NMR (400 MHz, C$_6$D$_6$) δ 6.96 (dd, J=8.6, 7.2 Hz, 2H), 6.69 (s, 4H), 5.88 (dd, J=7.2, 0.8 Hz, 2H), 5.73 (d, J=8.7 Hz, 2H), 2.69-2.57 (m, 4H), 2.14 (s, 6H), 1.87 (s, 12H), 1.39 (h, J=7.4 Hz, 4H), 0.86 (t, J=7.4 Hz, 6H), 0.49 (s, 6H). $^{13}$C NMR (101 MHz, C$_6$D$_6$) δ 170.89, 156.01, 140.76, 136.77, 136.42, 135.47, 127.79, 109.51, 101.92, 53.45, 48.72, 23.51, 20.69, 19.90, 11.80.

Synthesis of Inventive Procatalyst 3:

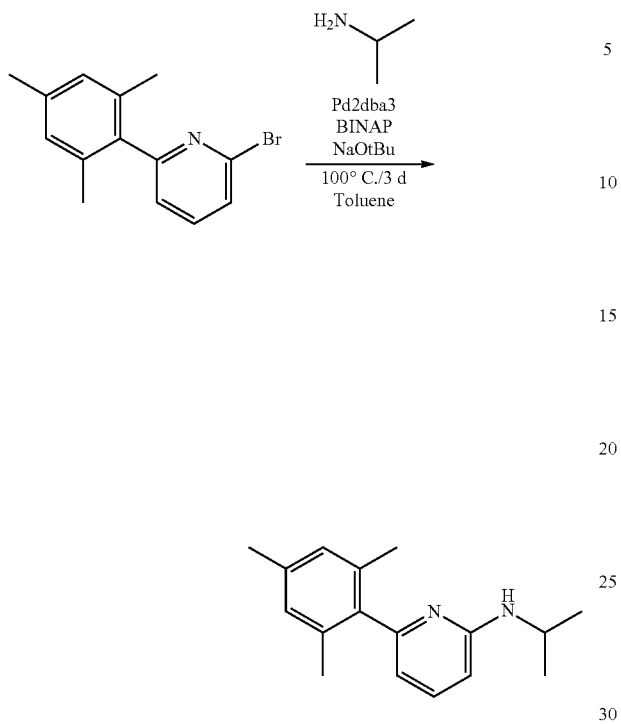

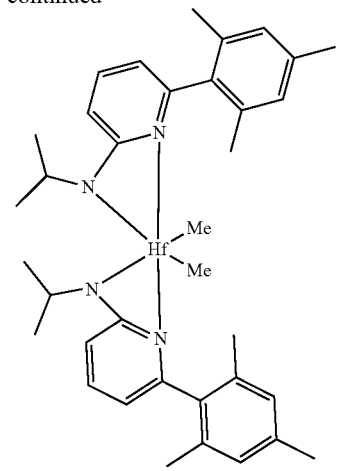

Synthesis Reaction of Inventive Procatalyst 3 (2 of 2)

The yield was 53%. The sample was evaluated using $^1$H NMR spectroscopy, the results of which are as follows: $^1$H NMR (400 MHz, C$_6$D$_6$) δ 6.96 (ddd, J=8.6, 7.2, 1.4 Hz, 2H), 6.68 (s, 4H), 5.87 (dd, J=7.2, 1.4 Hz, 2H), 5.81 (d, J=8.7 Hz, 2H), 3.14 (p, J=6.4 Hz, 2H), 2.13 (s, 6H), 1.88 (s, 12H), 1.01 (s, 12H), 0.45 (s, 6H).

Synthesis of Inventive Procatalyst 4:

Synthesis Reaction of Inventive Procatalyst 3 (1 of 2)

2-bromo-6-mesitylpyridine was synthesized as described in: Labonne, A.; Kribber, T.; Hintermann, L. *Org. Lett.* 2006, 8, 5853-5856. Inside a glove box, a 20 mL vial was charged with 2-mesityl-6-bromo-pyridine (0.370 g, 1.34 mmol), NaO$^t$Bu (0.286 g, 2.97 mmol), Pd$_2$dba$_3$ (0.061 g, 0.07 mmol), BINAP (0.042 g, 0.07 mmol), isopropylamine (0.135 g, 2.28 mmol), and toluene (8 mL). The reaction mixture was heated to 100° C. for 3 h, then removed from the glove box. Silica gel was added and all volatiles were removed. The solid was purified by column chromatography (hexanes:EtOAc 80:20). The yield was 0.220 g, or 65%. The sample was evaluated using $^1$H NMR spectroscopy, the results of which are as follows: $^1$H NMR (400 MHz, CDCl$_3$) δ 7.46 (dd, J=8.4, 7.3 Hz, 1H), 6.88 (s, 2H), 6.45 (dd, J=7.3, 0.6 Hz, 1H), 6.30 (d, J=8.3 Hz, 1H), 4.52 (s, 1H), 3.81 (p, J=6.2 Hz, 1H), 2.28 (s, 3H), 2.06 (s, 6H), 1.22 (d, J=6.4 Hz, 6H). $^{13}$C NMR (101 MHz, CDCl$_3$) δ 158.54, 158.15, 138.40, 137.58, 136.83, 135.60, 128.17, 113.32, 103.91, 43.25, 23.04, 21.09, 20.13.

Inventive Procatalyst 3 was prepared following the General Procedure for metallation of 2-aminopyridine ligands using HfCl$_4$.

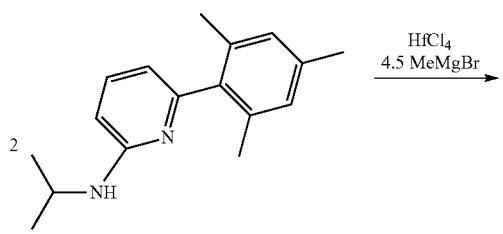

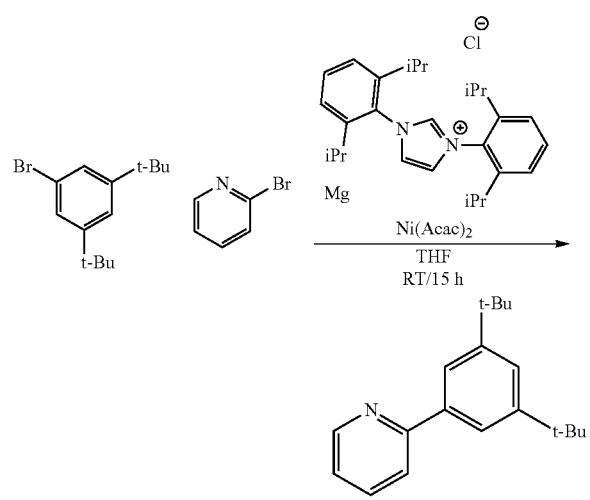

Synthesis Reaction of Inventive Procatalyst 4 (1 of 4)

Inside the glove box, a 100 mL jar was charged with Mg (0.340 g, 14.2 mmol) and THF (30 mL). Two drops of dibromoethane were added followed by 3,5-ditertbutylbromobenzene (1.91 g, 7.08 mmol). The reaction was stirred for 4 h at 50° C. and the solution changed to a pale yellow solution. A second 100 mL vial was charged with 2-bromopyridine (1.76 g, 7.43 mmol), Nickel acetylacetonate (0.055 g, 0.21 mmol), 2,6-diisopropylimidazolium chloride (0.090 g, 0.21 mmol) and THF (20 mL). The Grignard was gravity filtered through a disposable frit directly into the 2-bromopyridine solution. The color instantly changed to a green color followed by a dark brown color. The reaction was stirred for 3 d, quenched with brine and extracted with EtOAc. The organic layer was collected and all volatiles were removed. The crude product was purified by column chromatography (Hexanes:EtOAc 70:30). The yield was 1.25 g, or 66%. The sample was evaluated using 1H NMR spectroscopy, the results of which are as follows: ¹H NMR (400 MHz, CDCl₃) δ 8.73-8.66 (m, 1H), 7.83-7.78 (m, 2H), 7.76-7.68 (m, 2H), 7.50 (t, J=1.9 Hz, 1H), 7.23-7.16 (m, 1H), 1.42-1.37 (m, 18H). ¹³C NMR (101 MHz, CDCl₃) δ 158.73, 151.09, 149.56, 138.92, 136.50, 123.14, 121.69, 121.35, 120.93, 34.99, 31.51.

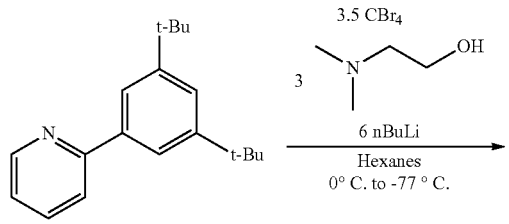

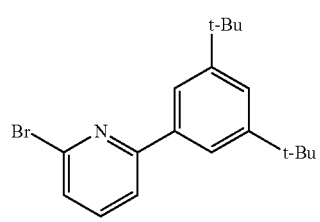

Synthesis Reaction of Inventive Procatalyst 4 (2 of 4)

A 100 mL round bottom flask was charged with dimethylaminoethanol (1.40 mL, 14.0 mmol) and hexanes (20 mL). The flask was purged with nitrogen then nBuLi (11.2 mL, 2.5 M, 28.0 mmol) was added dropwise at 0° C. The reaction was stirred for 30 min then a hexanes (10 mL) solution of 2-(3,5-di-tert-butylphenyl)pyridine (1.250 g, 4.67 mmol) was added dropwise. The solution turned to a dark brown and was stirred for 3 h. The solution was cooled to −77° C. then CBr₄ (5.43 g, 16.4 mmol) in hexanes (10 mL) was added dropwise. A precipitate formed and the reaction was stirred overnight at room temperature. Water was added to quench the reaction then ethyl acetate was added and the organic layer extracted. Silica was added to the solution and all volatiles were removed. The solid loaded onto a column and purified via column chromatography (90:10 hexanes:EtOAc). The yield was 1.33 g, or 82%. The sample was evaluated using ¹H NMR spectroscopy, the results of which are as follows: ¹H NMR (400 MHz, CDCl₃) δ 7.77 (dd, J=1.8, 0.5 Hz, 2H), 7.66 (dd, J=7.7, 0.8 Hz, 1H), 7.56 (td, J=7.7, 0.6 Hz, 1H), 7.52 (t, J=1.8 Hz, 1H), 7.38 (dd, J=7.8, 0.7 Hz, 1H), 1.44-1.33 (m, 18H). ¹³C NMR (101 MHz, CDCl₃) δ 159.93, 151.23, 142.03, 138.75, 137.28, 125.93, 123.83, 121.44, 119.40, 35.00, 31.48.

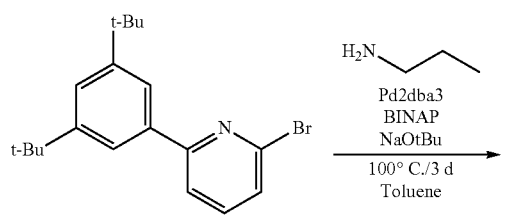

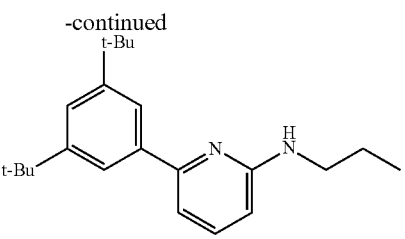

Synthesis Reaction of Inventive Procatalyst 4 (3 of 4)

Inside a glove box, a 20 mL vial was charged with 3,5-2-bromo-6-(3,5-di-tert-butylphenyl)pyridine (0.300 g, 0.87 mmol), NaO'Bu (0.185 g, 1.92 mmol), Pd₂dba₃ (0.040 g, 0.04 mmol), BINAP (0.027 g, 0.04 mmol), propylamine (0.087 g, 1.47 mmol), and toluene (8 mL). The reaction mixture was heated to 100° C. for 3 h, then removed from the glove box. Silica gel was added and all volatiles were removed. The solid was purified by column chromatography (hexanes:EtOAc 85:15). The yield was 0.190 g, or 68%. The sample was evaluated using ¹H NMR spectroscopy, the results of which are as follows: ¹H NMR (400 MHz, CDCl₃) δ 7.91 (d, J=1.9 Hz, 2H), 7.57-7.51 (m, 2H), 7.15-7.07 (m, 1H), 6.36 (d, J=7.9 Hz, 1H), 4.82 (t, J=5.6 Hz, 1H), 3.41-3.26 (m, 2H), 1.74 (hept, J=7.3 Hz, 2H), 1.48 (s, 18H), 1.07 (t, J=7.4 Hz, 3H). ¹³C NMR (101 MHz, CDCl₃) δ 158.83, 157.16, 150.73, 139.55, 137.93, 122.70, 121.37, 109.72, 104.44, 44.25, 35.03, 31.63, 22.92, 11.73.

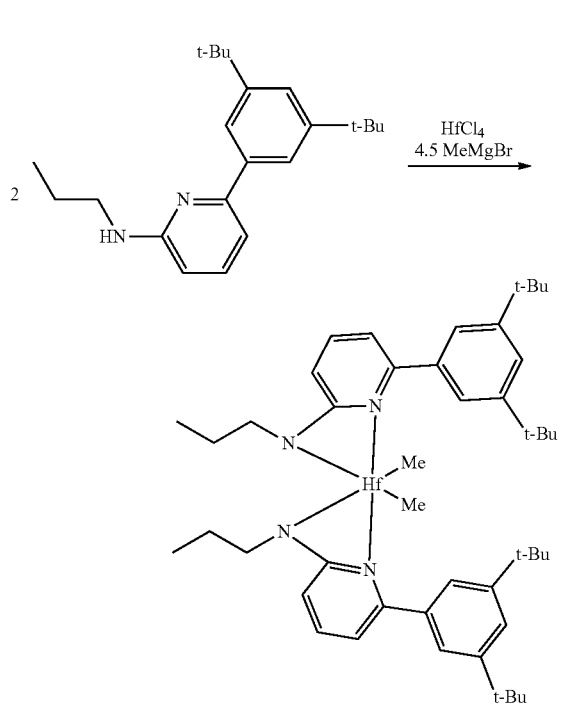

Synthesis Reaction of Inventive Procatalyst 4 (4 of 4)

Inventive Procatalyst 4 was prepared following the General Procedure for metallation of 2-aminopyridine ligands using HfCl₄. The yield was 72%. The sample was evaluated using ¹H NMR spectroscopy, the results of which are as follows: ¹H NMR (400 MHz, C₆D₆) δ 7.49 (t, J=1.8 Hz, 2H), 7.42 (d, J=1.9 Hz, 4H), 6.93 (dd, J=8.5, 7.3 Hz, 2H), 6.24 (dd, J=7.3, 0.7 Hz, 2H), 5.65-5.57 (m, 2H), 2.94 (t, J=7.1 Hz, 4H), 1.56-1.41 (m, 4H), 1.31 (s, 36H), 0.89 (t, J=7.4 Hz, 6H), 0.66 (s, 6H). ¹³C NMR (101 MHz, C₆D₆) δ

168.41, 157.22, 150.34, 140.56, 139.04, 122.81, 122.24, 109.19, 101.80, 54.74, 48.84, 34.68, 31.36, 23.20, 11.83.

Synthesis of Inventive Procatalyst 5:

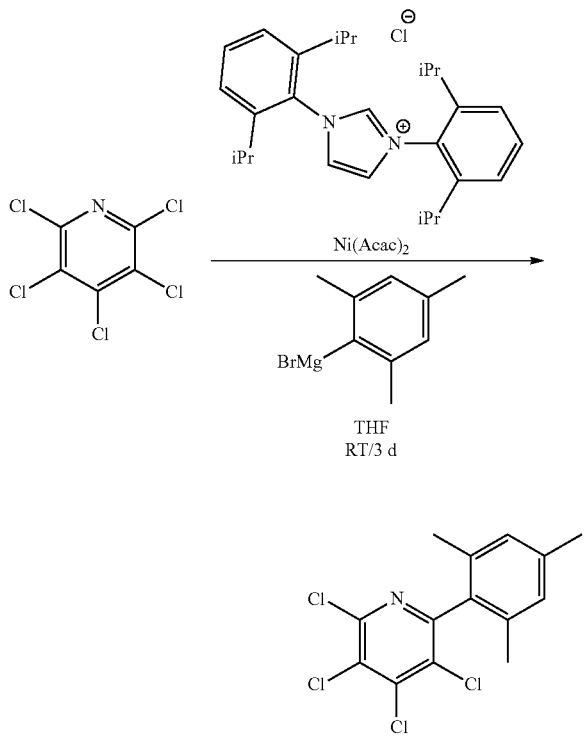

Synthesis Reaction of Inventive Procatalyst 5 (1 of 3)

Inside the glove box, a 100 mL jar was charged with pentachloropyridine (1.50 g, 5.97 mmol), Nickel acetylacetonate (0.046 g, 0.18 mmol), 2,6-diisopropylimidazolium chloride (0.076 g, 0.18 mmol) and THF (20 mL). The mesityl Grignard (1.0 M, 6.1 mL, 6.1 mmol) was slowly added to the solution. The color instantly changed to a green color followed by a dark brown color. The reaction was stirred for 3 d, quenched with brine and extracted with EtOAc. The organic layer was collected and all volatiles were removed. The crude product was purified by column chromatography (Hexanes:EtOAc 70:30). The yield was 1.85 g, or 93%. The sample was evaluated using $^1$H NMR spectroscopy, the results of which are as follows: $^1$H NMR (400 MHz, CDCl$_3$) δ 1H NMR (400 MHz, Chloroform-d) δ 7.01-6.85 (s, 2H), 2.32 (s, 3H), 1.99 (s, 6H). $^{13}$C NMR (101 MHz, CDCl$_3$) δ 156.53, 147.57, 143.31, 138.90, 135.26, 133.45, 130.53, 128.84, 128.40, 21.17, 19.51.

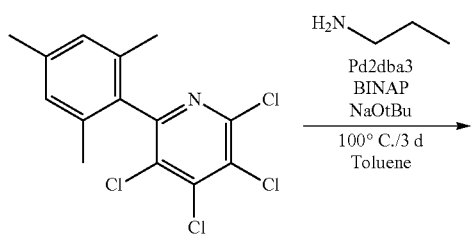

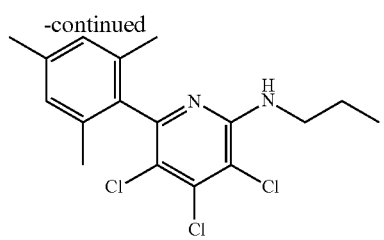

Synthesis Reaction of Inventive Procatalyst 5 (2 of 3)

Inside a glove box, a 20 mL vial was charged with 2-mesityl-tetrachloropyridine (0.907 g, 2.71 mmol), NaO$^t$Bu (0.578 g, 6.01 mmol), Pd$_2$dba$_3$ (0.124 g, 0.14 mmol), BINAP (0.084 g, 0.14 mmol), propylamine (0.176 g, 2.98 mmol), and toluene (8 mL). The reaction mixture was heated to 100° C. for 3 h, then removed from the glove box. Silica gel was added and all volatiles were removed. The solid was purified by column chromatography (hexanes:CH$_2$Cl$_2$ 50:50). The yield was 0.567 g, or 59%. The sample was evaluated using 1H NMR spectroscopy, the results of which are as follows: $^1$H NMR (400 MHz, CDCl$_3$) δ 7.07-6.96 (m, 2H), 5.22 (t, J=5.5 Hz, 1H), 3.52-3.41 (m, 2H), 2.41 (s, 3H), 2.12 (s, 6H), 1.62-1.71 (m, 2H), 1.01 (t, J=7.4 Hz, 3H). $^{13}$C NMR (101 MHz, CDCl$_3$) δ 154.47, 152.90, 140.00, 137.85, 135.91, 135.47, 128.21, 117.37, 112.53, 43.53, 22.91, 21.28, 19.55, 11.48.

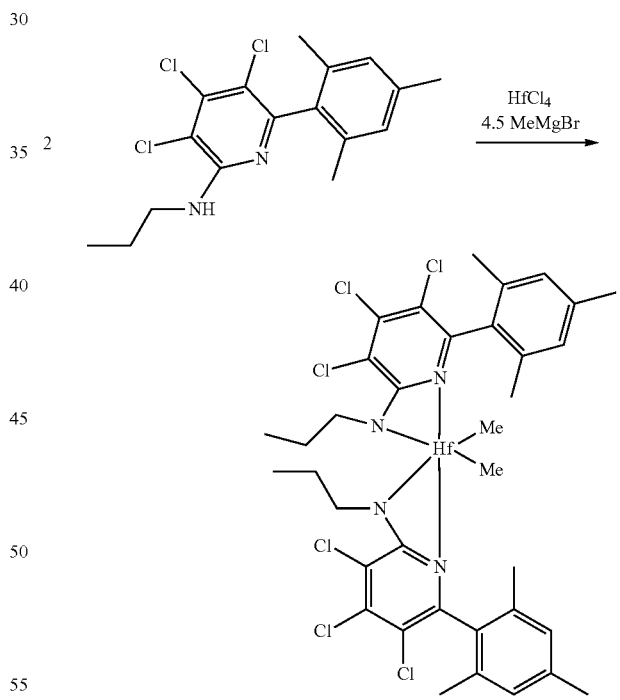

Synthesis Reaction of Inventive Procatalyst 5 (3 of 3)

Inventive Procatalyst 5 was prepared following the General Procedure for metallation of 2-aminopyridine ligands using HfCl$_4$. The yield was 75%. The sample was evaluated using $^1$H NMR spectroscopy, the results of which are as follows: $^1$H NMR (400 MHz, C$_6$D$_6$) δ 6.68 (s, 4H), 3.05 (s, 4H), 2.06 (s, 6H), 1.79 (s, 12H), 1.51 (h, J=7.5 Hz, 4H), 0.80 (t, J=7.3 Hz, 6H), 0.45 (s, 6H). $^{13}$C NMR (101 MHz, C$_6$D$_6$) δ 163.90, 153.09, 146.90, 138.37, 134.94, 132.84, 128.55, 115.14, 112.42, 57.43, 47.93, 27.11, 20.60, 19.22, 11.07.

Synthesis of Inventive Procatalyst 6:

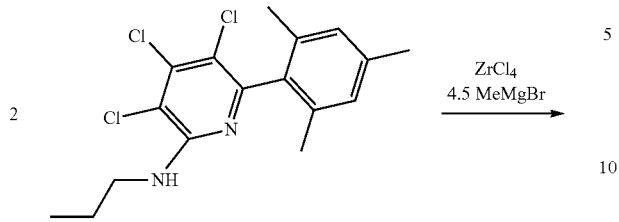

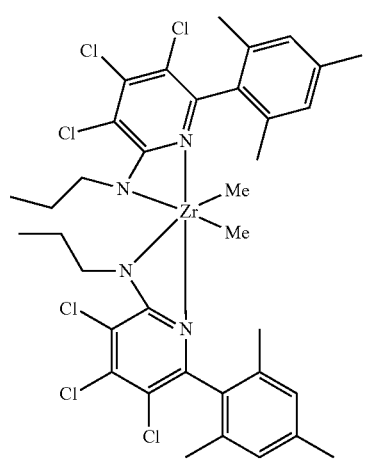

Synthesis Reaction of Inventive Procatalyst 6

Inventive Procatalyst 6 was prepared following the General Procedure for metallation of 2-aminopyridine ligands using ZrCl$_4$. The yield was 71%. The sample was evaluated using $^1$H NMR spectroscopy, the results of which are as follows: $^1$H NMR (400 MHz, C$_6$D$_6$) δ 6.66 (s, 4H), 3.28-3.11 (m, 4H), 2.04 (s, 6H), 1.83 (s, 12H), 1.56 (dq, J=14.8, 7.1 Hz, 4H), 0.81 (t, J=7.2 Hz, 6H), 0.62 (s, 6H). $^{13}$C NMR (101 MHz, C$_6$D$_6$) δ 164.66, 153.21, 146.85, 138.38, 135.02, 132.77 128.44, 114.88, 110.98, 52.42, 49.12, 26.84, 20.62, 19.22, 11.07.

Synthesis of Inventive Procatalyst 7

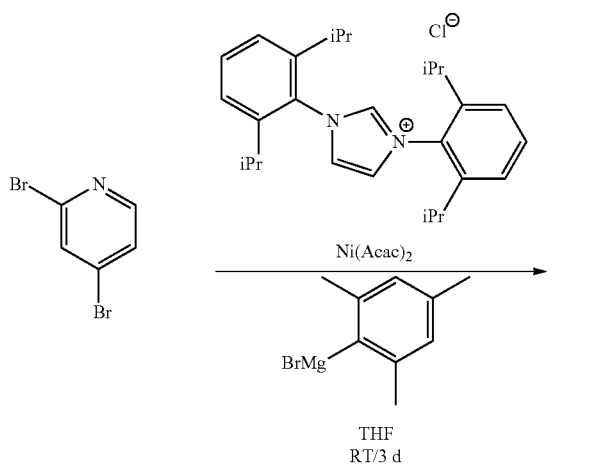

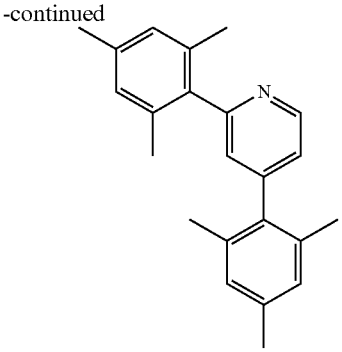

Synthesis Reaction of Inventive Procatalyst 7 (1 of 4)

Inside the glove box, a 100 mL jar was charged with 2,4-bromopyridine (2.00 g, 8.44 mmol), Nickel acetylacetonate (0.065 g, 0.25 mmol), 2,6-diisopropylimidazolium chloride (0.108 g, 0.25 mmol) and THF (20 mL). The mesityl Grignard (1.0 M, 17.3 mL, 17.3 mmol) was slowly added to the solution. The color instantly changed to a green color followed by a dark brown color. The reaction was stirred for 3 d, quenched with brine and extracted with EtOAc. The organic layer was collected and all volatiles were removed. The crude product was purified by column chromatography (Hexanes:EtOAc 70:30). The yield was 2.34 g, or 88%. The sample was evaluated using $^1$H NMR spectroscopy, the results of which are as follows: $^1$H NMR (400 MHz, CDCl$_3$) δ 8.79 (dd, J=5.0, 0.9 Hz, 1H), 7.08 (dd, J=5.0, 1.7 Hz, 1H), 7.06 (dd, J=1.6, 0.9 Hz, 1H), 7.02-6.98 (m, 2H), 6.98-6.94 (m, 2H), 2.37 (s, 3H), 2.36 (s, 3H), 2.12 (s, 6H), 2.09 (s, 6H). $^{13}$C NMR (101 MHz, CDCl$_3$) δ 160.31, 149.83, 149.72, 137.80, 137.42, 137.31, 136.44, 135.55, 134.99, 128.38, 128.31, 125.68, 122.61, 21.13, 21.07, 20.59, 20.18.

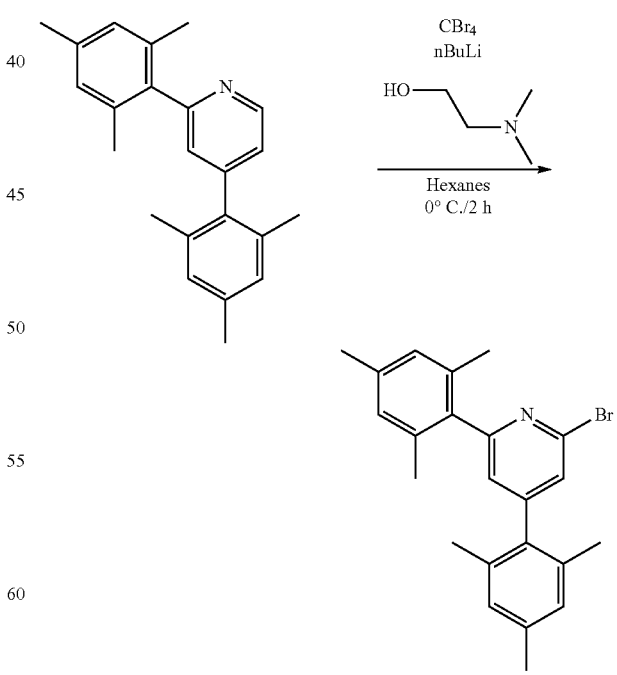

Synthesis Reaction of Inventive Procatalyst 7 (2 of 4)

A 100 mL round bottom flask was charged with dimethylaminoethanol (2.27 g, 22.5 mmol) and hexanes (20 mL).

The flask was purged with nitrogen then nBuLi (18.0 mL, 2.5 M, 45.0 mmol) was added dropwise at 0° C. The reaction was stirred for 30 min then a hexanes (10 mL) solution of 2,4-dimesitylpyridine (2.367 g, 7.50 mmol) was added dropwise. The solution turned to a dark brown and was stirred for 3 h. The solution was cooled to −77° C. then CBr$_4$ (8.71 g, 26.3 mmol) in hexanes (10 mL) was added dropwise. A precipitate formed and the reaction was stirred overnight at room temperature. Water was added to quench the reaction then ethyl acetate was added and the organic layer extracted. Silica was added to the solution and all volatiles were removed. The solid loaded onto a column and purified via column chromatography (90:10 hexanes:EtOAc). The sample was evaluated using $^1$H NMR spectroscopy, the results of which are as follows: $^1$H NMR (400 MHz, CDCl$_3$) δ 7.32-7.29 (m, 1H), 7.02-7.00 (m, 1H), 6.99-6.96 (m, 2H), 6.96-6.94 (m, 2H), 2.36 (s, 3H), 2.34 (s, 3H), 2.13 (s, 6H), 2.09 (s, 6H). $^{13}$C NMR (101 MHz, CDCl$_3$) δ 161.14, 152.59, 142.09, 137.91, 137.85, 136.37, 135.55, 134.98, 134.84, 128.49, 128.41, 126.60, 125.07, 21.10, 21.05, 20.56, 20.22.

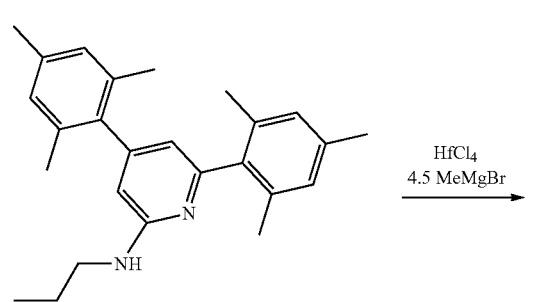

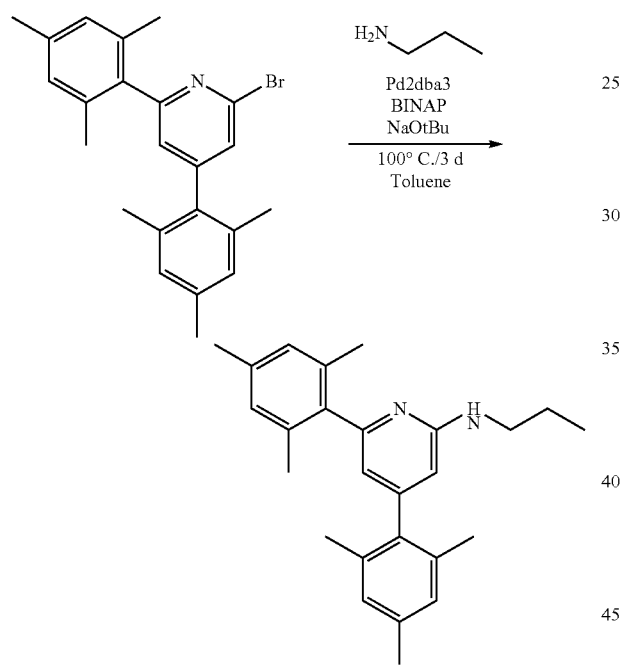

Synthesis Reaction of Inventive Procatalyst 7 (3 of 4)

Inside a glove box, a 20 mL vial was charged with 2,4-dimesityl-6-bromo-pyridine (0.600 g, 1.52 mmol), NaO$^t$Bu (0.325 g, 3.38 mmol), Pd$_2$dba$_3$ (0.070 g, 0.08 mmol), BINAP (0.047 g, 0.08 mmol), propylamine (0.153 g, 2.59 mmol), and toluene (8 mL). The reaction mixture was heated to 100° C. for 3 h, then removed from the glove box. Silica gel was added and all volatiles were removed. The solid was purified by column chromatography (hexanes:EtOAc 85:15). The yield was 0.36 g, or 64%. The sample was evaluated using 1H NMR spectroscopy, the results of which are as follows: $^1$H NMR (400 MHz, CDCl$_3$) δ 6.93 (s, 2H), 6.89 (s, 2H), 6.31 (t, J=1.4 Hz, 1H), 6.13 (d, J=1.2 Hz, 1H), 4.75 (s, 1H), 3.17 (q, J=6.5, 6.0 Hz, 2H), 2.32 (s, 3H), 2.29 (s, 3H), 2.12 (s, 6H), 2.10 (s, 6H), 1.65 (h, J=7.4 Hz, 2H), 0.98 (td, J=7.4, 1.3 Hz, 3H). $^{13}$C NMR (101 MHz, CDCl$_3$) δ 159.22, 158.58, 151.20, 138.18, 137.62, 136.90, 136.86, 135.49, 135.11, 128.15, 128.08, 114.81, 103.62, 44.50, 22.75, 21.05, 21.00, 20.41, 20.08, 11.55.

Synthesis Reaction of Inventive Procatalyst 7 (4 of 4)

Inventive Procatalyst 7 was prepared following the General Procedure for metallation of 2-aminopyridine ligands using HfCl$_4$. The yield was 85%. The sample was evaluated using $^1$H NMR spectroscopy, the results of which are as follows: $^1$H NMR (400 MHz, C$_6$D$_6$) δ 6.79 (s, 4H), 6.72 (s, 4H), 5.85 (s, 2H), 5.62 (s, 2H), 2.69 (t, J=7.2 Hz, 4H), 2.14 (d, J=4.0 Hz, 24H), 2.07 (s, 12H), 1.45 (h, J=7.0 Hz, 4H), 0.91-0.77 (m, 6H), 0.49 (d, J=1.4 Hz, 6H). $^{13}$C NMR (101 MHz, C$_6$D$_6$) δ 171.74, 156.67, 155.56, 138.18, 137.21, 137.08, 136.86, 135.84, 134.82, 128.65, 128.13, 111.55, 102.55, 53.78, 49.19, 24.23, 21.18, 21.12, 20.71, 20.48, 12.20.

Synthesis of Inventive Procatalyst 8:

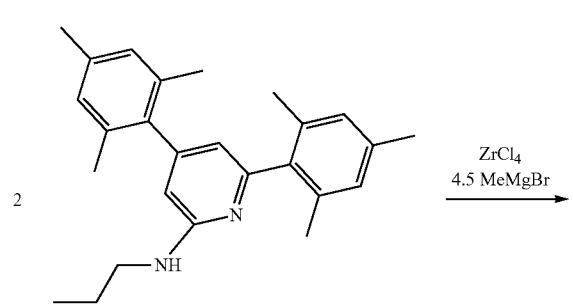

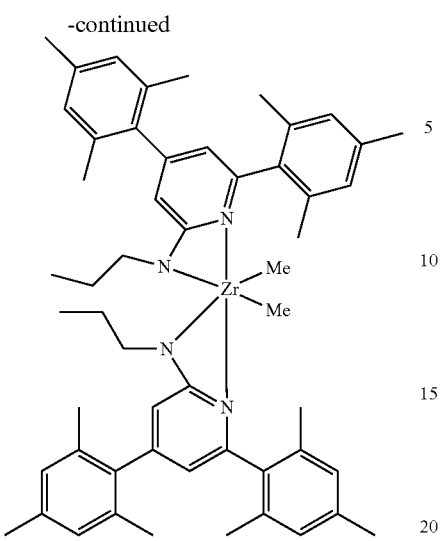

Hz, 1H), 4.78 (t, J=6.0 Hz, 1H), 3.09 (d, J=6.2 Hz, 2H), 2.35 (s, 3H), 2.14 (s, 6H), 1.03 (s, 9H). $^{13}$C NMR (101 MHz, CDCl$_3$) δ 159.39, 158.41, 138.40, 137.70, 136.85, 135.60, 128.22, 113.27, 103.12, 54.11, 32.11, 27.58, 21.12, 20.14.

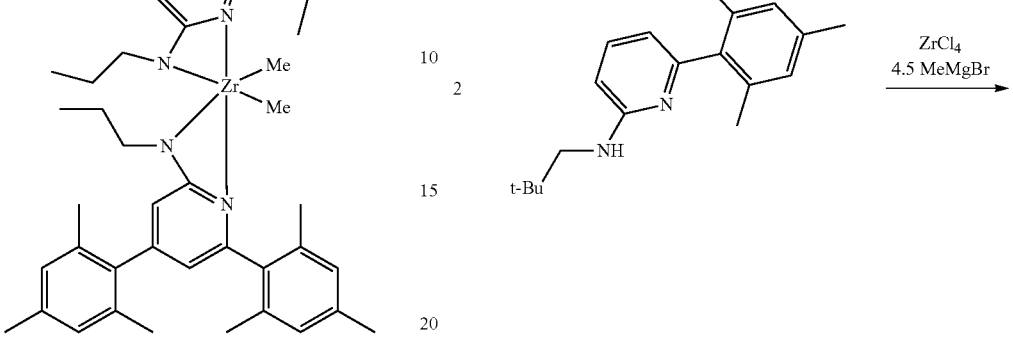

Synthesis Reaction of Inventive Procatalyst 8

Inventive Procatalyst 8 was prepared following the General Procedure for metallation of 2-aminopyridine ligands using ZrCl$_4$. The yield was 88%. The sample was evaluated using $^1$H NMR spectroscopy, the results of which are as follows: $^1$H NMR (400 MHz, C$_6$D$_6$) δ 6.81-6.77 (m, 4H), 6.74-6.68 (m, 4H), 5.86 (d, J=1.3 Hz, 2H), 5.59 (d, J=1.2 Hz, 2H), 2.88-2.70 (m, 4H), 2.15 (s, 6H), 2.14 (s, 12H), 2.12 (s, 6H), 2.07 (s, 12H), 1.61-1.43 (m, 4H), 0.84 (t, J=7.4 Hz, 6H), 0.67 (s, 6H). $^{13}$C NMR (101 MHz, C$_6$D$_6$) δ 172.10, 156.38, 155.30, 137.77, 136.80, 136.62, 136.38, 135.37, 134.36, 128.19, 127.76, 111.29, 101.42, 49.42, 48.26, 23.61, 20.76, 20.71, 20.19, 19.87, 11.80.

Synthesis of Inventive Procatalyst 9:

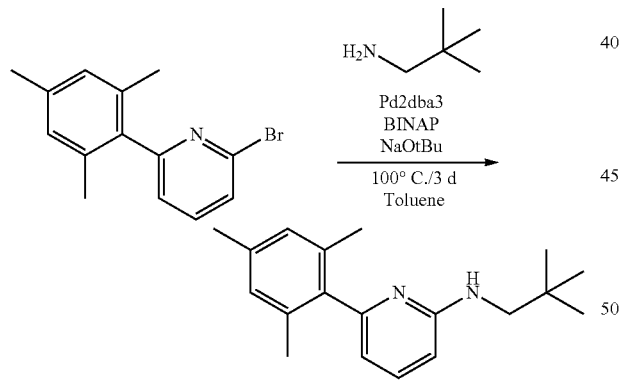

Synthesis Reaction of Inventive Procatalyst 9 (1 of 2)

Inside a glove box, a 20 mL vial was charged with 2-mesityl-6-bromo-pyridine (0.600 g, 2.17 mmol), NaO$^t$Bu (0.463 g, 4.82 mmol), Pd$_2$dba$_3$ (0.099 g, 0.11 mmol), BINAP (0.068 g, 0.11 mmol), neopentylamine (0.322 g, 3.69 mmol), and toluene (8 mL). The reaction mixture was heated to 100° C. for 3 h, then removed from the glove box. Silica gel was added and all volatiles were removed. The solid was purified by column chromatography (hexanes:CH$_2$Cl$_2$ 50:50). The yield was 0.53 g, or 86%. The sample was evaluated using $^1$H NMR spectroscopy, the results of which are as follows: $^1$H NMR (400 MHz, CDCl$_3$) δ 7.55-7.45 (m, 1H), 6.99-6.91 (m, 2H), 6.50 (dd, J=7.3, 0.8 Hz, 1H), 6.36 (dd, J=8.4, 0.7

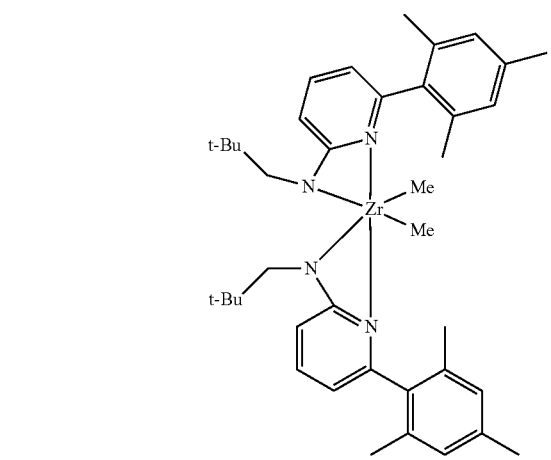

Synthesis Reaction of Inventive Procatalyst 9 (2 of 2)

Inventive Procatalyst 9 was prepared following the General Procedure for metallation of 2-aminopyridine ligands using ZrCl$_4$. The yield was 90%. The sample was evaluated using $^1$H NMR spectroscopy, the results of which are as follows: $^1$H NMR (400 MHz, C$_6$D$_6$) δ 6.95-6.87 (m, 2H), 6.69 (s, 4H), 5.90 (d, J=8.8 Hz, 2H), 5.84-5.77 (m, 2H), 2.48 (s, 4H), 2.16 (s, 6H), 1.86 (s, 12H), 0.96 (s, 18H), 0.64 (s, 6H). $^{13}$C NMR (101 MHz, C$_6$D$_6$) δ 173.04, 155.99, 140.61, 137.14, 136.77, 135.78, 128.18, 109.88, 103.06, 58.78, 49.07, 34.64, 28.76, 21.08, 20.34.

Synthesis of Inventive Procatalyst 10:

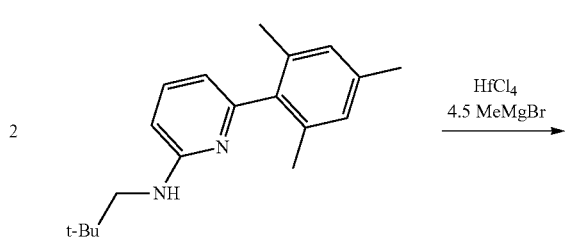

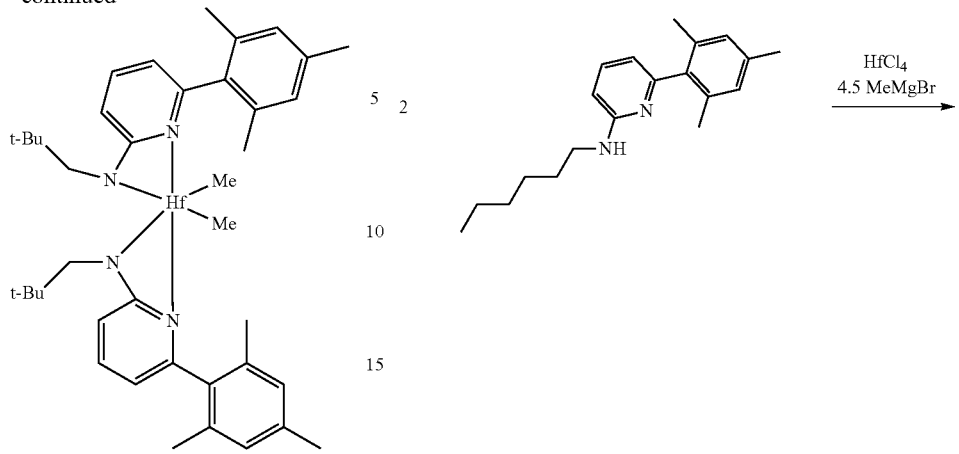

Synthesis Reaction of Inventive Procatalyst 10

Inventive Procatalyst 10 was prepared following the General Procedure for metallation of 2-aminopyridine ligands using HfCl$_4$. The yield was 86%. The sample was evaluated using $^1$H NMR spectroscopy, the results of which are as follows: $^1$H NMR (400 MHz, C$_6$D$_6$) δ 6.96-6.86 (m, 2H), 6.70 (s, 4H), 5.88 (d, J=8.7 Hz, 2H), 5.85-5.81 (m, 2H), 2.41 (s, 4H), 2.18 (s, 6H), 2.10-1.94 (m, 6H), 1.71-1.51 (m, 6H), 0.95 (s, 18H), 0.47 (s, 6H). $^{13}$C NMR (101 MHz, C$_6$D$_6$) δ 171.86, 155.31, 140.05, 136.79, 136.39, 135.94, 134.97, 127.96, 109.27, 103.49, 57.80, 54.81, 34.23, 28.39, 20.69, 20.31, 19.79.

Synthesis of Inventive Procatalyst 11:

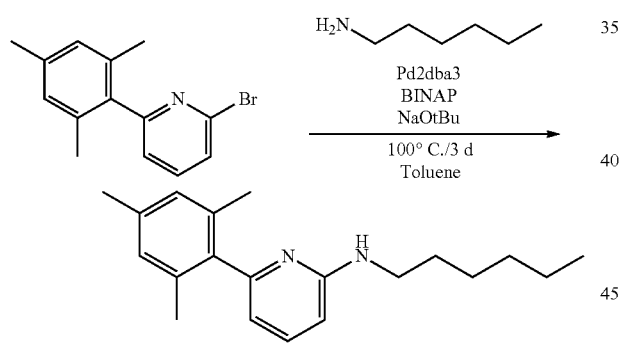

Synthesis Reaction of Inventive Procatalyst 11 (1 of 2)

Inside a glove box, a 20 mL vial was charged with 2-mesityl-6-bromo-pyridine (0.500 g, 1.81 mmol), NaO$^t$Bu (0.386 g, 4.02 mmol), Pd$_2$dba$_3$ (0.083 g, 0.09 mmol), BINAP (0.056 g, 0.09 mmol), hexylamine (0.311 g, 3.08 mmol), and toluene (8 mL). The reaction mixture was heated to 100° C. for 3 h, then removed from the glove box. Silica gel was added and all volatiles were removed. The solid was purified by column chromatography (hexanes:CH$_2$Cl$_2$ 50:50). The yield was 0.325 g, or 61%. The sample was evaluated using $^1$H NMR spectroscopy, the results of which are as follows: $^1$H NMR (400 MHz, CDCl$_3$) δ 7.58-7.46 (m, 1H), 6.98 (s, 2H), 6.59-6.48 (m, 1H), 6.34 (d, J=8.4 Hz, 1H), 5.11 (t, J=5.4 Hz, 1H), 3.18 (q, J=6.5 Hz, 2H), 2.38 (s, 3H), 2.18 (s, 6H), 1.63 (p, J=7.0 Hz, 2H), 1.59-1.66 (m, 6H), 1.02-0.94 (m, 3H). $^{13}$C NMR (101 MHz, CDCl$_3$) δ 159.11, 158.46, 138.50, 137.68, 136.80, 135.65, 128.24, 113.30, 103.10, 42.49, 31.75, 29.59, 26.85, 22.73, 21.14, 20.19, 14.14.

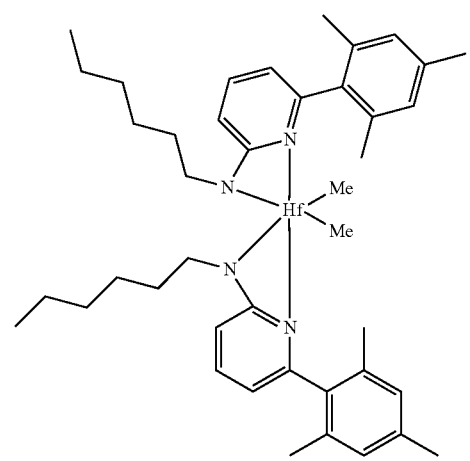

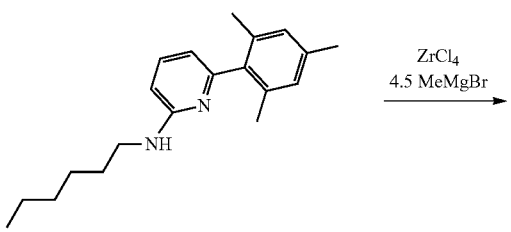

Synthesis Reaction of Inventive Procatalyst 11 (2 of 2)

Inventive Procatalyst 11 was prepared following the General Procedure for metallation of 2-aminopyridine ligands using HfCl$_4$. The yield was 79%. The sample was evaluated using $^1$H NMR spectroscopy, the results of which are as follows: $^1$H NMR (400 MHz, C$_6$D$_6$) δ 7.04-6.94 (m, 2H), 6.71 (s, 4H), 5.88 (d, J=7.2 Hz, 2H), 5.79 (d, J=8.7 Hz, 2H), 2.72-2.60 (m, 4H), 2.17 (s, 6H), 1.87 (s, 12H), 1.44 (p, J=7.2 Hz, 4H), 1.16-1.36 (m, 12H), 0.86 (t, J=7.0 Hz, 6H), 0.47 (s, 6H). $^{13}$C NMR (101 MHz, C$_6$D$_6$) δ 170.84, 156.04, 140.79, 136.71, 136.43, 135.48, 127.79, 109.50, 101.84, 53.42, 46.95, 31.72, 30.38, 27.35, 22.82, 20.76, 19.91, 13.96.

Synthesis of Inventive Procatalyst 12:

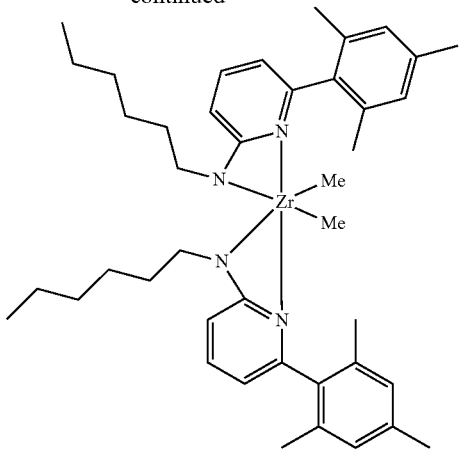

Synthesis Reaction of Inventive Procatalyst 12

Inventive Procatalyst 12 was prepared following the General Procedure for metallation of 2-aminopyridine ligands using ZrCl$_4$. The yield was 83%. The sample was evaluated using $^1$H NMR spectroscopy, the results of which are as follows: $^1$H NMR (400 MHz, C$_6$D$_6$) δ 6.98 (ddd, J=8.9, 7.2, 1.7 Hz, 2H), 6.69 (s, 4H), 5.90-5.76 (m, 4H), 2.81-2.70 (m, 4H), 2.14 (s, 6H), 1.91 (s, 12H), 1.49 (p, J=7.6 Hz, 4H), 1.39-1.13 (m, 12H), 0.89-0.81 (m, 6H), 0.65 (d, J=1.7 Hz, 6H). $^{13}$C NMR (101 MHz, C$_6$D$_6$) δ 171.76, 156.21, 140.98, 136.74, 136.38, 135.43, 127.82, 109.73, 101.16, 47.79, 47.59, 31.77, 30.22, 27.37, 22.80, 20.75, 19.81, 13.95.

Synthesis of Inventive Procatalyst 13:

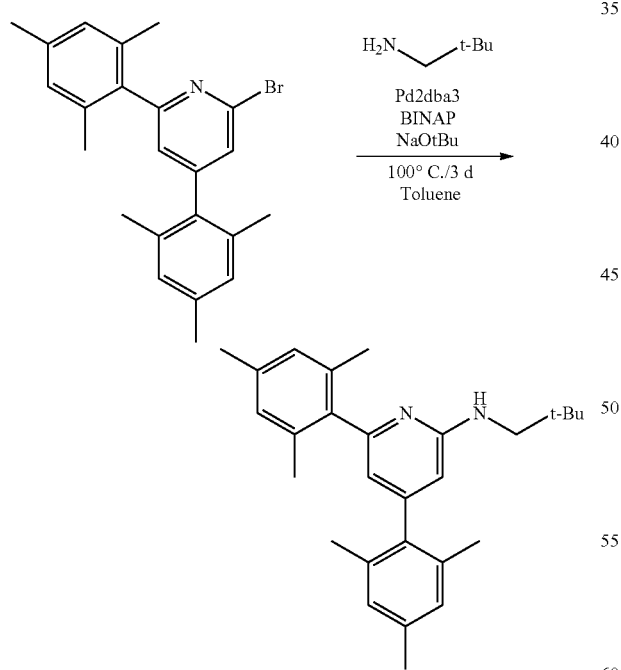

Synthesis Reaction of Inventive Procatalyst 13 (1 of 2)

Inside a glove box, a 20 mL vial was charged with 2,4-dimesityl-6-bromo-pyridine (0.500 g, 1.27 mmol), NaO$^t$Bu (0.270 g, 2.81 mmol), Pd$_2$dba$_3$ (0.058 g, 0.06 mmol), BINAP (0.039 g, 0.06 mmol), neopentylamine (0.188 g, 2.16 mmol), and toluene (8 mL). The reaction mixture was heated to 100° C. for 3 h, then removed from the glove box. Silica gel was added and all volatiles were removed. The solid was purified by column chromatography (hexanes:EtOAc 85:15). The yield was 0.415 g, or 82%. The sample was evaluated using $^1$H NMR spectroscopy, the results of which are as follows: $^1$H NMR (400 MHz, CDCl$_3$) δ 7.03 (s, 2H), 7.00 (s, 2H), 6.39 (d, J=1.2 Hz, 1H), 6.27 (d, J=1.1 Hz, 1H), 4.95 (t, J=6.2 Hz, 1H), 3.14 (d, J=6.2 Hz, 2H), 2.42 (s, 3H), 2.40 (s, 3H), 2.25 (s, 6H), 2.22 (s, 6H), 1.09 (s, 9H). $^{13}$C NMR (101 MHz, CDCl$_3$) δ 159.88, 158.71, 151.28, 138.42, 137.83, 136.88, 136.86, 135.55, 135.14, 128.29, 128.21, 114.63, 103.60, 54.35, 32.33, 27.62, 21.17, 21.12, 20.50, 20.19.

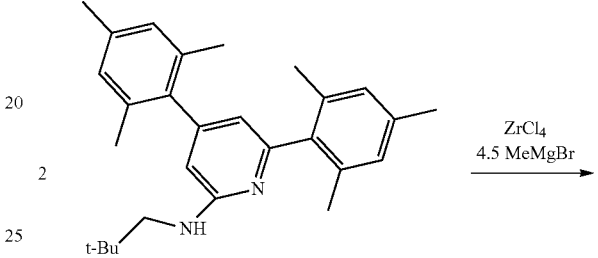

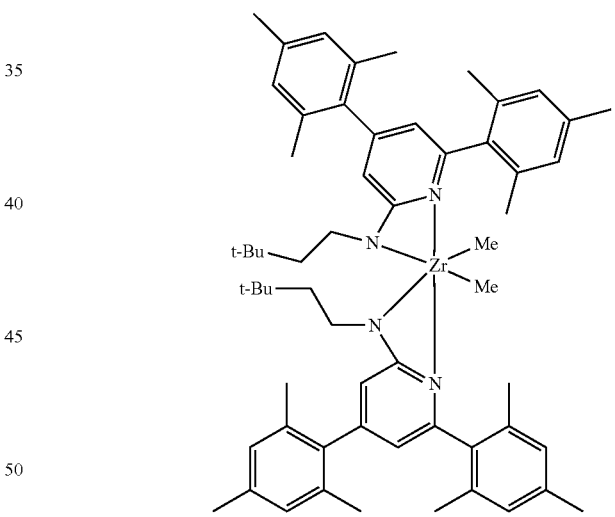

Synthesis Reaction of Inventive Procatalyst 13 (2 of 2)

Inventive Procatalyst 13 was prepared following the General Procedure for metallation of 2-aminopyridine ligands using ZrCl$_4$. The yield was 79%. The sample was evaluated using $^1$H NMR spectroscopy, the results of which are as follows: $^1$H NMR (400 MHz, C$_6$D$_6$) δ 6.79 (s, 4H), 6.69 (s, 4H), 5.99 (d, J=1.0 Hz, 2H), 5.54 (d, J=1.1 Hz, 2H), 2.85-2.49 (m, 4H), 2.15 (s, 6H), 2.14 (s, 6H), 2.12 (s, 12H), 2.07-2.00 (m, 12H), 0.92 (d, J=11.4 Hz, 18H), 0.62 (s, 6H). $^{13}$C NMR (101 MHz, C$_6$D$_6$) δ 156.43, 155.00, 138.20, 137.17, 137.00, 136.72, 135.78, 134.77, 128.53, 128.14, 111.44, 103.18, 58.85, 49.51, 34.95, 34.72, 28.71, 25.61, 21.15, 21.10, 20.48, 20.30.

Synthesis of Inventive Procatalyst 14:

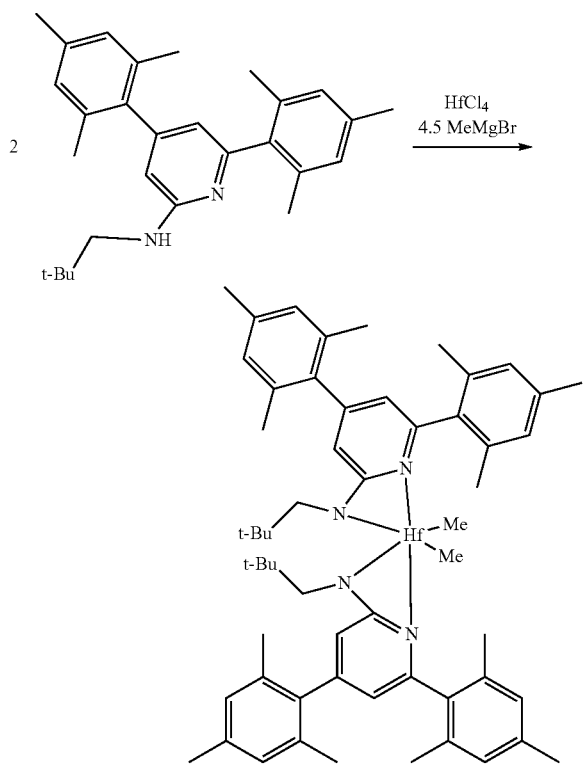

Synthesis Reaction of Inventive Procatalyst 14

Inventive Procatalyst 14 was prepared following the General Procedure for metallation of 2-aminopyridine ligands using HfCl$_4$. The yield was 87%. The sample was evaluated using $^1$H NMR spectroscopy, the results of which are as follows: $^1$H NMR (400 MHz, C$_6$D$_6$) δ 6.78 (d, J=7.6 Hz, 4H), 6.70 (d, J=13.1 Hz, 4H), 5.99 (s, 2H), 2.54 (d, J=13.5 Hz, 2H), 2.23 (m, 2H), 2.18 (s, 4H), 2.16 (s, 6H), 2.14 (s, 6H), 2.11 (d, J=11.4 Hz, 6H), 2.07-2.02 (m, 6H), 1.97 (s, 6H), 0.93 (s, 18H), 0.47 (s, 6H). $^{13}$C NMR (101 MHz, C$_6$D$_6$) δ 172.73, 156.01, 154.68, 138.17, 137.17, 137.06, 136.80, 136.13, 135.45, 135.25, 134.46, 128.72, 128.47, 111.23, 104.42, 58.20, 55.16, 34.49, 31.93, 28.88, 25.61, 21.12, 21.08, 20.50, 20.19.

Synthesis of Inventive Procatalyst 15:

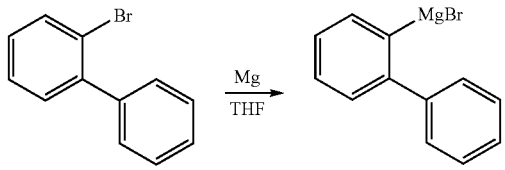

Synthesis Reaction of Inventive Procatalyst 15 (1 of 4)

Inside an inert atmosphere glove-box a 50 mL jar was equipped with a stir bar and was charged with THF (20 mL) and magnesium turnings (0.5736 g, 23.5950 mmol). The jar was placed in a −30° C. freezer for a few hours. Next, 2-bromobiphenyl (5.000 g, 21.4500 mmol) dissolved in 10 mL of THF was added slowly to the stirring solution to avoid a large exotherm. The reaction stirred overnight to produce [1,1'-biphenyl]-2-ylmagnesium bromide. Reaction completion was verified by quenching an aliquot of the reaction solution with water and observing the presence of unsubstituted biphenyl by GC/MS.

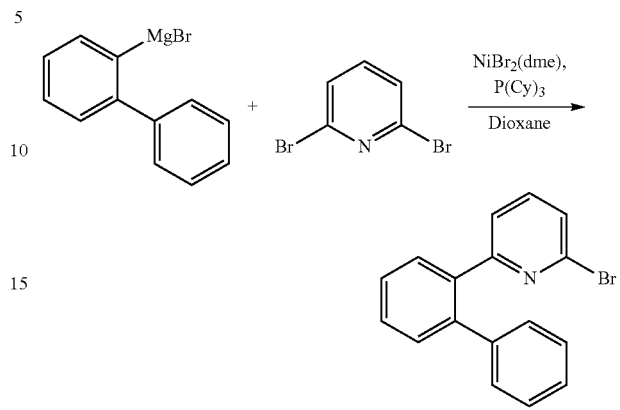

Synthesis Reaction of Inventive Procatalyst 15 (2 of 4)

Inside an inert atmosphere glove-box a 110 mL jar was equipped with a stir bar and was charged with 2,6-dibromopyridine (4.8260 g, 20.3722 mmol) and dioxane (30 mL). Tricyclohexylphosphine (0.120 g, 0.0429 mmol) and NiBr2 (dme) (0.0066 g, 0.0214 mmol) were also mixed with 5 mL of dioxane and added to the mixture. The entire Grignard reagent ([1,1'-biphenyl]-2-ylmagnesium bromide) was added from the previous experiment to the stirring solution. The reaction was heated to 50° C. and stirred for 72 hrs. The reaction was checked for completion using GC/MS. Once complete the solution was removed from the box and water and dichloromethane were added. The solution was transferred to a separatory funnel where the organic layers were collected, washed with saturated sodium chloride and dried over sodium sulfate. The solvent was vacuumed off to afford a solid which was recrystallized using hexanes, yielding 5.7495 g (86.435%) of a light brown solid (2-([1,1'-biphenyl]-2-yl)-6-bromopyridine). The sample was evaluated using $^1$H NMR spectroscopy, the results of which are as follows: $^1$H NMR (400 MHz, Chloroform-d) δ 7.74-7.71 (m, 1H), 7.48-7.43 (m, 2H), 7.43-7.39 (m, 2H), 7.26-7.24 (m, 3H), 7.19-7.14 (m, 3H), 6.77 (dt, J=7.6, 0.7 Hz, 1H). $^{13}$C NMR (101 MHz, Chloroform-d) δ 160.48, 141.75, 141.23, 140.91, 137.68, 130.92, 130.77, 130.02, 129.93, 129.25, 128.43, 128.29, 127.99, 127.27, 127.19, 125.85, 124.48.

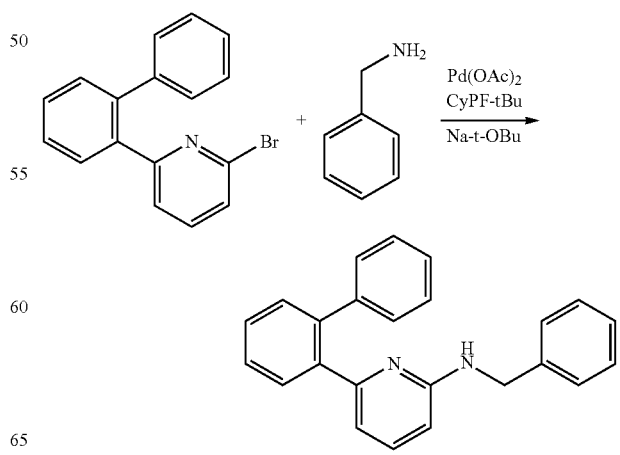

Synthesis Reaction of Inventive Procatalyst 15 (3 of 4)

Inside an inert atmosphere glove-box CyPF-tBu (Josiphos) (0.076 g, 0.140 mmol) and Pd(OAc)$_2$ (0.031 g, 0.140 mmol) were stirred together in DME (10 mL) for 5 minutes. 2-([1,1'-Biphenyl]-2-yl)-6-bromopyridine (2.124 g, 6.85 mmol) was then added to the mixture which was allowed to stir for an additional 10 minutes during which time the solids completely dissolved. A solution of benzylamine (0.807 g, 7.53 mmol) in DME (5 mL) was then added. Finally, solid Na-t-OBu (0.921 g, 9.59 mmol) was added as a solid and the mixture heated to 80° C. overnight. The reaction mixture was poured onto DI water (75 mL) and extracted with EtOAc (3×50 mL). Silica gel was added to the combined organic layers and the volatiles removed, resulting in the reaction mixture being adsorbed on silica gel which served as a solid loading for column chromatography using an automated ISCO chromatography apparatus. The initial column purification was attempted using a hexane/ethylacetate gradient which after several column volumes of solvent did not appear to be effectively eluting the product. The solvent was then changed to pure CH$_2$Cl$_2$ which resulted in the rapid elution of the desired product (6-([1,1'-biphenyl]-2-yl)-N-benzylpyridin-2-amine) as a light yellow sticky residue (2.1521 g, 93.4%). The sample was evaluated using $^1$H NMR spectroscopy, the results of which are as follows: $^1$H NMR (500 MHz, Benzene-d$_6$) δ 7.84 (dd, J=7.6, 1.5 Hz, 1H), 7.31-6.97 (m, 13H), 6.79 (t, J=7.8 Hz, 1H), 6.36 (d, J=7.4 Hz, 1H), 5.72 (d, J=8.2 Hz, 1H), 4.21 (m, 1H), 4.16 (d, J=5.7 Hz, 2H). $^{13}$C NMR (126 MHz, Benzene-d$_6$) δ 158.11, 157.70, 142.59, 140.93, 140.54, 140.04, 136.37, 130.63, 130.51, 129.60, 128.25, 127.16, 126.73, 126.20, 114.48, 104.67, 45.65.

Synthesis Reaction of Inventive Procatalyst 15 (4 of 4)

6-([1,1'-biphenyl]-2-yl)-N-benzylpyridin-2-amine (223.2 mg, 0.663 mmol) was dissolved in 4 mL of toluene. Hafnium tetrabenzyl (179.6 mg, 0.331 mmol) was dissolved in 2 mL of toluene and added to the ligand solution in a drybox. The yellow solution immediately turned darker orange. After stirring for one hour at room temperature, solvent was removed by vacuum. Hexanes (5 mL) and toluene (2 mL) was added to the resulting solid and agitated. Following filtration, hexanes was added to the filtrate and the solution was placed in a −25° C. freezer for 72 hours. Yellow, crystalline solid (71.8 mg, 21% yield) was collected by filtration and dried under vacuum. The sample was evaluated using $^1$H NMR spectroscopy, the results of which are as follows: $^1$H NMR (500 MHz, C$_7$D$_8$) δ 7.30-6.81 (m, 38H), 6.56 (dd, J=8.5, 7.4 Hz, 2H), 5.93 (d, J=7.4 Hz, 2H), 4.27 (br, 2H), 3.68 (br, 2H), 5.66 (d, J=8.5 Hz, 2H), 2.17 (s, 4H). $^{13}$C NMR (126 MHz, C$_7$D$_8$) δ 170.37, 155.57, 147.89, 140.91, 140.76, 140.52, 140.21, 137.54, 130.49, 130.47, 129.51, 128.10, 128.02, 127.19, 126.99, 126.65, 126.20, 120.82, 113.83, 104.23, 82.41, 51.24.

Synthesis of Inventive Procatalyst 16:

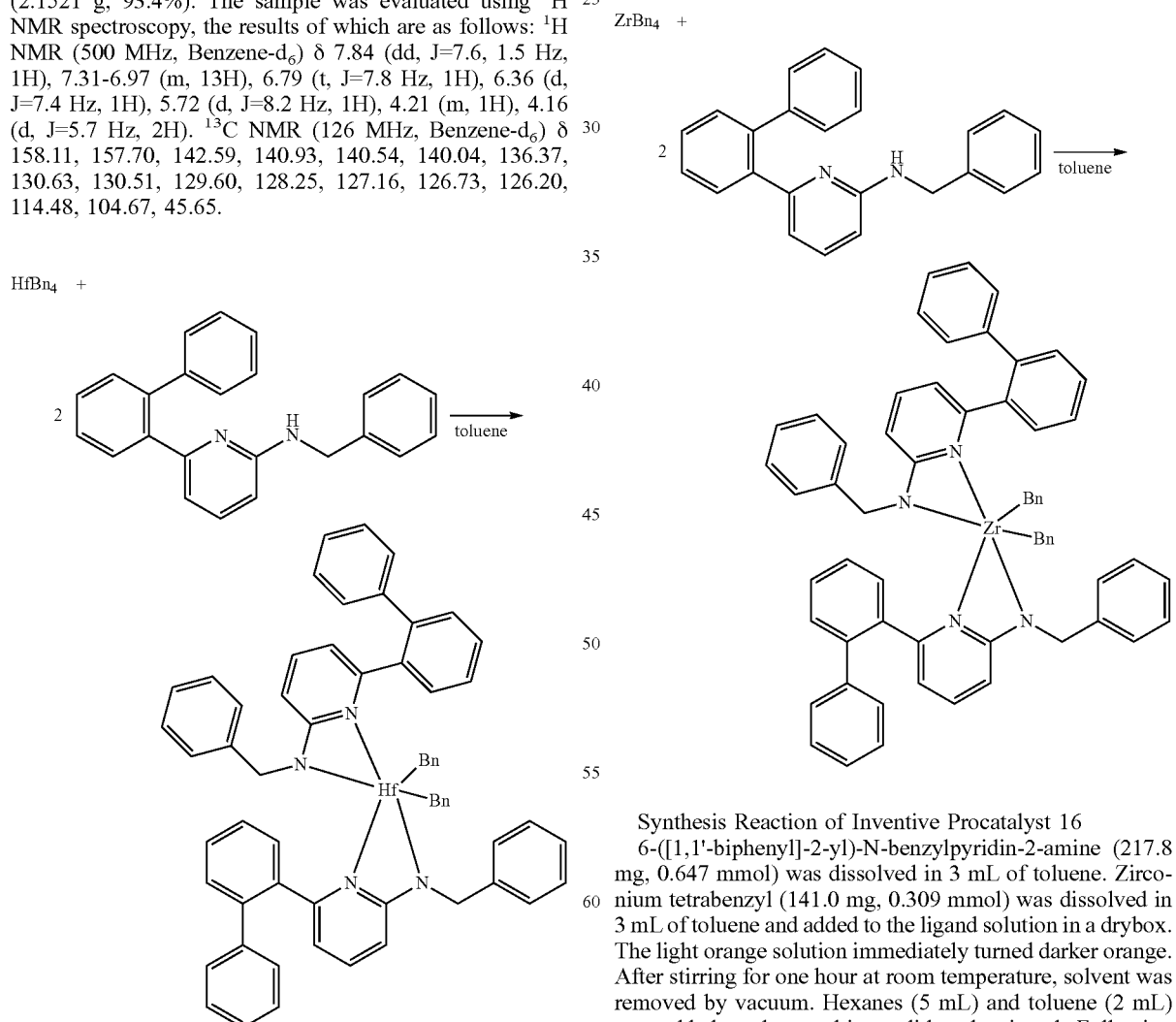

Synthesis Reaction of Inventive Procatalyst 16

6-([1,1'-biphenyl]-2-yl)-N-benzylpyridin-2-amine (217.8 mg, 0.647 mmol) was dissolved in 3 mL of toluene. Zirconium tetrabenzyl (141.0 mg, 0.309 mmol) was dissolved in 3 mL of toluene and added to the ligand solution in a drybox. The light orange solution immediately turned darker orange. After stirring for one hour at room temperature, solvent was removed by vacuum. Hexanes (5 mL) and toluene (2 mL) was added to the resulting solid and agitated. Following filtration, hexanes was added to the filtrate and the solution was placed in a −25° C. freezer for 72 hours. Orange, crystalline solid (50.0 mg, 17% yield) was collected by filtration and dried under vacuum. The sample was evaluated using $^1$H NMR spectroscopy, the results of which are as follows: $^1$H NMR (400 MHz, C$_7$D$_8$) δ 7.30-7.17 (m, 6H), 7.15-6.80 (m, 32H), 6.54 (dd, J=8.5, 7.5 Hz, 2H), 5.88 (dd, J=7.5, 0.8 Hz, 2H), 5.65 (dd, J=8.6, 0.9 Hz, 2H), 4.03 (br, 4H), 2.41 (br, 4H). $^{13}$C NMR (101 MHz, C$_7$D$_8$) δ 170.88, 155.50, 146.39, 141.10, 140.74, 140.45, 140.05, 130.59, 130.41, 129.50, 126.16, 121.08, 114.09, 103.27, 78.11, 51.40.

Synthesis of Inventive Procatalyst 17:

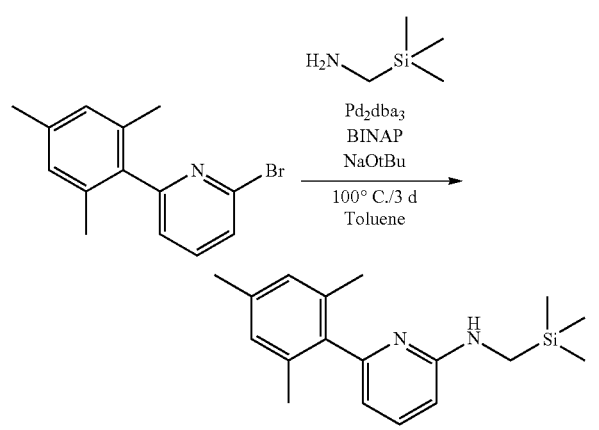

Synthesis Reaction of Inventive Procatalyst 17 (1 of 2)

Inside a glove box, a 100 mL jar was charged with the 2-mesityl-6-bromopyridine (4.00 g, 14.5 mmol), NaOtBu (4.18 g, 43.5 mmol), Pd$_2$dba$_3$ (0.133 g, 0.14 mmol), rac-BINAP (0.180 g, 0.30 mmol), trimethylsilylmethylamine (1.65 g, 15.9 mmol), and toluene (40 mL). The reaction mixture was heated to 100° C. for 3 h, then removed from the glove box. EtOAc and water were added and the organic layer was collected and all volatiles were removed. The crude brown product was purified by column chromatography to give the pure product (90:10 Hexanes:EtOAc).

The yield was 2.2 g, or 51%. The sample was evaluated using $^1$H NMR spectroscopy, the results of which are as follows: $^1$H NMR (400 MHz, CDCl$_3$) δ 7.47 (dd, J=8.3, 7.2 Hz, 1H), 6.90 (s, 2H), 6.46 (dd, J=7.2, 0.8 Hz, 1H), 6.33 (d, J=8.4 Hz, 1H), 4.64 (s, 1H), 3.10 (d, J=5.9 Hz, 2H), 2.30 (s, 3H), 2.09 (s, 6H), 1.66 (hept, J=7.0 Hz, 1H), 0.91 (s, 6H), 0.89 (d, J=6.9 Hz, 6H). $^{13}$C NMR (101 MHz, CDCl$_3$) δ 159.34, 158.37, 138.28, 137.69, 136.87, 135.58, 128.16, 113.21, 102.96, 51.42, 36.64, 33.67, 22.42, 21.06, 20.07, 17.43.

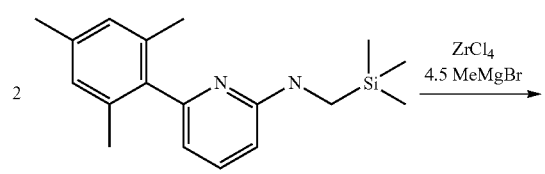

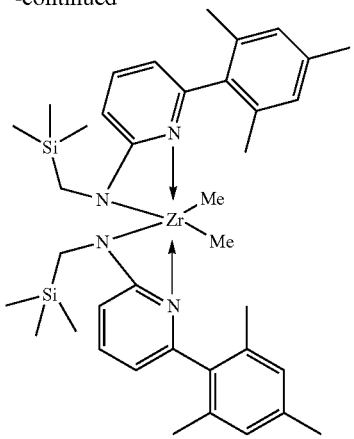

Synthesis Reaction of Inventive Procatalyst 17 (2 of 2)

Inside the glovebox a vial was charged with ZrCl$_4$ (0.033 g, 0.14 mmol) and CH$_2$Cl$_2$ (5 mL). The solution was cooled to −30° C. then MeMgBr (0.21 mL, 0.64 mmol) was added. The solution was allowed to stir for 2 min then a cold CH$_2$Cl$_2$ (5 mL) suspension of 6-mesityl-N-((trimethylsilyl)methyl)pyridin-2-amine (0.085 g, 0.28 mmol) was added. The solution quickly changed to a yellow color and was allowed to stir at room temperature for 2 h. All volatiles were removed and the residue was taken up in hexanes and filtered through a disposable frit. All volatiles were removed and the residue was taken up in hexanes again and then filtered through a 0.45 micron syringe filter. All volatiles were removed and the crude product was used without further purification.

The yield was 86 mg, or 84%. The sample was evaluated using $^1$H NMR spectroscopy, the results of which are as follows: $^1$H NMR (400 MHz, C$_6$D$_6$) δ 6.97-6.90 (m, 2H), 6.72-6.67 (m, 4H), 5.83-5.67 (m, 4H), 2.37 (s, 4H), 2.14 (s, 6H), 1.90 (s, 12H), 0.64 (s, 6H), 0.09 (s, 18H). $^{13}$C NMR (101 MHz, C$_6$D$_6$) δ 172.06, 155.76, 140.72, 136.68, 136.35, 135.39, 127.80, 108.80, 101.52, 47.93, 38.54, 20.66, 19.79, −1.78.

Synthesis of Inventive Procatalyst 18:

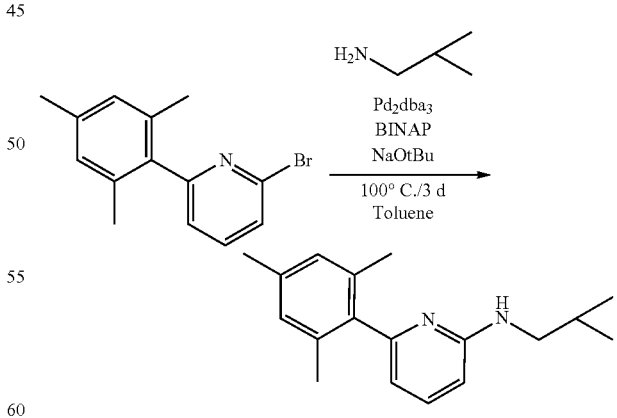

Synthesis Reaction of Inventive Procatalyst 18 (1 of 2)

Inside a glove box, a 500 mL flask was charged with the 2-mesityl-6-bromopyridine (20.0 g, 72.4 mmol), NaOtBu (20.9 g, 217 mmol), Pd$_2$dba$_3$ (0.332 g, 0.36 mmol), rac-BINAP (0.451 g, 0.72 mmol), isobutylamine (10.8 mL, 109 mmol), and toluene (200 mL). The reaction mixture was heated to 100° C. for 3 h, then removed from the glove box. EtOAc and water were added and the organic layer was collected and all volatiles were removed. The crude brown product was purified by column chromatography to give the pure product (90:10 Hexanes:EtOAc).

The yield was 12.0 g, or 62%. The sample was evaluated using $^1$H NMR spectroscopy, the results of which are as follows: $^1$H NMR (400 MHz, CDCl$_3$) δ 7.47 (ddd, J=8.4, 7.1, 1.2 Hz, 1H), 6.88 (s, 2H), 6.46 (dq, J=7.2, 0.8 Hz, 1H), 6.30 (d, J=8.3 Hz, 1H), 4.74 (s, 1H), 3.04 (ddd, J=7.0, 5.9, 1.2 Hz, 2H), 2.28 (s, 3H), 2.03 (s, 6H), 1.88 (dpd, J=13.3, 6.7, 1.3 Hz, 1H), 0.97 (dd, J=6.6, 1.2 Hz, 6H). $^{13}$C NMR (101 MHz, CDCl$_3$) δ 158.90, 137.75, 136.92, 135.57, 128.14, 113.36, 103.01, 50.27, 28.33, 21.03, 20.37, 20.04.

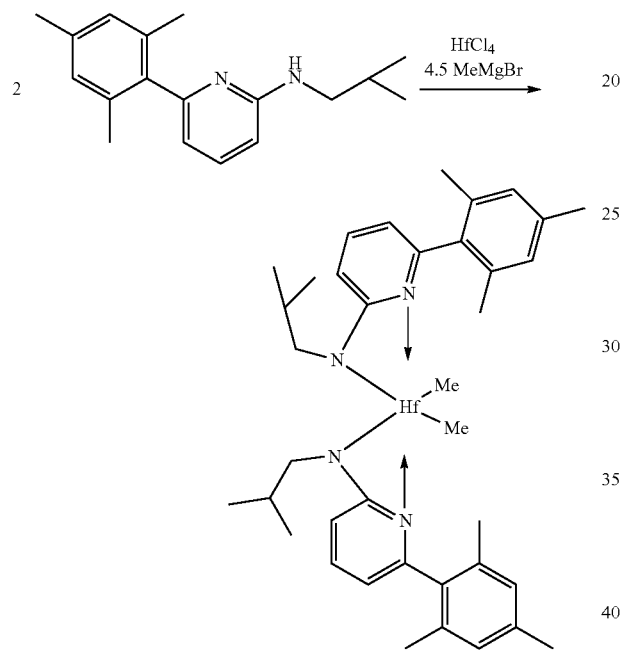

Synthesis Reaction of Inventive Procatalyst 18 (2 of 2)

Inside the glovebox a 200 mL jar was charged with HfCl$_4$ (8.12 g, 25.3 mmol) and CH$_2$Cl$_2$ (75 mL). The solution was cooled to −30° C. then MeMgBr (38 mL, 114 mmol) was added. The solution was allowed to stir for 2 min then a cold CH$_2$Cl$_2$ (50 mL) suspension of N-isobutyl-6-mesitylpyridin-2-amine (13.6 g, 50.7 mmol) was added. The solution quickly changed to a yellow color and was allowed to stir at room temperature for 2 h. All volatiles were removed and the residue was taken up in hexanes and filtered through a disposable frit. All volatiles were removed and the residue was taken up in hexanes again and then filtered through a 0.45 micron syringe filter. All volatiles were removed and the crude product was used without further purification.

The yield was 17.5 g, or 93%. The sample was evaluated using $^1$H NMR spectroscopy, the results of which are as follows: $^1$H NMR (400 MHz, C$_6$D$_6$) δ 6.96 (dd, J=8.7, 7.2 Hz, 2H), 6.70 (s, 4H), 5.88 (dd, J=7.2, 0.8 Hz, 2H), 5.75 (dd, J=8.7, 0.8 Hz, 2H), 2.40 (d, J=7.1 Hz, 4H), 2.16 (s, 6H), 1.86 (s, 12H), 1.74 (dq, J=13.6, 6.9 Hz, 2H), 0.93 (h, J=6.6 Hz, 12H), 0.50 (s, 6H). $^{13}$C NMR (101 MHz, C$_6$D$_6$) δ 171.26, 155.90, 140.68, 136.79, 136.40, 135.46, 109.42, 102.34, 54.83, 53.74, 28.45, 20.65, 20.59, 19.93.

Synthesis of Inventive Procatalyst 19:

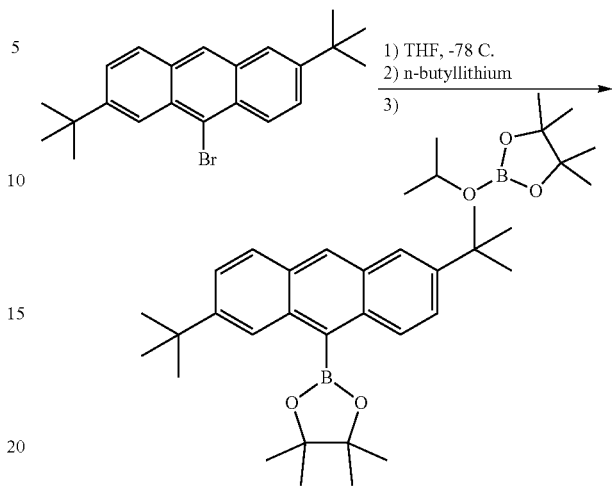

Synthesis Reaction of Inventive Procatalyst 19 (1 of 4)

9-bromo-2,6-di-tert-butylanthracene was synthesized by the prep according to Lee, J-F et al; *Tetrahedron*, 2011, 67, 1696. Inside a glove box, a 250 mL flask was charged with 9-bromo-2,6-di-tert-butylanthracene (3.58 g, 9.69 mmol), a Teflon stir bar and anhydrous THF (100 mL). The reaction flask was removed from the glove box, transferred to a fume hood and cooled to −78° C. via dry ice and acetone bath with an N$_2$ inlet attached thereto. The solution was stirred for 30 minutes and n-butyllithium (6.66 mL, 10.66 mmol) was slowly added over a 20 minute period. The reaction was then allowed to stir for 6 hours at −78° C. After 6 hours, 2-isopropoxy-4,4,5,5-tetramethyl-1,3,2-dioxaborolane (2.57 mL, 12.60 mmol) was added and allowed to stir overnight. The following day, the reaction was poured into 100 mL of water and extracted with 100 mL of methylene chloride. The aqueous was back extracted with 100 mL of methylene chloride, organics were combined, dried over Mg$_2$SO$_4$ and volatiles were removed. The crude product was purified by column chromatography to give the pure product (95:5 Hexanes:EtOAc). The yield was 2.34 g, or 58%. The sample was evaluated using $^1$H NMR spectroscopy, the results of which are as follows: $^1$H NMR (400 MHz, CDCl$_3$) δ 8.43-8.31 (m, 3H), 7.93-7.87 (m, 1H), 7.84 (d, J=2.0 Hz, 1H), 7.58 (ddd, J=9.3, 2.1, 0.8 Hz, 1H), 7.54-7.49 (m, 1H), 1.58 (d, J=0.9 Hz, 12H), 1.44 (dd, J=5.6, 0.9 Hz, 17H). $^1$H NMR (400 MHz, CDCl$_3$) δ 8.43-8.31 (m, 3H), 7.93-7.87 (m, 1H), 7.84 (d, J=2.0 Hz, 1H), 7.58 (ddd, J=9.3, 2.1, 0.8 Hz, 1H), 7.54-7.49 (m, 1H), 1.58 (d, J=0.9 Hz, 12H), 1.44 (dd, J=5.6, 0.9 Hz, 17H).

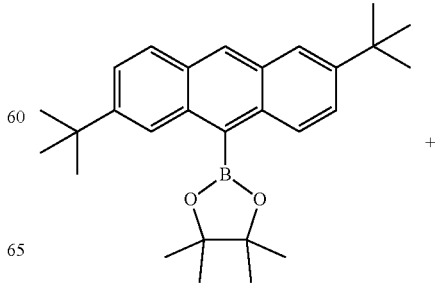

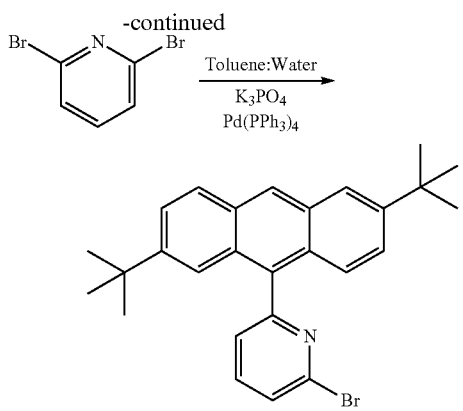

Synthesis Reaction of Inventive Procatalyst 19 (2 of 4)

A 250 mL round bottom was charged with 2-(2,6-di-tert-butylanthracen-9-yl)-4,4,5,5-tetramethyl-1,3,2-dioxaborolane (2.80 g, 6.82 mmol), potassium phosphate (4.34 g, 20.46 mmol), tetrakis(triphenylphosphine)palladium(0) (0.39 g, 0.34 mmol), dibromopyridine (2.42 g, 10.23 mmol), toluene (100 mL) and 0.15 mL of water. The reaction mixture was heated to 100° C. for 4 days. After 4 days, the reaction mixture was cooled. EtOAc and water were added and the organic layer was collected and all volatiles were removed. The crude brown product was purified by column chromatography to give the pure product (98:2 Hexanes:EtOAc). The yield was 2.5 g, or 82%. The sample was evaluated using $^1$H NMR spectroscopy, the results of which are as follows: $^1$H NMR (400 MHz, CDCl$_3$) δ 8.10 (s, 1H), 7.62 (dt, J=8.9, 0.6 Hz, 1H), 7.59-7.54 (m, 1H), 7.42 (ddd, J=8.0, 7.4, 0.6 Hz, 1H), 7.30 (dt, J=8.0, 0.8 Hz, 1H), 7.25-7.18 (m, 2H), 7.18-7.12 (m, 3H), 1.10 (d, J=0.7 Hz, 9H), 0.98 (d, J=0.7 Hz, 9H). $^{13}$C NMR (101 MHz, CDCl$_3$) δ 159.75, 148.00, 147.07, 142.09, 138.35, 132.37, 131.13, 130.09, 129.57, 128.66, 128.06, 127.34, 126.59, 125.86, 125.67, 125.22, 124.60, 122.62, 119.62, 35.08, 34.80, 30.90, 30.76.

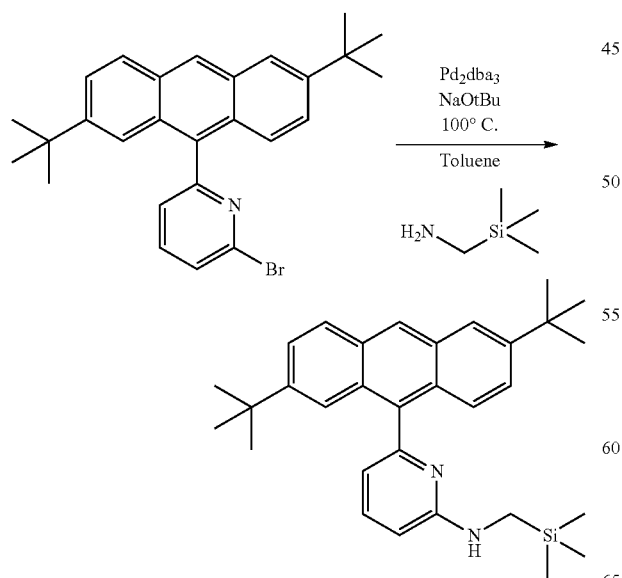

Synthesis Reaction of Inventive Procatalyst 19 (3 of 4)

Inside a glove box, a 200 mL jar was charged with the 2-bromo-6-(2,6-di-tert-butylanthracen-9-yl)pyridine (2.84 g, 6.82 mmol), NaOtBu (1.18 g, 0.32 mmol), Pd$_2$dba$_3$ (0.29 g, 0.32 mmol), rac-BINAP (0.39 g, 0.64 mmol), trimethylsilylmethylamine (1.27 mL, 9.54 mmol), and toluene (75 mL). The reaction mixture was heated to 100° C. for 3 h, then removed from the glove box. EtOAc and water were added and the organic layer was collected and all volatiles were removed. The crude brown product was purified by column chromatography to give the pure product (95:5 Hexanes:EtOAc). The yield was 2.5 g, or 86%. The sample was evaluated using $^1$H NMR spectroscopy, the results of which are as follows: $^1$H NMR (400 MHz, CDCl$_3$) δ 8.38 (s, 1H), 7.97-7.90 (m, 1H), 7.87 (t, J=1.6 Hz, 1H), 7.74-7.62 (m, 3H), 7.51 (dt, J=8.9, 1.6 Hz, 1H), 7.45 (dt, J=9.3, 1.7 Hz, 1H), 6.80 (dd, J=7.2, 0.8 Hz, 1H), 6.61 (d, J=8.3 Hz, 1H), 4.65 (s, 1H), 2.87-2.49 (m, 2H), 1.37 (dd, J=42.5, 1.6 Hz, 16H), 0.14 (d, J=1.4 Hz, 7H). $^{13}$C NMR (101 MHz, cdcl$_3$) δ 160.81, 156.78, 147.14, 146.77, 137.69, 135.02, 131.31, 130.30, 129.49, 128.64, 127.84, 126.16, 126.05, 124.93, 124.38, 122.38, 120.50, 115.83, 102.98, 35.01, 34.76, 32.57, 30.93, 30.83, -2.61.

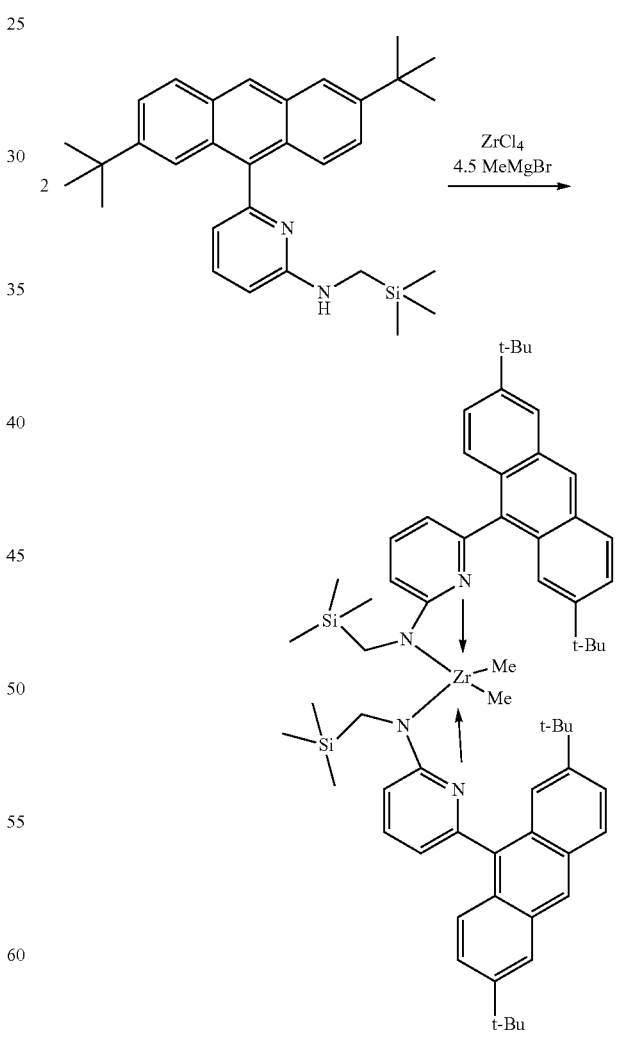

Synthesis Reaction of Inventive Procatalyst 19 (4 of 4)

Inside the glovebox a 20 mL vial was charged with ZrCl$_4$ (0.016 g, 0.07 mmol) and CH$_2$Cl$_2$ (5 mL). The solution was cooled to −30° C. then MeMgBr (0.10 mL, 0.31 mmol) was added. The solution was allowed to stir for 2 min then a cold $CH_2Cl_2$ (5 mL) suspension of 6-(2,6-di-tert-butylanthracen-9-yl)-N-((trimethylsilyl)methyl)pyridin-2-amine (0.064 g, 0.14 mmol) was added. The solution quickly changed to a yellow color and was allowed to stir at room temperature for 2 h. All volatiles were removed and the residue was taken up in hexanes and filtered through a disposable frit. All volatiles were removed and the residue was taken up in hexanes again and then filtered through a 0.45 micron syringe filter. All volatiles were removed and the crude product was used without further purification.

The yield was 0.064 g, or 89%. The sample was evaluated using $^1$H NMR spectroscopy, the results of which are as follows: $^1$H NMR (400 MHz, $C_6D_6$) δ 8.23 (d, J=11.8 Hz, 2H), 7.96-7.79 (m, 5H), 7.74 (s, 1H), 7.67-7.60 (m, 2H), 7.37 (dddd, J=18.7, 12.6, 9.1, 2.0 Hz, 4H), 6.89 (dd, J=8.7, 7.1 Hz, 1H), 6.81 (s, 1H), 6.12 (dd, J=7.1, 0.8 Hz, 1H), 6.07 (d, J=7.1 Hz, 1H), 5.27 (dd, J=8.8, 0.8 Hz, 2H), 1.40 (s, 8H), 1.38 (s, 10H), 1.27 (s, 7H), 1.25 (s, 11H), 0.17 (s, 3H), −0.06 (s, 10H). $^{13}$C NMR (101 MHz, $C_6D_6$) δ 171.51, 153.66, 147.15, 147.08, 146.49, 139.83, 139.62, 133.25, 132.98, 131.50, 131.30, 130.50, 130.30, 130.05, 129.86, 128.66, 128.44, 126.60, 126.31, 126.25, 126.03, 125.55, 124.96, 124.91, 124.61, 122.44, 122.07, 120.94, 120.49, 110.66, 102.19, 49.01, 34.76, 34.56, 30.84, 30.74, 30.59, 30.28, −1.93, −1.97.

Polymerization Examples

Batch Reactor Polymerization Procedure

Batch reactor polymerizations are conducted in a 2 L PARR™ batch reactor (commercially available from Parr Instrument Company, Moline, Ill.). The reactor is heated by an electrical heating mantle, and is cooled by an internal serpentine cooling coil containing cooling water. Both the reactor and the heating/cooling system are controlled and monitored by a CAMILE TG™ process computer (commercially available from Dow Chemical, Midland, Mich.). The bottom of the reactor is fitted with a dump valve, which empties the reactor contents into a stainless steel dump pot, which is prefilled with a catalyst kill solution (typically 5 mL of a IRGAFOS®/IRGANOX®/toluene mixture)(commercially available from BASF, Ludwigshafen, Germany). The dump pot is vented to a 30 gal. blow-down tank, with both the pot and the tank purged with nitrogen. All solvents used for polymerization or catalyst makeup are run through solvent purification columns to remove any impurities that may affect polymerization. The 1-octene and ISOPAR-E™ were passed through 2 columns, the first containing A2 alumina, the second containing Q5. (ISOPAR-E™ is an isoparaffin fluid, typically containing less than 1 parts per million (ppm) benzene and less than 1 ppm sulfur, which is commercially available from ExxonMobil Chemical Company, Irving, Tex.) The ethylene was passed through 2 columns, the first containing A204 alumina and 4 Å mol sieves, the second containing Q5 reactant. The $N_2$, used for transfers, was passed through a single column containing A204 alumna, 4 Å mol sieves and Q5.

The reactor is loaded first from the shot tank that may contain ISOPAR-E™ solvent and/or 1-octene, depending on desired reactor load. The shot tank is filled to the load set points by use of a lab scale to which the shot tank is mounted. After liquid feed addition, the reactor is heated up to the polymerization temperature set point. If ethylene is used, it is added to the reactor when at reaction temperature to maintain reaction pressure set point. Ethylene addition amounts are monitored by a micro-motion flow meter.

The catalyst and activators are mixed with the appropriate amount of purified toluene to achieve a desired molarity solution. The catalyst and activators are handled in an inert glove box, drawn into a syringe and pressure transferred into the catalyst shot tank. This is followed by 3 rinses of toluene, 5 mL each. Immediately after catalyst addition the run timer begins. If ethylene is used, it is then added by the CAMILE™ to maintain reaction pressure set point in the reactor. These polymerizations are run for 10 min, then the agitator is stopped and the bottom dump valve opened to empty reactor contents to the dump pot. The dump pot contents are poured into trays placed in a lab hood where the solvent is evaporated off overnight. The trays containing the remaining polymer are then transferred to a vacuum oven, where they are heated at 140° C. under vacuum to remove any remaining solvent. After the trays cool to ambient temperature, the polymers are weighed for yield/efficiencies, and submitted for polymer testing.

Polymer examples were prepared following the batch reactor process using the following conditions: 120° C.: 280 psig ethylene, 300 g 1-octene, 609 g ISOPAR-E™, 10 micromole (μmol) MMAO-3A, 1.2 eq. of bis(hydrogenated tallow alkyl)methylammonium tetrakis(pentafluorophenyl)borate to catalyst. Conditions at 150° C.: 331 psig ethylene, 300 g 1-octene, 546 g ISOPAR E, 10 μmol MMAO-3A, 1.2 eq. of bis(hydrogenated tallow alkyl)methylammonium tetrakis(pentafluorophenyl)borate to catalyst. Conditions at 190° C.: 400 psig ethylene, 300 g 1-octene, 520 g ISOPAR E, 10 μmol MMAO-3A, 1.2 eq. of bis(hydrogenated tallow alkyl)methylammonium tetrakis(pentafluorophenyl)borate to catalyst. All reactions were run for 10 minutes. All polymerizations were performed with bis(hydrogenated tallow alkyl)methylammonium tetrakis(pentafluorophenyl)borate as the activator and MMAO as the scavenger.

Test Methods

Test methods include the following:

Catalyst Efficiency (Efficiency)

The catalyst efficiency is calculated by dividing the number of grams of the polyolefin copolymer prepared by the total number of grams of metal M of ingredient (a) employed (i.e., metal M of the at least one metal-ligand complex of Formula (I)) (i.e., catalyst efficiency=g polyolefin copolymer prepared/g metal M of metal-ligand complex(es) of Formula (I) employed).

SymRAD HT-GPC Analysis

The molecular weight data was determined by analysis on a hybrid Symyx/Dow built Robot-Assisted Dilution High-Temperature Gel Permeation Chromatographer (Sym-RAD-GPC). The polymer samples were dissolved by heating for 120 minutes at 160° C. in 1,2,4-trichlorobenzene (TCB) at a concentration of 10 mg/mL stabilized by 300 ppm of butylated hydroxyl toluene (BHT). Each sample was then diluted to 1 mg/mL immediately before the injection of a 250 μL aliquot of the sample. The GPC was equipped with two Polymer Labs PLgel 10 μm MIXED-B™ columns (300×10 mm) at a flow rate of 2.0 mL/minute at 160° C. Sample detection was performed using a PolyChar IR4 detector in concentration mode. A conventional calibration of narrow polystyrene (PS) standards was utilized with apparent units adjusted to homo-polyethylene (PE) using known Mark-Houwink coefficients for PS and PE in TCB at this temperature.

Differential Scanning Calorimetry (DSC) Analysis

Melt temperature (Tm), glass transition temperature (Tg), crystallization temperature (Tc) and Heat of Melt may be measured by differential scanning calorimetry (DSC Q2000, TA Instruments, Inc.) using a Heat-Cool-Heat temperature profile. Open-pan DSC samples of 3-6 mg of polymer are first heated from room temperature to setpoint at 10° C. per min. Traces are analyzed individually using TA Universal Analysis software or TA Instruments TRIOS™ software.

1-Octene Incorporation IR Analysis

HT-GPC analysis preceded the IR analysis since the diluted GPC solutions were used for the IR depositions. A 56-well HT silicon wafer was utilized for deposition and analysis of 1-octene incorporation of the samples. Samples were heated to 160° C. for 210 minutes, then deposited while being heated using a Tecan MiniPrep 75 deposition station. The 1,2,4-trichlorobenzene was evaporated off the deposited wells of the wafer at 160° C. under nitrogen purge and 1-Octene analysis was performed on the HT silicon wafer using a NEXUS 670™ FT-IR. Octene incorporation is determined based on the integration of $CH_3$ vs. $CH_2$ stretching frequencies. This measurement is calibrated with ethylene 1-octene copolymer standards for which the 1-octene content is verified by NMR analysis.

In the Tables herein, Inventive Procatalysts are referred to by their number whereas Comparative Procatalysts are referred to by their number preceded by "C". Polymer examples prepared using Inventive Procatalysts are preceded by "P" whereas polymer examples prepared using Comparative Procatalysts are preceded by "CP".

TABLE 1

Batch Reactor Polymerization Data at 120° C.

| Polymer Example No. | Procatalyst No. | $M_w$ (g/mol) | PDI | Efficiency (g poly/g Metal) | Mol % Octene | Reaction Temp. (° C.) |
|---|---|---|---|---|---|---|
| CP1 | C1 | 656,000 | 4.44 | 249,000 | 0.7 | 120 |
| P1 | 1 | 586,000 | 28.8 | 605,000 | N.D. | 120 |
| P2 | 2 | 550,000 | 12.3 | 326,000 | 1.8 | 120 |
| P3 | 4 | 167,000 | 6.1 | 22,000 | 4.0 | 120 |
| P4 | 5 | 1,262,000 | 3.6 | 76,000 | 1.5 | 120 |
| P5 | 6 | 654,000 | 3.3 | 364,000 | 2.4 | 120 |
| P6 | 7 | 1,741,000 | 3.9 | 293,000 | 1.6 | 120 |
| P7 | 8 | 943,000 | 7.1 | 762,000 | 4.8 | 120 |
| P8 | 9 | 873,000 | 32.3 | 614,000 | 0.7 | 120 |
| P9 | 10 | 1,356,000 | 3.0 | 258,000 | 0.7 | 120 |
| P10 | 11 | 1,667,000 | 2.9 | 291,000 | 1.5 | 120 |
| P11 | 12 | 719,000 | 7.1 | 376,000 | 1.7 | 120 |
| P12 | 15 | 840,000 | 4.4 | 19,000 | 3.8 | 120 |
| P13 | 16 | 353,000 | 3.9 | 12,000 | 1.3 | 120 |

TABLE 2

Batch Reactor Polymerization Data at 150° C.

| Polymer Example No. | Procatalyst No. | $M_w$ (g/mol) | PDI | Efficiency (g poly/g Metal) | Mol % Octene | Reaction Temp. (° C.) |
|---|---|---|---|---|---|---|
| CP2 | C1 | 277,000 | 3.59 | 86,000 | 0.7 | 150 |
| P14 | 1 | 523,000 | 12.7 | 337,000 | N.D. | 150 |
| P15 | 2 | 525,000 | 4.2 | 212,000 | 2.1 | 150 |
| P16 | 4 | 72,000 | 6.5 | 10,000 | 4.7 | 150 |
| P17 | 5 | 1,132,000 | 3.0 | 101,000 | 2.8 | 150 |
| P18 | 6 | 460,000 | 2.7 | 83,000 | 1.8 | 150 |
| P19 | 7 | 840,000 | 2.3 | 263,000 | 1.5 | 150 |
| P20 | 8 | 626,000 | 4.2 | 460,000 | 1.4 | 150 |
| P21 | 9 | 704,000 | 3.7 | 522,804 | 0.9 | 150 |
| P22 | 10 | 591,000 | 4.2 | 576,000 | 1.5 | 150 |
| P23 | 11 | 942,000 | 3.0 | 187,000 | 2.5 | 150 |
| P24 | 12 | 531,000 | 5.6 | 209,000 | 2.4 | 150 |
| P25 | 13 | 640,000 | 4.1 | 166,000 | 0.7 | 150 |
| P26 | 14 | 390,000 | 3.5 | 512,000 | 1.0 | 150 |
| P27 | 15 | 527,000 | 10.5 | 38,000 | 1.0 | 150 |
| P28 | 16 | 541,000 | 5.2 | 15,000 | 1.4 | 150 |
| P29 | 17 | 1,197,000 | 2.7 | 1,798,000 | 2.2 | 150 |
| P30 | 18 | 509,000 | 3.4 | 129,000 | 0.8 | 150 |
| P31 | 19 | 619,000 | 13.4 | 702,000 | 5.5 | 150 |

TABLE 3

Batch Reactor Polymerization Data at 190° C.

| Polymer Example No. | Procatalyst No. | $M_w$ (g/mol) | PDI | Efficiency (g poly/g Metal) | Mol % Octene | Reaction Temp. (° C.) |
|---|---|---|---|---|---|---|
| P32 | 2 | 263,000 | 15.6 | 76,000 | 2.5 | 190 |
| P33 | 5 | 660,000 | 3.6 | 39,000 | 1.8 | 190 |
| P34 | 6 | 274,000 | 9.0 | 24,000 | 2.0 | 190 |
| P35 | 7 | 159,000 | 3.3 | 120,000 | 1.6 | 190 |
| P36 | 8 | 269,000 | 4.3 | 107,000 | 1.5 | 190 |
| P37 | 9 | 591,000 | 3.9 | 210,000 | 1.0 | 190 |
| P38 | 10 | 396,000 | 7.6 | 202,000 | 0.7 | 190 |
| P39 | 11 | 198,000 | 3.8 | 89,000 | 2.5 | 190 |
| P40 | 12 | 270,000 | 4.7 | 82,000 | 2.4 | 190 |
| P41 | 15 | 166,000 | 5.2 | 8,000 | 1.9 | 190 |
| P42 | 17 | 952,000 | 5.0 | 285,000 | 0.8 | 190 |
| P43 | 19 | 1,390,000 | 4.7 | 1,118,000 | 0.7 | 190 |

The chain transfer capabilities of the Inventive Procatalyst 3 and Comparative Procatalyst 2 were determined. Chain transfer to a potential chain shuttling agent is necessary for a catalyst to participate in a chain shuttling polymerization process. A catalyst's chain shuttling ability is initially evaluated by running a campaign in which the level of a chain transfer agent (CTA) is varied to observe the depression in molecular weight indicative of chain transfer. The molecular weight of polymer generated by catalysts with good chain shuttling potential will be more sensitive to the addition of CTA than the polymer molecular weight generated by poorer shuttling catalysts. The Mayo equation (Equation 1) describes how a chain transfer agent decreases the number average chain length ($\overline{X}_n$) from the native number average chain length ($\overline{X}_{n0}$) where no chain transfer agent is present. Equation 2 defines a chain transfer constant, Ca, as the ratio of chain transfer and propagation rate constants. By assuming that the vast majority of chain propagation occurs through ethylene insertion and not co-monomer incorporation, Equation 3 describes the expected $M_n$ of a polymerization. $M_{no}$ is the native molecular weight of the catalyst in the absence of chain shuttling agent and $M_n$ is the molecular weight that is observed with chain transfer agent ($M_n = M_{no}$ with no chain shuttling agent). Equation 3 ignores the contribution of chain growth from co-monomer incorporation, thus it is only applicable for poor incorporating catalysts.

$$\frac{1}{\overline{X}_n} = \frac{1}{\overline{X}_{n_0}} + \frac{k_{tr}[\text{chain transfer agent}]}{k_p[\text{monomer}]} \qquad \text{Equation 1}$$

$$Ca = \frac{k_{tr}}{k_p} \qquad \text{Equation 2}$$

-continued $$\frac{1}{Mn} = \frac{1}{Mn_0} + Ca\frac{[CSA]}{[ethylene] \times 28}$$ Equation 3

Polymerizations were conducted in the presence of diethylzinc to determine the chain transfer rates for Procatalysts 7, 8, 9, 10, 11, 13, and 14.

Table 4 provides the polymerization results with varying levels of diethylzinc (DEZ) as a chain transfer agent in a batch reactor using the following conditions: 150° C.: 12 g ethylene, 57 g 1-octene, 528 g, ISOPAR-E, 1.2 eq. bis(hydrogenated tallow alkyl)methylammonium tetrakis(pentafluorophenyl)borate activator to catalyst, 10 μmol MMAO-3A. Conditions at 120° C.: 11 g ethylene, 56 g 1-octene, 555 g, ISOPAR-E, 1.2 eq. bis(hydrogenated tallow alkyl)methylammonium tetrakis(pentafluorophenyl)borate activator to catalyst, 10 μmol MMAO-3A.

TABLE 4

Chain transfer data

| Procatalyst | Temp (° C.) | Catalyst Loading (μmol) | DEZ loading (μmol) | Polymer Yield (g) | Mw (g/mol) | PDI |
|---|---|---|---|---|---|---|
| 1 | 150 | 1.25 | 0 | 16.5 | 290,000 | 5.9 |
| 1 | 150 | 2.0 | 542 | 14.4 | 19,000 | 1.6 |
| 1 | 150 | 4.0 | 2,169 | 11.9 | 6,000 | 1.4 |
| 2 | 150 | 1.75 | 0 | 10.4 | 471,000 | 3.5 |
| 2 | 150 | 2.25 | 542 | 11.2 | 35,000 | 3.8 |
| 2 | 150 | 2.5 | 2,169 | 7.3 | 5,000 | 3.6 |
| 7 | 150 | 0.9 | 0 | 12.0 | 382,000 | 2.3 |
| 7 | 150 | 1.0 | 50 | 12.8 | 126,000 | 1.7 |
| 7 | 150 | 1.0 | 200 | 12.1 | 42,000 | 1.5 |
| 8 | 150 | 1.0 | 0 | 4.0 | 402,000 | 3.8 |
| 8 | 150 | 1.5 | 50 | 7.5 | 122,000 | 3.0 |
| 8 | 150 | 1.75 | 200 | 7.7 | 43,000 | 2.4 |
| 9 | 150 | 0.25 | 0 | 4.2 | 631,000 | 4.0 |
| 9 | 150 | 0.4 | 50 | 8.4 | 468,000 | 6.7 |
| 9 | 150 | 0.4 | 200 | 8.2 | 344,000 | 17 |
| 10 | 150 | 0.7 | 0 | 22.1 | 222,000 | 2.5 |
| 10 | 150 | 0.9 | 50 | 27.5 | 132,000 | 2.4 |
| 10 | 150 | 0.75 | 200 | 25.5 | 74,000 | 1.8 |
| 11 | 150 | 1.25 | 0 | 12.9 | 402,000 | 2.9 |
| 11 | 150 | 1.0 | 50 | 10.9 | 103,000 | 1.8 |
| 11 | 150 | 1.25 | 200 | 11.6 | 38,000 | 1.6 |
| 14 | 150 | 0.5 | 0 | 11.6 | 203,000 | 2.8 |
| 14 | 150 | 0.7 | 50 | 17.9 | 105,000 | 2.2 |
| 14 | 150 | 0.7 | 200 | 18.6 | 55,000 | 1.9 |
| 13 | 150 | 0.7 | 0 | 9.1 | 562,000 | 3.8 |
| 13 | 150 | 1.0 | 50 | 11.0 | 278,000 | 4.9 |
| 13 | 150 | 1.0 | 200 | 12.0 | 179,000 | 9.6 |
| 18 | 150 | 0.25 | 0 | 9.2 | 637,000 | 4.1 |
| 18 | 150 | 0.25 | 50 | 13.7 | 189,000 | 2.1 |
| 18 | 150 | 0.30 | 200 | 12.6 | 49,000 | 1.8 |

Table 5 provides the best fit for chain transfer constant (Ca) values using the Mayo equation. The $M_n$ for each run was calculated using Equation 3 with the values of Ca and $M_{n_0}$ fit using the Microsoft Excel Solver™ to minimize the squared deviations between the fitted and experimental molecular weight data for all the runs with a particular catalyst.

TABLE 5

Chain transfer constants

| Procatalyst | Temp (° C.) | Ca |
|---|---|---|
| 7 | 150 | 0.82 |
| 8 | 150 | 1.6 |

TABLE 5-continued

Chain transfer constants

| Procatalyst | Temp (° C.) | Ca |
|---|---|---|
| 9 | 150 | 0.95 |
| 10 | 150 | 0.46 |
| 11 | 150 | 1.1 |
| 13 | 150 | 1.2 |
| 14 | 150 | 0.66 |
| 18 | 150 | 1.1 |

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

As used throughout, the singular forms "a," "an" and "the" include plural referents unless the context clearly dictates otherwise. Thus, for example, reference to "a" component includes aspects having two or more such components, unless the context clearly indicates otherwise.

Having described the subject matter of the present disclosure in detail and by reference to specific embodiments thereof, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

The invention claimed is:

1. An olefin polymerization catalyst system comprising a procatalyst component selected from metal-ligand complexes of Formula (I):

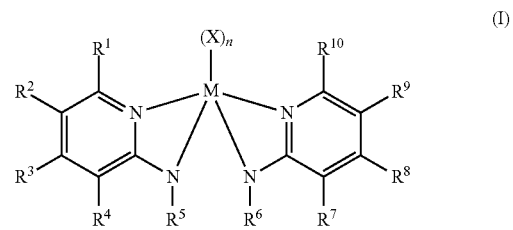

wherein M is titanium, zirconium, or hafnium;
wherein each X is independently a monodentate or polydentate ligand that is neutral, monoanionic, or dianionic, wherein n is an integer, and wherein X and n are chosen in such a way that the metal-ligand complex of Formula (I) is overall neutral;
wherein each $R^1$ and $R^{10}$ independently is selected from the group consisting of $(C_6-C_{40})$aryl, substituted $(C_6-C_{40})$aryl, $(C_3-C_{40})$heteroaryl, and substituted $(C_3-C_{40})$heteroaryl;

wherein each $R^2$, $R^3$, $R^4$, $R^7$, $R^8$, and $R^9$ independently is selected from a group consisting of hydrogen; $(C_1-C_{40})$ hydrocarbyl; substituted $(C_1-C_{40})$hydrocarbyl; $(C_1-C_{40})$heterohydrocarbyl; substituted $(C_1-C_{40})$heterohydrocarbyl; halogen; and nitro ($NO_2$);

wherein each $R^5$ and $R^6$ independently is selected from the group consisting of a $(C_1-C_{40})$alkyl; substituted $(C_1-C_{40})$alkyl; $[(Si)_1-(C+Si)_{40}]$ substituted organosilyl;

optionally, two or more of the $R^{1-5}$ groups are combined together to form a ring structure, with such ring structure having from 5 to 16 atoms in the ring excluding any hydrogen atoms; and optionally, two or more of the $R^{6-10}$ groups are combined together to form a ring structure, with such ring structure having from 5 to 16 atoms in the ring excluding any hydrogen atoms.

2. The olefin polymerization catalyst system according to claim 1, wherein each X independently is Me, Bn, or Cl.

3. The olefin polymerization catalyst system according to claim 1, wherein $R^1$ and $R^{10}$ are substituted phenyl groups and the metal-ligand complex has Formula (II):

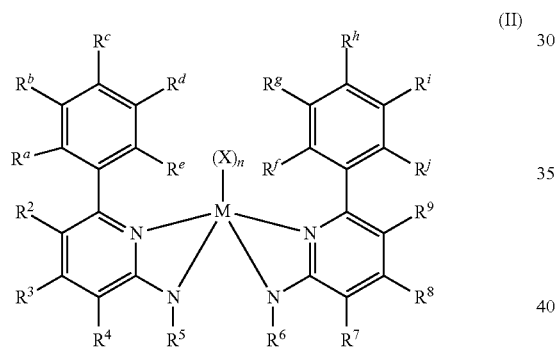

wherein $R^a$-$R^j$ are each independently selected from the group consisting of $R^S$ substituents and hydrogen; and wherein each $R^S$ independently is a halogen atom, polyfluoro substitution, perfluoro substitution, unsubstituted $(C_1-C_{18})$alkyl, $(C_6-C_{18})$aryl, $F_3C$, $FCH_2O$, $F_2HCO$, $F_3CO$, $(R^Z)_3Si$, $(R^Z)_3Ge$, $(R^Z)O$, $(R^Z)S$, $(R^Z)S(O)$, $(R^Z)S(O)_2$, $(R^Z)_2P$, $(R^Z)_2N$, $(R^Z)_2C=N$, NC, $NO_2$, $(R^Z)C(O)O$, $(R^Z)OC(O)$, $(R^Z)C(O)N(R^Z)$, or $(R^Z)_2NC(O)$, or two of the $R^S$ are taken together to form an unsubstituted $(C_1-C_{18})$alkylene, wherein each $R^Z$ independently is an unsubstituted $(C_1-C_{18})$alkyl.

4. The olefin polymerization catalyst system according to claim 3, wherein $R^a$, $R^e$, $R^f$ and $R^j$ are each independently selected from the group consisting of halogen atoms, $(C_1-C_8)$alkyl groups, and $(C_1-C_{18})$alkoxyl groups.

5. The olefin polymerization catalyst system according to claim 3, wherein $R^a$, $R^e$, $R^f$ and $R^j$ are each independently methyl, ethyl, or isopropyl.

6. The olefin polymerization catalyst system of claim 1, wherein said metal-ligand complex of Formula (I) is selected from the group consisting of Procatalysts 1-16:

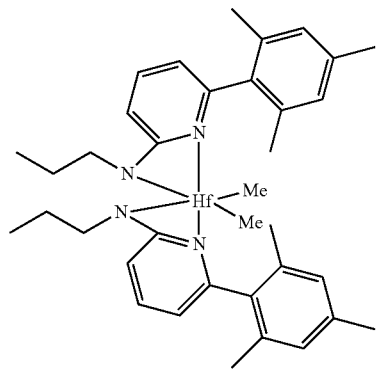

1

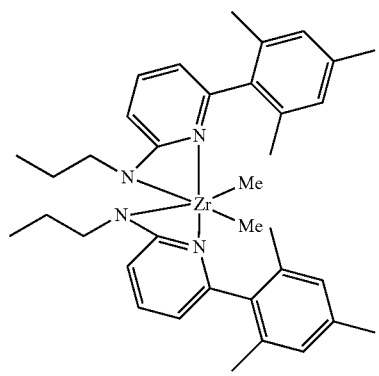

2

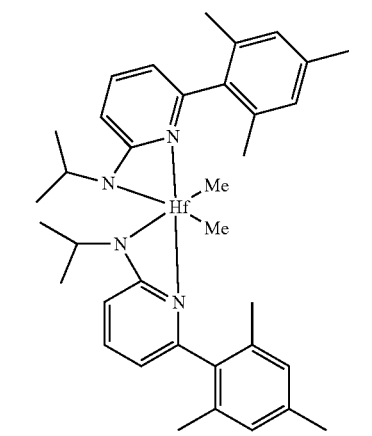

3

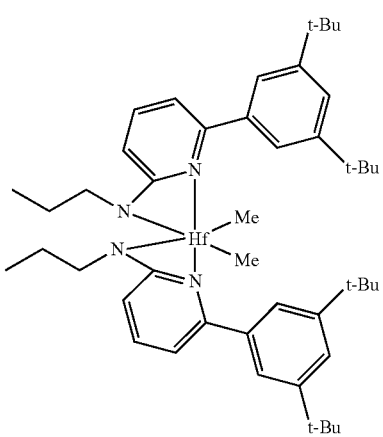

4

-continued
5
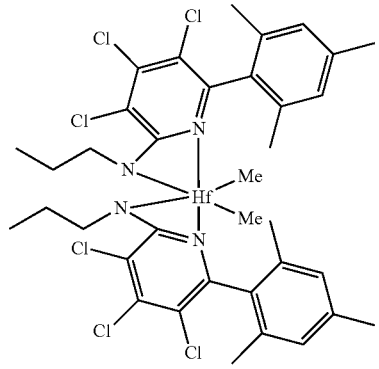
6
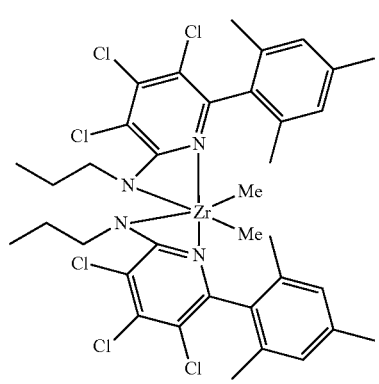
7
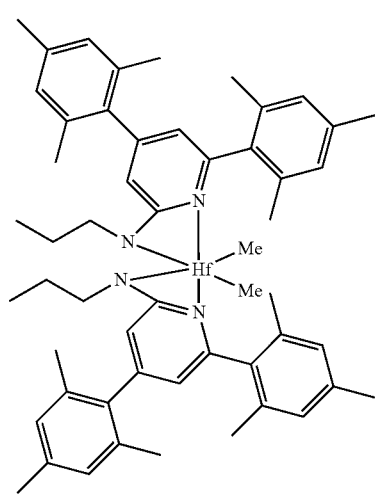
8
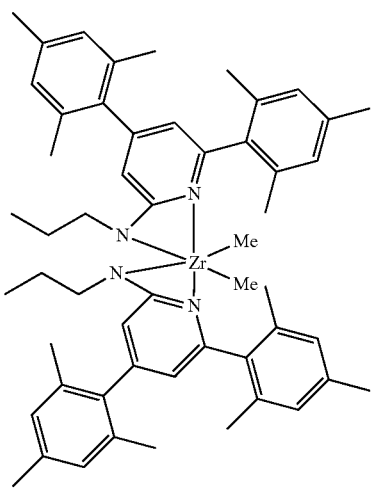
9
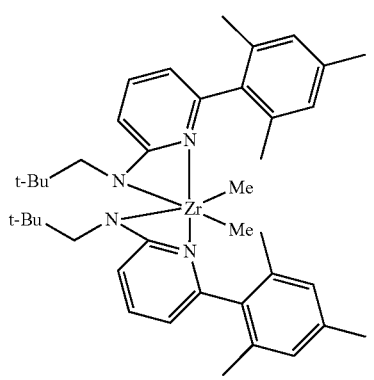
10
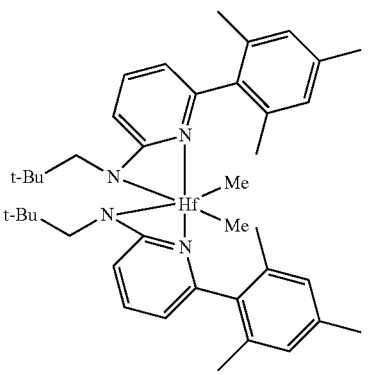

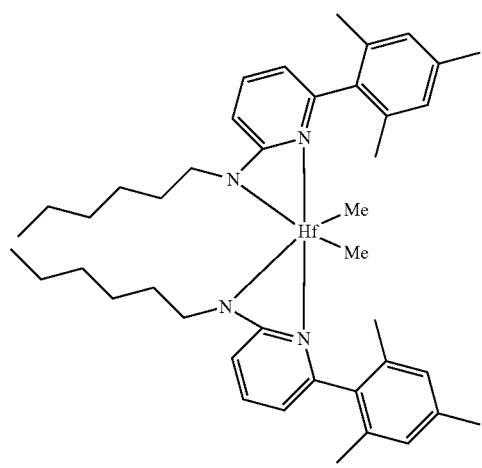
11
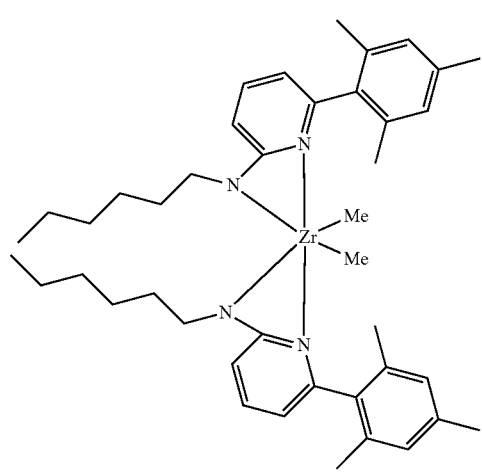
12
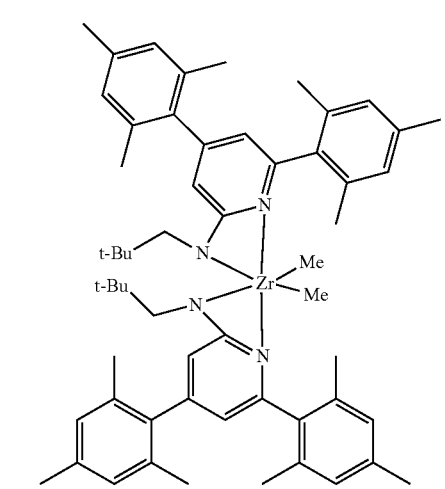
13
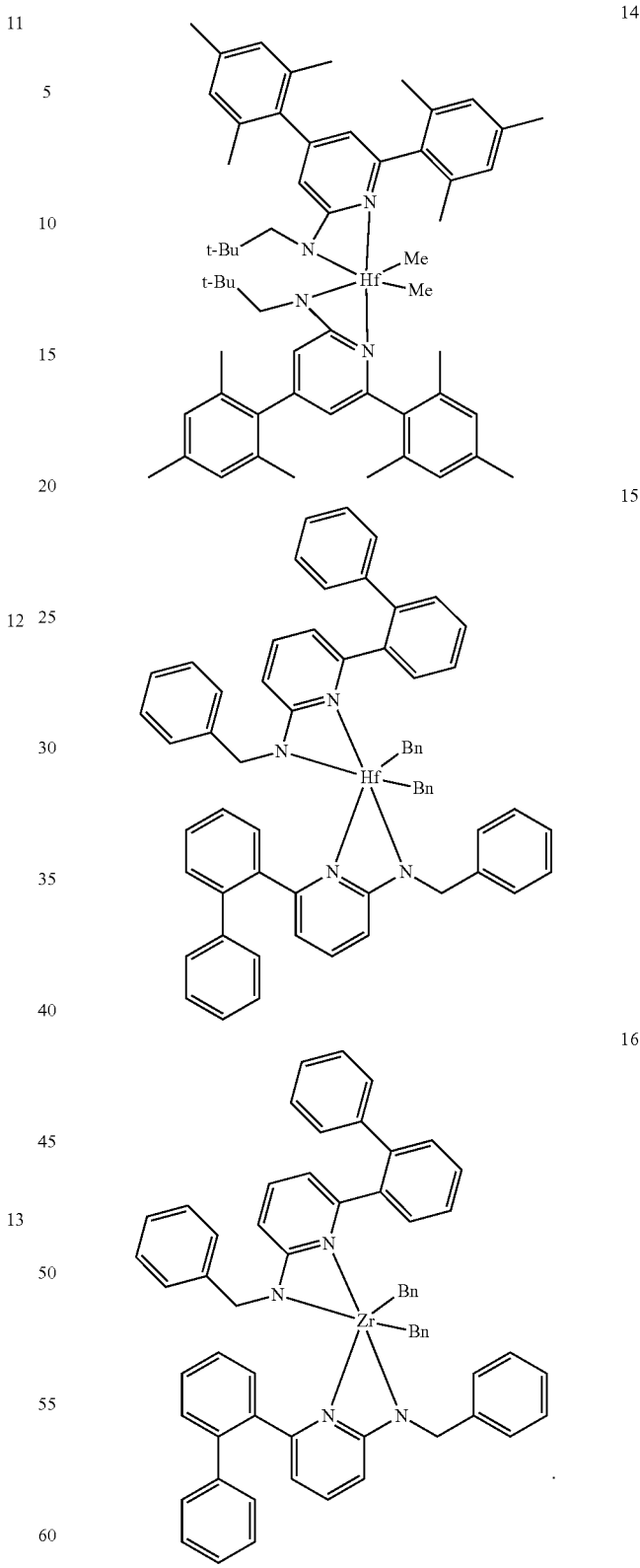
7. The olefin polymerization catalyst system of claim 6, wherein said metal-ligand complex of Formula (I) is selected from the group consisting of Procatalyst 1, Procatalyst 7, Procatalyst 8, Procatalyst 10, Procatalyst 11, and Procatalyst 14.

8. The olefin polymerization catalyst system of claim 6, wherein said metal-ligand complex of Formula (I) is selected from the group consisting of Procatalyst 1, Procatalyst 7, and Procatalyst 8.

9. The olefin polymerization catalyst system of claim 1, wherein said metal-ligand complex of Formula (I) is selected from the group consisting of Procatalyst 17, Procatalyst 18, and Procatalyst 19:

17

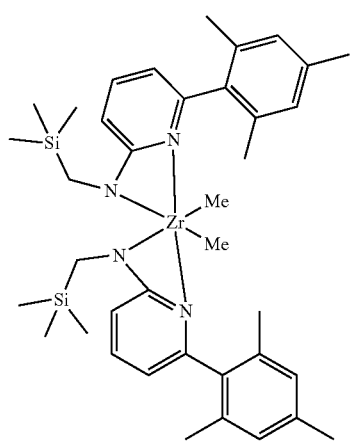

18

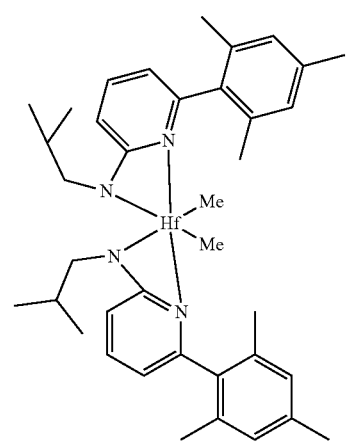

19

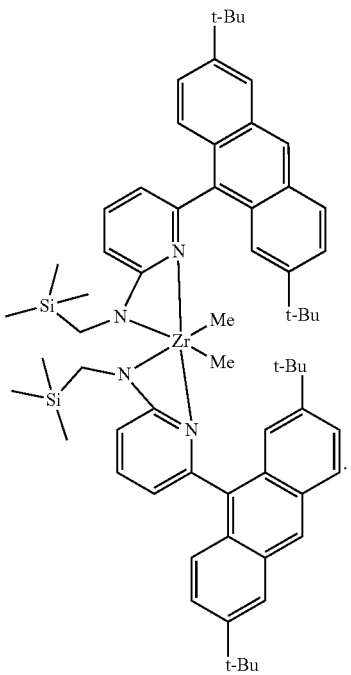

10. An olefin-based polymer comprising the product of a polymerization reaction of one or more olefin monomers in the presence of an olefin polymerization catalyst system according to claim 1.

11. The olefin-based polymer according to claim 10, wherein one or more of the olefin monomers is selected from the group consisting of linear alpha-olefins having from 3 to 12 carbons, branched alpha-olefins having from 5 to 16 carbons, and combinations thereof.

12. The olefin-based polymer according to claim 10, wherein the polymer is an olefin block copolymer generated through a chain shuttling process.

13. A process for polymerizing one or more olefin-based polymers comprising:
    polymerizing one or more olefin monomers in the presence of an olefin polymerization catalyst system according to claim 1.

14. The process according to claim 13, wherein the olefin polymerization catalyst system further comprises an activator.

15. The process according to claim 13, wherein the olefin polymerization catalyst system further comprises a chain transfer agent.

\* \* \* \* \*